(12) United States Patent
Marcelli et al.

(10) Patent No.: US 9,665,768 B2
(45) Date of Patent: May 30, 2017

(54) PROCESS OF HANDWRITING RECOGNITION AND RELATED APPARATUS

(71) Applicant: Natural Intelligent Technologies s.r.l., Fisciano (SA) (IT)

(72) Inventors: Angelo Marcelli, Fisciano (IT); Adolfo Santoro, Fisciano (IT); Claudio De Stefano, Fisciano (IT); Antonio Parziale, Fisciano (IT); Rosa Senatore, Fisciano (IT)

(73) Assignee: Natural Intelligent Technologies s.r.l., Fisciano (sa) (IT)

( * ) Notice: Subject to any disclaimer, the term of this patent is extended or adjusted under 35 U.S.C. 154(b) by 125 days.

(21) Appl. No.: 14/760,236

(22) PCT Filed: Jan. 11, 2014

(86) PCT No.: PCT/IB2014/058194
§ 371 (c)(1),
(2) Date: Jul. 10, 2015

(87) PCT Pub. No.: WO2014/108866
PCT Pub. Date: Jul. 17, 2014

(65) Prior Publication Data
US 2015/0339525 A1    Nov. 26, 2015

(30) Foreign Application Priority Data
Jan. 11, 2013   (IT) .............................. RM2013A0022

(51) Int. Cl.
*G06K 9/00* (2006.01)
*G06K 9/62* (2006.01)
(Continued)

(52) U.S. Cl.
CPC ..... *G06K 9/00416* (2013.01); *G06K 9/00429* (2013.01); *G06K 9/00852* (2013.01);
(Continued)

(58) Field of Classification Search
CPC .......... G06F 17/2785; G06F 17/30985; G06F 19/14; G06K 2209/01; G06K 9/00416; G06K 9/00429; G06K 9/00852; G06K 9/00865; G06K 9/00872; G06K 9/34; G06K 9/723
See application file for complete search history.

(56) References Cited

U.S. PATENT DOCUMENTS

2008/0123940 A1* 5/2008 Kundu ............... G06K 9/00865
382/159

OTHER PUBLICATIONS

Claudio De Stefano et al., "Reading Cursive Handwriting", Frontiers in Handwriting Recognition (ICFHR), 2010, Nov. 16, 2010, pp. 95-100.

(Continued)

*Primary Examiner* — Kim Vu
*Assistant Examiner* — Michael Vanchy, Jr.
(74) *Attorney, Agent, or Firm* — Blank Rome LLP

(57) ABSTRACT

Process, and related apparatus, that exploits psycho-physiological aspects involved in generation and perception of handwriting for directly inferring from the trace on the paper (or any other means on which the author writes by hand) the interpretation of writing, i.e. the sequence of characters that the trace is intended to represent.

20 Claims, 15 Drawing Sheets

(51) Int. Cl.
  *G06K 9/72* (2006.01)
  *G06K 9/34* (2006.01)
(52) U.S. Cl.
  CPC ..... *G06K 9/00859* (2013.01); *G06K 9/00872* (2013.01); *G06K 9/00926* (2013.01); *G06K 9/34* (2013.01); *G06K 9/6255* (2013.01); *G06K 9/723* (2013.01); *G06K 2209/01* (2013.01)

(56) References Cited

OTHER PUBLICATIONS

Tal Steinherz et al., "Offline Cursive Script Word Recognition—a Survey", International Journal on Document Analysis and Recognition Dec. 1, 1999, pp. 90-110.

P. Foggia et al., "Character Recognition by Geometrical Moments on Structural Decompositions", Proceedings of the 4th International Conference on Document Analysis and Recognition, (ICDAR), Aug. 18-20, 1997, vol. 1, Aug. 18, 1997, pp. 6-10.

G. Boccignone et al., "Recovering Dynamic Information from Static Handwriting", Pattern Recognition, Elsevier, GB, vol. 26, No. 3, Mar. 1, 1993, pp. 409-418.

L.P. Cordella et al., "Writing Order Recovery from Off-line Handwriting by Graph Traversal", Pattern Regognition (ICPR), 2010 20th, Aug. 23, 2010, pp. 1896-1899.

Antonio Clavelli et al., "Indexing and Retrieving Cursive Documents without Recognition", 19th International Conference on Pattern Recognition, 2008: ICPR 2008; Dec. 8-11, 2008, Dec. 8, 2008, pp. 1-4.

Réjean Plamondon et al., "On-line and Off-line Handwriting Recognition: A comprehensive Survey", IEEE Transaction on Pattern Analysis and Machine Intelligence, Jan. 1, 2000, pp. 63-84.

D. Impedovo et al., "Handwritten Signature Verification: New Advancements and Open Issues", Frontiers in Handwriting Recognition (ICFHR), 2012 International COnference ON, IEEE, Sep. 18, 2012, pp. 367-372.

\* cited by examiner

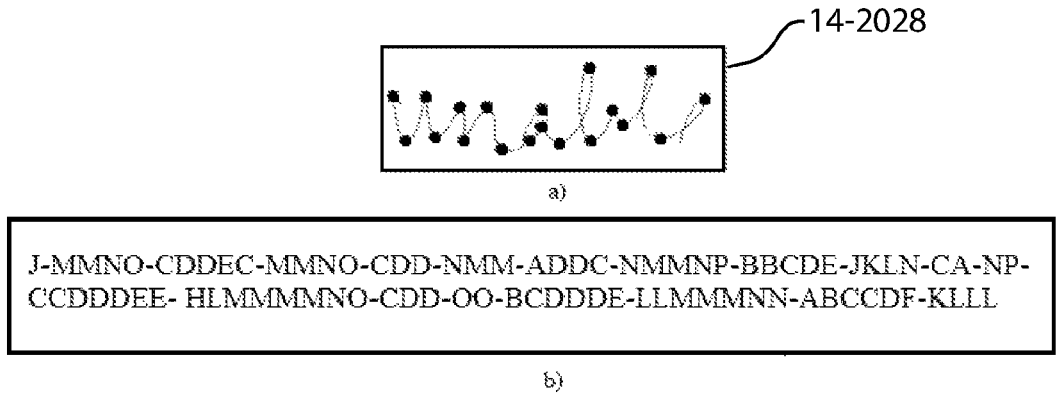

a)

J-MMNO-CDDEC-MMNO-CDD-NMM-ADDC-NMMNP-BBCDE-JKLN-CA-NP-CCDDDEE- HLMMMMNO-CDD-OO-BCDDDE-LLMMMNN-ABCCDF-KLLL b)

Fig. 14

| MATCH | DESCRIPTION |
|---|---|
|  | Reference transcript: "air*ia*"<br>Starting stoke: 0 – Ending stroke: 6<br>Label: "ia" |
|  | Reference transcript: "*an*ara"<br>Starting stoke: 4 – Ending stroke: 11<br>Label: "an" |
|  | Reference transcript: "de*na*"<br>Starting stoke: 8 – Ending stroke: 12<br>Label: "n" |
|  | Reference transcript: "*na*"<br>Starting stoke: 7 – Ending stroke: 15<br>Label: "na" |
|  | Reference transcript: "rla*ani*"<br>Starting stoke: 3 – Ending stroke: 10<br>Label: "an" |

Fig. 18

|   | 1 | 2 | 3 | 4 | 5 | 6 | 7 |
|---|---|---|---|---|---|---|---|
| 1 |   | 3/5 |   |   |   |   |   |
| 2 |   |   | 4/5 |   |   |   |   |
| 3 |   |   |   | 5/5 |   |   |   |
| 4 |   |   |   |   | 3/5 |   |   |
| 5 |   |   |   |   |   | 4/5 |   |
| 6 |   |   |   |   |   |   |   |
| 7 |   |   |   |   |   |   |   |
| 8 |   |   |   |   |   |   |   |
| 9 |   |   | 4/5 |   |   |   |   |
| 10 |   |   |   | 5/5 |   |   |   |
| 11 |   |   |   |   | 3/5 |   |   |
| 12 |   |   |   |   |   |   |   |

PROCESS OF HANDWRITING RECOGNITION AND RELATED APPARATUS

The present invention relates to a process of handwriting recognition that allows in an efficient, reliable and inexpensive way to recognise a writer's handwriting on the basis of psycho-physiological aspects of the handwriting mode, inferring from the trace on the paper (or any other means on which the writer writes by hand) the interpretation of writing, i.e. the sequence of characters that the trace is intended to represent.

The present invention further relates to the apparatus configured to execute such process of handwriting, and the tools allowing the execution of the same process.

Although in the following reference is mainly made to an application of the process according to the invention to the recognition of handwriting with ink on paper, it may be applied for recognising handwriting on any other means on which a writer may write by hand, such as for instance in case of electronic tablets on which a user may write with a stylus, still remaining within the scope of protection as defined by the attached claims.

In the context of automatic recognition of writing (in which for instance OCR techniques of optical character recognition are included), techniques of handwriting recognition have a significant and increasing importance.

The currently available techniques of handwriting recognition may be subdivided into two macro-categories: analytical techniques and holistic techniques, which both typically make use of neural networks.

Processes of the first category assume that the basic units to recognize are the single characters, and therefore they comprise the steps of segmenting the traces in subparts, each one of which is assumed as representing a character, encoding each subpart through an adequate set of features, and finally classifying each subpart by comparing its features with those associated to a set of prototypes each associated to a different class, i.e. to a different character. Hence, the analytical techniques are potentially capable to recognise any sequence of characters written in a given alphabet. Some processes of the first category are disclosed in documents U.S. Pat. No. 4,718,103 A, U.S. Pat. No. 5,303,312 A, U.S. Pat. No. 5,307,423 A, EP 0892360 A1 and US 2006/282575 A1.

However, the analytical techniques suffer from the drawback to be extremely sensitive to segmentation errors. Moreover, such techniques model each class (i.e. each character) independently from one another, and since in the handwritten word the actual shape of a character is influenced by the shape of at least the character that precedes and/or the one that follows, the analytical techniques requires very numerous training sets or prototypes sets in order to be able to take account of the variability exhibited by the various instances of the same character in different words and to reduce the recognition error rate. The most sophisticated analytical processes integrate segmentation and recognition procedures, i.e. they provide alternative segmentation hypotheses and they rely on a character recognition engine to either validate or reject each hypothesis, under the assumption that, in order to be correctly recognized, a character must have been correctly segmented.

Processes of the holistic techniques assume, on the contrary, a whole word as basic unit to be recognised, and consequently they represent each trace through a suitable set of features of which they perform a classification by comparing such set with those of a set of prototypes, each one associated to a different class, i.e. to a different word.

Holistic techniques have the advantage of not requiring a segmentation of handwriting tracts. Processes belonging to the holistic techniques are disclosed in documents U.S. Pat. No. 5,515,455A and US6754386B1.

However, holistic techniques suffer from the drawback that they need as many different classes as the number of different words to be recognized. Moreover, they require very large training set, containing a sufficient number of instances of each words in the recognisable lexicon, for training the prototypes of the classes. This limits the application of holistic techniques to lexicons of a few thousands of words, as in case of bank check processing or handwriting recognition used for postal item address.

Recently, on the basis of advancements in understanding the motor control aspects involved in handwriting and of developments of corresponding computational models, those skilled in the art have ascertained that handwriting is a discrete movement, resulting from time superimposition of elementary movements, called "strokes", and that the velocity of the movement varies along the trace, such that the parts of the trace which are produced more slowly correspond to the intersection between successive strokes. Accordingly, some methods of handwriting recognition have been proposed, which typically make use of Hidden Markov Models, which adopt the strokes as the basic units for segmenting the trace. From this stroke-based representation of the trace, a probabilistic model of the variation of both the shape of the strokes and the sequences of them for each class (a class may correspond to a character or word depending on which approach is adopted) is estimated and used for the recognition. Stroke based methods have been successfully adopted in a large majority of on-line handwriting recognition systems, and there are only few attempts to use them in off-line recognition systems. The reason is that in the first case the system performs the recognition while the trace is produced by means of a device, such as for instance an electronic tablet, that also provides dynamic information about the velocity of the pen (or stylus) tip, and therefore the actual elementary movements (strokes) made by the writer during writing may be reliably extracted from the analysis of the velocity profile of the trace. Instead, in the other case, such dynamic information is not available, and therefore extracting the actual strokes of the trace gets much harder and the results are less robust and less reliable, whereby different representations might be associated to traces produced by the same sequence of actual strokes.

However, even the stroke-based representation methods suffer from some drawbacks due to the fact that they need to model the sequence of strokes, i.e. to model both the variability of the strokes and the variability with which the strokes are arranged in the sequences representing the traces which would be desired to ascribe to the same class. In order to face both sources of variability, the training phase of such systems, that aims at building the model, requires so huge training sets, that they are difficult to collect and also very expensive.

It is an object of this invention, therefore, to allow handwriting recognition in an efficient, reliable and inexpensive way.

It is specific subject-matter of the present invention a process of handwriting recognition comprising a running mode wherein the process executes the steps of:
A. having at least one digital image of at least one cursive trace corresponding to at least one unknown word to be recognised, said at least one image comprising a set of pixels representing an ink in at least one first colour on a background of pixels in at least one second colour different from said at least one first colour, B. processing said at least one digital image on the basis of a Lexicon comprising a plurality of known words in at least one alphabet, C. outputting at least one string of one or more characters as interpretation of said at least one cursive trace, said at least one string of characters being selected from the known words included in the Lexicon, or rejecting said at least one unknown word, the process being characterised in that step B comprises the following operations:

B1. decomposing said at least one cursive trace so as to extract from said at least one digital image one or more image fragments and to classify each one of said one or more image fragments as isolated character or portion of cursive writing;

B2. if one or more image fragments have been classified as isolated characters, recognising the isolated characters in said one or more image fragments (201) classified as isolated characters so as to provide a list of one or more interpretations for each image fragment classified as isolated character and a classification cost for each interpretation and to provide a relative position for each image fragment classified as isolated character in said at least one cursive trace;

B3. if one or more image fragments have been classified as portions of cursive writing, segmenting each one of said one or more image fragments classified as portions of cursive writing into a sequence of one or more strokes;

B4. if one or more image fragments have been classified as isolated characters, on the basis of the Lexicon, of said one or more image fragments classified as isolated characters and of their relative position in said at least one cursive trace, determining a dynamic Lexicon comprising one or more known words included in the Lexicon which contain, in the positions corresponding to said one or more image fragments classified as isolated characters, a character corresponding to the interpretations included in the lists of one or more interpretations provided for each image fragment classified as isolated character and, for each known word of the dynamic Lexicon, an associated cost equal to the sum of the classification costs of the interpretations of each image fragment classified as isolated character corresponding to the character of the known word of the dynamic Lexicon in the corresponding position;

B5. if one or more image fragments have been classified as portions of cursive writing, on the basis of the dynamic Lexicon and of a Reference Set, which Reference Set comprises a plurality of stroke sequences corresponding to known portions of cursive writing and for each stroke sequence corresponding to a known portion of cursive writing a respective transcript comprising a string of as many characters as the strokes of the sequence so that each stroke of the sequence is associated to a character of the respective transcript, determining a Dynamic Reference Set comprising one or more strokes sequences extracted from the Reference Set the transcript of which at least partially corresponds with one or more subsequences of two or more characters included in said one or more known words included in the dynamic Lexicon in the positions corresponding to said one or more image fragments classified as portions of cursive writing;

B6. if one or more image fragments have been classified as portions of cursive writing, comparing the sequences of one or more strokes into which said one or more image fragments classified as portions of cursive writing have been segmented with said one or more strokes sequences included in the Dynamic Reference Set and, in the case where a set of matching criteria is satisfied, providing one or more cursive interpretations for each image fragment classified as portion of cursive writing; and B7. validating said one or more cursive interpretations of said one or more image fragments classified as portions of cursive writing, if any, and calculating a total cost of each known word of the dynamic Lexicon for which one or more cursive interpretations of said one or more image fragments classified as portions of cursive writing, if any, have been found by combining the associated cost determined in operation B.3 and the costs of said one or more cursive interpretations;

step C outputting as interpretation of said at least one cursive trace the known word of the dynamic Lexicon having lowest total cost of classification or rejecting said at least one unknown word in the case where the lowest total cost of classification is larger than a cost threshold.

According to another aspect of the invention, operation B4 may determine the dynamic Lexicon also on the basis of the sequences of one or more strokes into which said one or more image fragments classified as portions of cursive writing, if any, have been segmented by excluding from the dynamic Lexicon the known words included in the Lexicon which comprise at least one stroke sequence corresponding to a known portion of cursive writing of the Reference Set, having an expected number $S_{exp}$ of strokes, in a position corresponding to an image fragment classified as portion of cursive writing, the sequence of one or more strokes of which has an actual number $S_{act}$ of strokes, such that the difference between the expected number $S_{exp}$ of strokes and the actual number $S_{act}$ of strokes is larger than an exclusion threshold.

According to a further aspect of the invention, operation B2 may comprise, for each one of said one or more image fragments classified as isolated characters, the following substeps:

B2.1 associating to the image of the image fragment classified as isolated character a feature vector, the feature vector optionally comprising Central Geometrical Moments CGM of the image of the image fragment classified as isolated character up to the $7^{th}$ order and a set of means of pixels belonging to disjoint sub-images extracted from the image of the image fragment classified as isolated character, B2.2 performing a multi-expert classification with L experts $E=\{E_1, \ldots, E_L\}$, optionally based on at least one neural network, of the image fragment classified as isolated character for providing L results $\{e_1, \ldots, e_L\}$, more optionally having L=20 experts obtained by using as classification scheme a feed-forward-type neural network trained with the back-propagation algorithm wherein 10 first experts are trained by using a training set of Central Geometrical Moments CGM up to the $7^{th}$ order and 10 second experts are trained by using a training set of means of pixels belonging to disjoint sub-images, B2.3 combining the results $\{e_1, \ldots, e_L\}$ of the multi-expert classification outputting the list of one or more interpretations for the image fragment classified as isolated character and a classification cost for each interpretation, by optionally using a Bayesian Network for automatically inferring a probability distribution for each known isolated character and defining a new weighted majority vote rule, the Bayesian Network more optionally using a supervised learning strategy that observes both the results {$e_1, \ldots, e_L$} of the multi-expert classification and the known isolated character c for each image fragment of a training set in order to calculate a joint probability p (c, $e_1, \ldots, e_L$), wherein the Bayesian Network uses joint probabilities as weights for combining the results {$e_1, \ldots, e_L$} of the multi-expert classification, so that the Bayesian Network recognises the isolated character of the image fragment classified as isolated character interpreting the same as isolated character c* through the formula:

$$c^* = \max_{k \in C} \sum_k w_k r_{i,k} \qquad (1)$$

where $r_{i,k}$ is a function the value of which is 1 when the classifier $E_i$ classifies the image fragment classified as known isolated character k, and 0 otherwise, while $w_k$ represents the weight related to the k-th known isolated character and is set equal to the joint probability:

$$w_k = p(c=k, e_1, \ldots e_L) \qquad (2)$$

the interpretations being progressively ordered and operation B2 including in the list of one or more interpretations for the image fragment classified as isolated character the best interpretation and the successively ordered interpretations for which the difference with respect to the preceding one is lower than an interpretation threshold θ, the classification cost of each interpretation included in the list of one or more interpretations being equal to the respective product $w_k r_{i,k}$.

According to an additional aspect of the invention, operation B3 may comprise, for each image fragment classified as portion of cursive writing, the following ordered substeps:

B3.1 making a skeletonisation of the image fragment classified as portion of cursive writing, by transforming the ink in a skeleton comprising a line having width equal to a single pixel optionally through medial axis transform MAT, B3.2 correcting distortions, if any, introduced by the skeletonisation, optionally by removing spurious branches, if any, and making a polygonal approximation of each skeletal branch and more optionally by correcting V-type and/or X-type and/or T-type distortions, if any, B3.3 unfolding the corrected skeleton obtained from substep B3.2, providing a temporal sequence of points forming the ink, B3.4 segmenting, on the basis of the sequence of unfolding points, the unfolded corrected skeleton obtained from substep B3.3 into a sequence of strokes separated by segmentation points, B3.5 making a validation of the segmented unfolded corrected skeleton obtained from substep B3.4 on the basis of a set of validation criteria and, in the case where said set of validation criteria are not satisfied repeating from substep B3.3 for producing a different unfolding of the skeleton, B3.6 in the case where step B3.5 ascertains that said set of validation criteria is satisfied, assigning to each stroke a distinctive feature, that optionally takes account of a global shape of the stroke and of its relative position in said at least one cursive trace, providing (508) the sequence of strokes and the corresponding sequence of features.

According to another aspect of the invention, substep B3.3 may provide the temporal sequence of points of the corrected skeleton on the basis of a search in a graph, comprising a plurality of nodes and a plurality of arcs which connects nodes, that describes topological properties of a polyline associated to the corrected skeleton obtained from substep B3.2, wherein each node of the graph has a type, selected between end point EP and branch point BP, and a degree, equal to the number of connecting arcs branching from the same node and that depends on the number of lines of the polyline which cross the node, substep B3.3 comprising:

transforming the graph into a semi-Eulerian graph, by selecting the source and destination nodes among the nodes having an odd degree and transforming all the remaining nodes having an odd degree into nodes having an even degree by adding connecting arcs among them, optionally by adding connecting arcs between pairs of odd nodes on the basis of a neighbourhood criterion, obtaining the unfolding by selecting a path within the semi-Eulerian graph that crosses all the nodes and that minimises the number of nodes crossed more than once, optionally through a Fleury's algorithm modified on the basis of handwriting generation criteria, optionally by ordering the connecting arcs starting from the source node and, in each branch point BP type node, going through the connecting arcs according to the following order:

a) simple connecting arc, starting from a branch point BP type node and ending in another branch point BP type node;
b) loop, that is a connecting arc starting and ending in the same branch point BP type node;
c) two-way circuit, that is a connecting arc starting in a branch point BP type node and ending in an end point EP,
d) three-way circuit, that is formed by two connecting arcs starting and ending in the same branch point BP type node;
e) bridges, which are simple connecting arcs the removal of which disconnects the graph.

According to a further aspect of the invention, substep B3.4 may segment the unfolded corrected skeleton through a decomposition method using a concept of perceptual saliency based on a multi-scale representation of the unfolded corrected skeleton obtained from substep B3.3 that is used to build a saliency map to highlight the points of the unfolded corrected skeleton in which curvature variations are recorded at different scales larger than a curvature variation threshold and to assume such points of the unfolded corrected skeleton as segmentation points, wherein the decomposition method optionally comprises:

building representations of the unfolded corrected skeleton by using as scale σ different levels of resolution of the image fragment classified as portion of cursive writing, the lowest resolution more optionally including three points to represent the whole unfolded corrected skeleton, calculating a curvature c(σ) at each resolution σ:

$$c(\sigma) = \lim_{\Delta \lambda \to 0} \Delta \alpha / \Delta \lambda$$

where λ is a curvilinear abscissa on the unfolded corrected skeleton, quantising the curvature in Q intervals, with Q more optionally equal to 16, and encoding each interval by a label such that at each scale the shape of the stroke is described by a string of as many labels as the number of points used to describe the unfolded corrected skeleton minus one;

building a saliency map by counting the number of times a point of the unfolded corrected skeleton is a local maximum of curvature at the different scales;

selecting as segmentation points the local maximum points of the saliency map the value of which is larger than the curvature variation threshold equal to the average of values of the map;

selecting the best scale for describing the shape of the strokes by calculating the distance between a vector $c(\sigma)$ and a vector $<c(\sigma)>$.

According to an additional aspect of the invention, substep B3.5 may analyse the sequence of strokes obtained from substep B3.4 by means of the following validation criteria:

determining a segmentation error when a stroke starts or ends in the neighbourhood of an ending point or a starting point of an ink tract, the neighbourhood being evaluated by comparing the distance between the segmentation point and the starting or ending one with a distance threshold, optionally equal to 3 pixels;

determining a segmentation error when two or more strokes start in the neighbourhood of a branch BP type point, the neighbourhood being evaluated by comparing the distance between the segmentation point and the branch BP type point with the distance threshold, and, if the number of determined errors exceeds an error threshold, optionally equal to 2, substep B3.5 rejects the segmented unfolded corrected skeleton obtained from substep B3.4 and the process repeats substep B3.3, while if the number of determined errors is larger than zero and lower than the error threshold, the process repeats substep B3.3 by exploiting the determined errors for modifying:

the selection of the source node and the destination node, and/or the introduction of additional connecting arcs, and/or the selection of the path within the semi-Eulerian graph.

According to another aspect of the invention, operation B6 may performs, for each image fragment classified as portion of cursive writing, the comparison by measuring the shape similarity of the sequence of one or more strokes into which the image fragment has been segmented with the shape of said one or more stroke sequences included in the Dynamic Reference Set at different scales on the basis of a multi-scale representation of the sequence of one or more strokes into which the image fragment has been segmented that is used for building a saliency map to highlight the stroke sequences included in the Dynamic Reference Set which are most similar to the sequence of one or more strokes into which the image fragment has been segmented, the multi-scale representation optionally using as starting scale the length K, equal to the number of strokes, of the longest common sequence of compatible strokes between the sequence of one or more strokes into which the image fragment has been segmented and the stroke sequence included in the Dynamic Reference Set with which the comparison is performed, the successive scales being obtained by considering the subsequences of compatible strokes of length progressively decreased by 1, whereby K−1 similarity maps are obtained, the comparison being more optionally performed on the basis of one or more compatibility criteria.

According to a further aspect of the invention, in operation B6 the shape of a stroke may be described by a chain code that encodes the orientations of the segments of the polyline describing the stroke at the resolution $\sigma$, and operation B6 may comprise the following ordered substeps:

B6.1. measuring the similarity between two strokes through a weighted edit distance WED between the respective chain codes, wherein the chain code of shortest length $L_{min}$ between the two ones to be compared is stretched up to the chain code of longest length $L_{max}$, optionally so as to calculate the integer part l of the ratio $(L_{max}/L_{min})$ and each symbol of the shortest chain code is replicated (l−1) times and the remaining $((L_{max}-L_{min})-l)$ symbols are added by uniformly locating them in the stretched chain code, the WED distance between a first chain code $X=(x_1, x_2, \ldots, x_L)$ and a second chain code $Y=(y_1, y_2, \ldots, y_L)$ being equal to:

$$WED(X, Y) = WED_{max} \cdot \left[ \frac{SD_{max} - \sum_{i=1}^{L} \left( \frac{ED(x_i, y_i)}{L} \right)}{SD_{max}} \right] \quad [W1]$$

where:

$E(x_i, y_i)$ is the symmetric edit distance between the symbol $x_i$ of the first chain code and the symbol $y_i$ of the second chain code, L is the length of the chain codes X and Y, $SD_{max}$ is the maximum distance between two symbols, optionally equal to 8, and $WED_{max}$ is the maximum WED distance, optionally equal to 100, B6.2 calculating the average value $\mu(WED)$ on the values $WED_{ij}$ which are different from zero, B6.3 initialising the N×M elements $S_{ij}$ of the saliency map S to zero, B6.4 determining the length K of the longest common sequence of compatible strokes and, for each pair of strokes p and q of this sequence such that $WED_{pq} > \mu(WED)$, incrementing the saliency of the pair of strokes p and q by one, i.e.: $S_{pq} = S_{pq} + 1$, B6.5 decrementing the length K by one (i.e. K=K−1) and, until the length K is larger than or equal to 2 (i.e. K≥2), searching the sequences of length K and repeating substep B6.1, B6.6 calculating the average value $\mu(S)$ on the values $S_{ij}$ which are different from zero, B6.7 selecting according to a matching criterion one or more stroke sequences included in the Dynamic Reference Set most similar to the sequence of one or more strokes into which the image fragment has been segmented as cursive interpretation, the cost for each cursive interpretation being equal to the average value of the WED distance of the stroke sequence included in the Dynamic Reference Set from the sequence of one or more strokes into which the image fragment has been segmented.

According to an additional aspect of the invention, operation B7 may comprise the following substeps:

B7.1 constructing a directed weighted graph the nodes of which are the matches between strokes of the sequence of one or more strokes into which the image fragment classified as portion of cursive writing has been segmented and the stroke sequence included in the Dynamic Reference Set, a label corresponding to the sequence of characters encoded by the sequence of corresponding strokes being associated to each node, and the arcs of which are the possible connections between pairs of consecutive matches, each graph path being associated to a string obtained by merging the labels of each crossed node along the path, the graph nodes being optionally determined on the basis of the following three rules:

1) a match becomes a node if its label is a substring contained within the cursive interpretation of the image fragment classified as portion of cursive writing;
2) two or more matches are merged in a single match if they are fully overlapped and have in common the same label;
3) two matches are associated to different nodes if they are not overlapped or if they are partially overlapped and the overlapped labels of the strokes are different, and the cost assigned to nodes determined by such three rules being optionally equal, for each node, to the difference between the maximum number of matches assigned to one of the nodes for the image fragment classified as portion of cursive writing and the number of matches associated to the graph node, the graph arcs being determined on the basis of the following three rules:

4) an arc between two nodes is created if and only if the sequences associated to the two nodes connected by the arc are not overlapped and the merging of the sequences gives rise to a substring contained within the cursive interpretation of the image fragment classified as portion of cursive writing;
5) an arc between two nodes is created if and only if the sequences associated to the two nodes connected by the arc are overlapped by at most a maximum number b of strokes, the overlapped strokes have the same label and the merging of the sequences gives rise to a substring contained within the cursive interpretation of the image fragment classified as portion of cursive writing;
6) after having inserted a virtual source node and a virtual target node for obtaining a connected graph, the virtual source node is connected to each node that, after application of rules 4 and 5, remains without ingoing arc and each node that, after application of rules 4 and 5, remains without an outgoing arc is connected to the virtual target node, and the cost assigned to the arcs determined by such three rules being optionally depending on the length of the overlaps and of the gaps between the matches, whereby the cost for the arc $A_{ij}$ going from node $N_i$ to node $N_j$ is equal to $$A_{ij} = \begin{cases} 0, \text{ for adjacent nodes} \\ \text{cost}(N_{high}) \times \frac{L}{L_{high}}, \text{ for gap} \\ \min(\text{cost}(N_i), \text{cost}(N_j)) \times \frac{L}{L_{low}}, \text{ for overlap} \end{cases}$$

where L denotes the length of the overlap or of the gap, $L_{low}$ denotes the length of the cheapest node of the pair, $N_{high}$ the graph node with the highest cost and $L_{high}$ its length, and cost(N) is the cost of the node, the cost $C_{ij}$ of the path going from node $N_i$ to node $N_j$ being equal to:

$$C_{ij} = \text{cost}(N_i) + A_{ij} + \text{cost}(N_j)$$

B7.2 verifying the existence of a path the associated string of which matches the cursive interpretation, and in case of positive outcome of the verification accepting the cursive interpretation.

According to another aspect of the invention, the process may further comprise a configuration mode wherein the process executes the steps of:

D. having a plurality of digital images of a Setup Set of training of cursive traces corresponding to known words, said at least one image comprising a set of pixels representing an ink in at least one first colour on a background of pixels in at least one second colour different from said at least one first colour,
E. decomposing said cursive traces of the digital images of the Setup Set so as to extract one or more image fragments and to classify each one of said one or more image fragments as isolated character or portion of cursive writing, the image fragments classified as isolated characters forming a character training set and the image fragments classified as portions of cursive writing forming a cursive training set,
F. training an engine of classification of isolated characters with character training set,
G. segmenting each one of said image fragments classified as portions of cursive writing into a sequence of one or more strokes,
H. associating to each sequence of one or more strokes obtained from step G its transcript, so that each stroke is associated to the character of the transcript to which it belongs, the sequences of one or more strokes obtained from step G and the respective transcripts forming the Reference Set, step H optionally comprising the following substeps:

H1. generating distributions, wherein the sequences of one or more strokes obtained from step G and the respective transcripts are used for generating, for each character of the alphabet of the Lexicon, a series of probability mass functions the number of which is equal to the number C of characters of the alphabet of the Lexicon,
H2. analysing features of the sequences of one or more strokes obtained from step G, wherein a set of anchor points is determined through the analysis of features associated to the strokes, each one of the anchor points representing the beginning or the end of a character in a subsequence into which a sequence of one or more strokes obtained from step G can be subdivided,
H3. associating labels, wherein, in accordance with the anchor points, the transcripts of the portions of said cursive traces separated by the anchor points are determined, through the probability mass functions, associating each stroke to the transcript of the character to which it belongs, substep H1 more optionally generating a probability mass function for each character, that represents the probability that a character is composed of a certain number of strokes, the probability mass functions being obtained by solving a set of systems of linear equations wherein each equation is obtained from a segmented ink tract by considering the number $n_{char}$ of strokes of each character as an unknown variable, the occurrences $x_{char}$ of each character as coefficients, and the number $n_{strokes}$ of strokes of the segmented ink tract as constant term:

$$n_a x_a + \ldots + n_z x_z + n_A x_A + \ldots + + n_Z x_Z + = n_{strokes}$$

each system of linear equations being constituted by k equations, with k≥C, where C is the number of characters of the alphabet of the Lexicon, and with C unknown variables, whereby solving a set of m systems, m vectors of solutions are obtained each one comprising C elements, each i-th vector of solutions, with i ranging from 1 to m, being associated with a corresponding vector of reliability parameters R, having C elements each one of which is equal to the ratio of the occurrence of the corresponding character within the system of equations to the deviation of the considered solution for that character from the average of the solutions for that character:

$$R_{c,i} = \frac{n_{c,i}}{r_{c,i} \times n_{c,i} - \sum_{j=1}^{m} \frac{r_{c,j} \times n_{c,j}}{m}}$$

where:
- $n_{c,i}$ is the occurrence of the c-th character within the i-th system; and
- $r_{c,i}$ is the number of strokes, obtained by solving the i-th system, composing the c-th character, the distributions being created on the basis of the m vectors of solutions and of the corresponding vectors of reliability parameters R.

It is further specific subject-matter of the present invention a computerised apparatus, in particular computer or computer network, for handwriting recognition, characterised in that it comprises processing means capable to execute the process of handwriting recognition just described.

It is also specific subject-matter of the present invention a set of one or more computer programs comprising code means adapted to perform, when operating on processing means of a computerised apparatus, the process of handwriting recognition just described.

It is further specific subject-matter of the present invention a set of one or more computer-readable memory media, having a set of one or more computer programs stored therein, characterised in that the set of one or more computer programs is the set of one or more computer programs just mentioned.

The inventors have developed a process psycho-physiological aspects involved in generation and perception of handwriting for directly inferring from the trace on the paper (or any other means on which the writer writes by hand) the interpretation of writing, i.e. the sequence of characters that the trace is intended to represent.

The process according to the invention may deal with any kind of trace, including those only partially representing writing movements, as it happens when some movements are performed while the pen tip is not in touch with the paper. These lifts of the pen tip may occur anywhere in the handwriting, i.e. between successive characters as well as within a single character.

In contrast to prior art processes for handwriting recognition, the process according to the invention does not perform any feature extraction and classification, and therefore it does not need to be trained to learn class prototypes. All the information that the process needs is extracted from two sources: a set of traces and their interpretations (the setting set, in the following also denoted as "Setup Set") and a list of possible interpretations for the unknown words (the lexicon, in the following also denoted as "Lexicon")

The traces in the Setup Set are not constrained to represent words of the Lexicon, and therefore the same Setup Set may be used with different samples of Lexicon, provided that both the Setup Set and the Lexicon refer to the same alphabet and, optionally, to the same language. Thus, the system may reliably recognise any word of the Lexicon, including those for which there were no instances in the Setup Set.

The present invention will be now described, by way of illustration and not by way of limitation, according to its preferred embodiments, by particularly referring to the Figures of the annexed drawings, in which.

Figure 1:
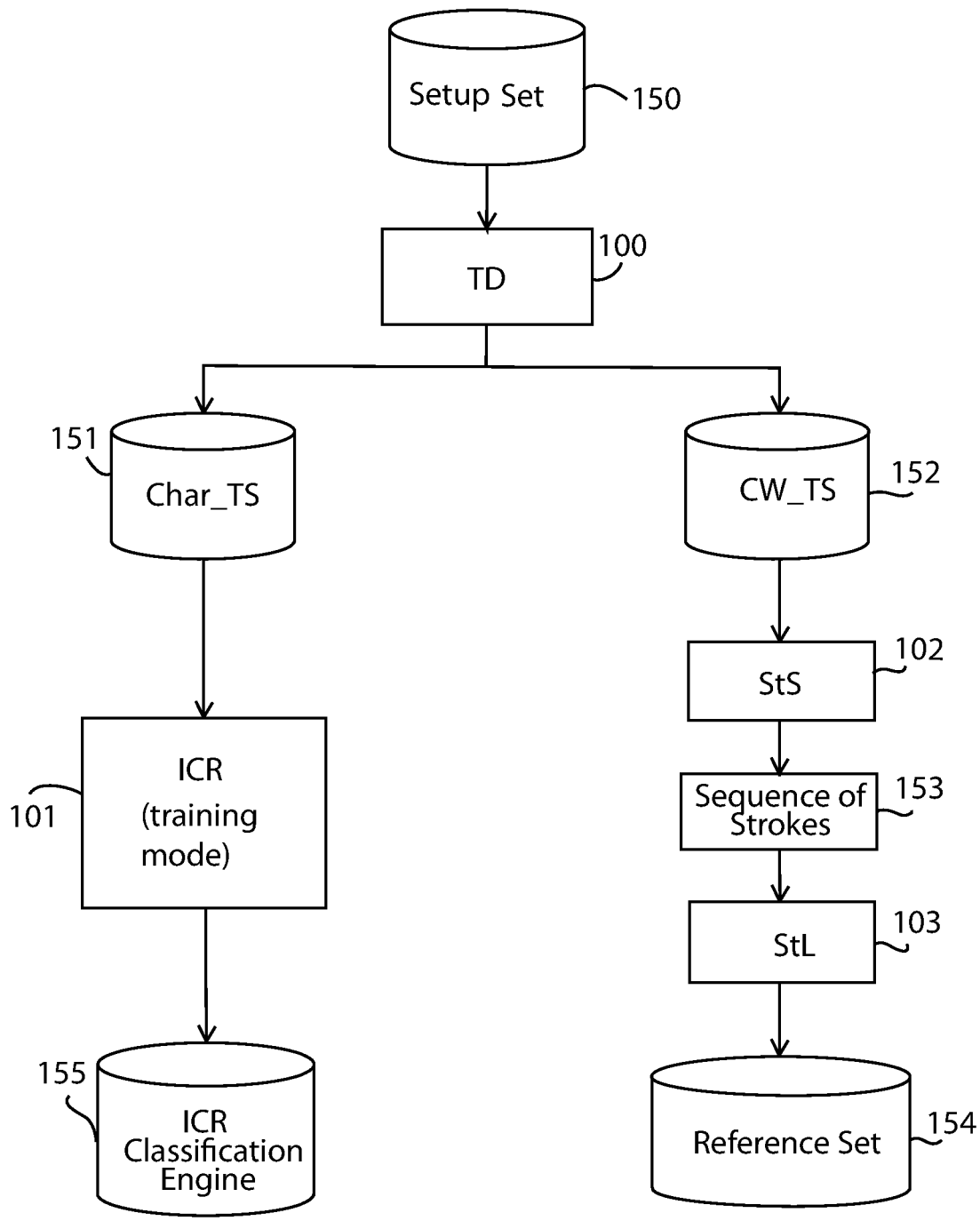
FIG. 1 shows a schematic block diagram of a preferred embodiment of the process according to the invention in a configuration mode.
Figure 2:
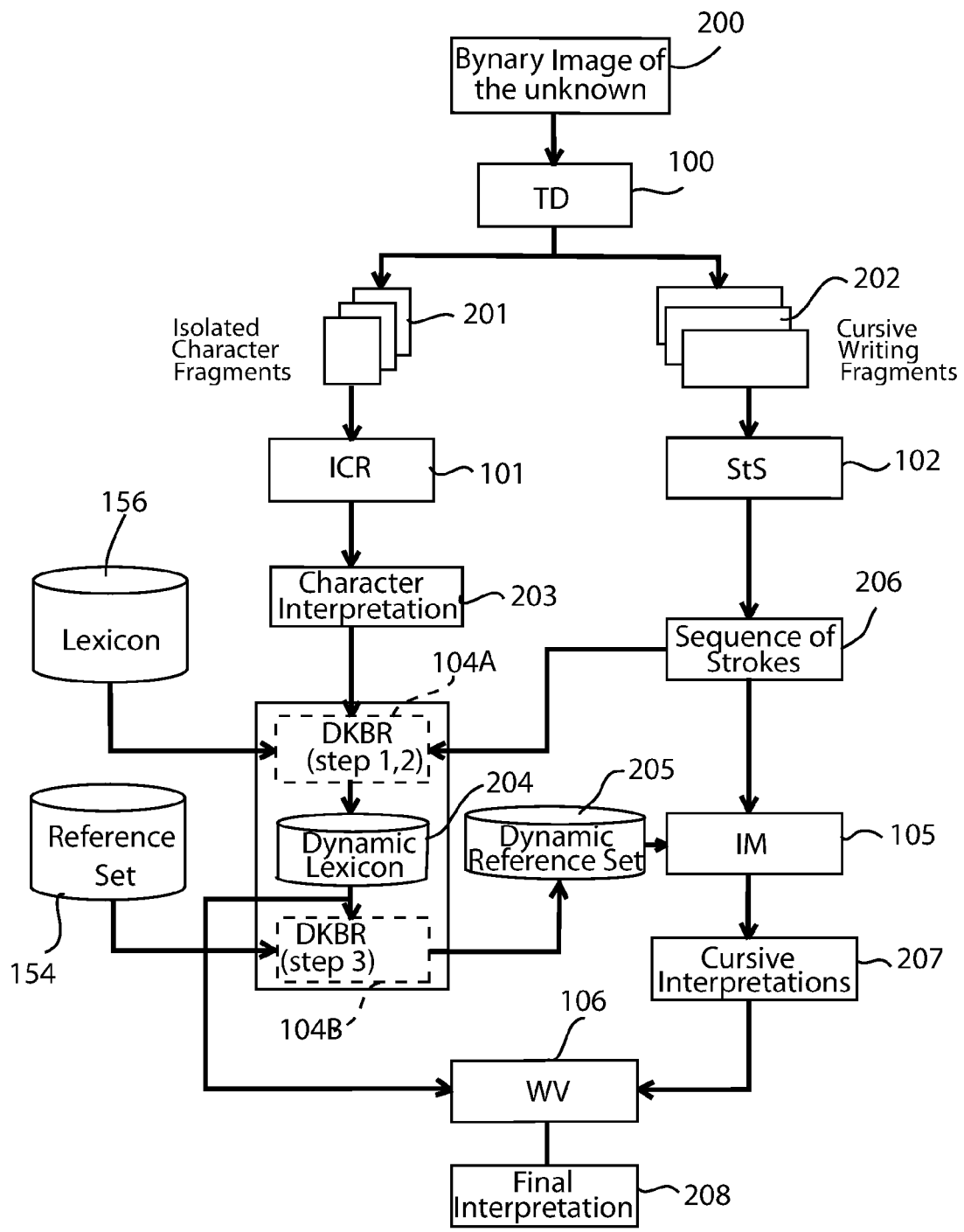
FIG. 2 shows a schematic block diagram of the preferred embodiment of the process according to the invention in a running mode.
Figure 4:
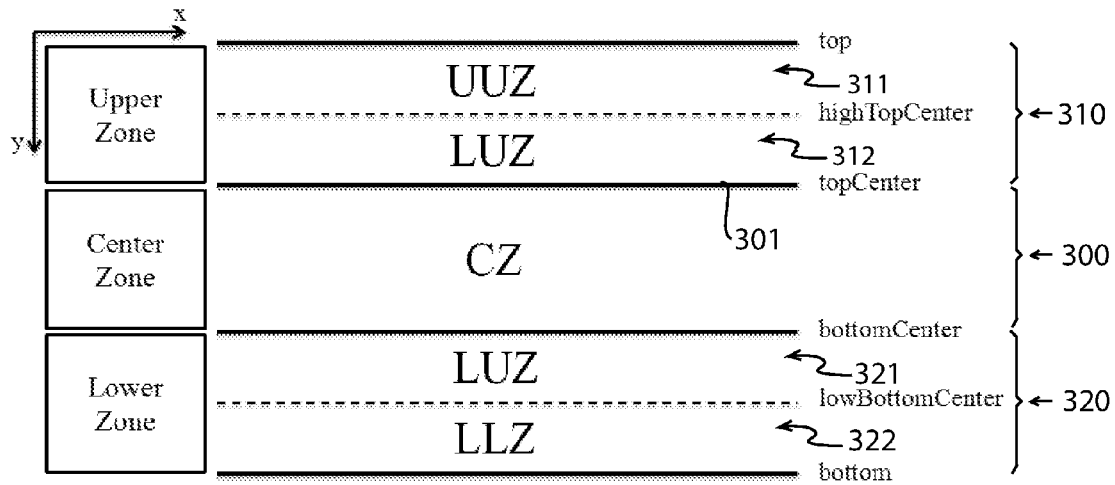
Figure 5:
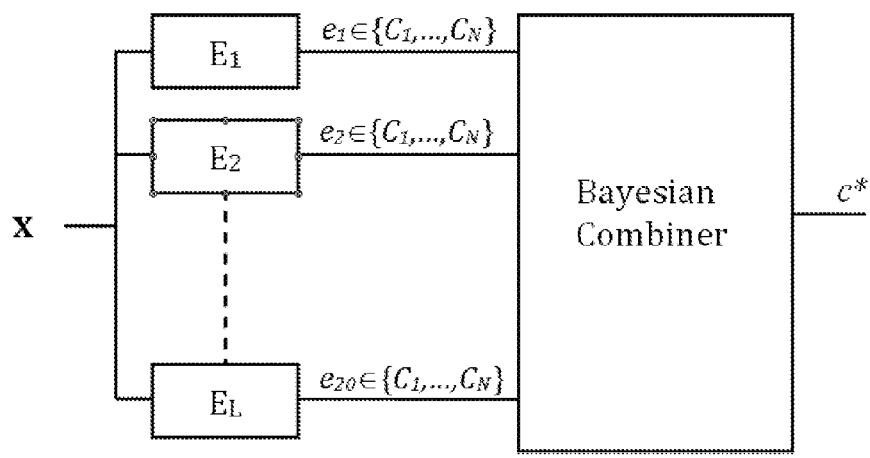
Figure 6:
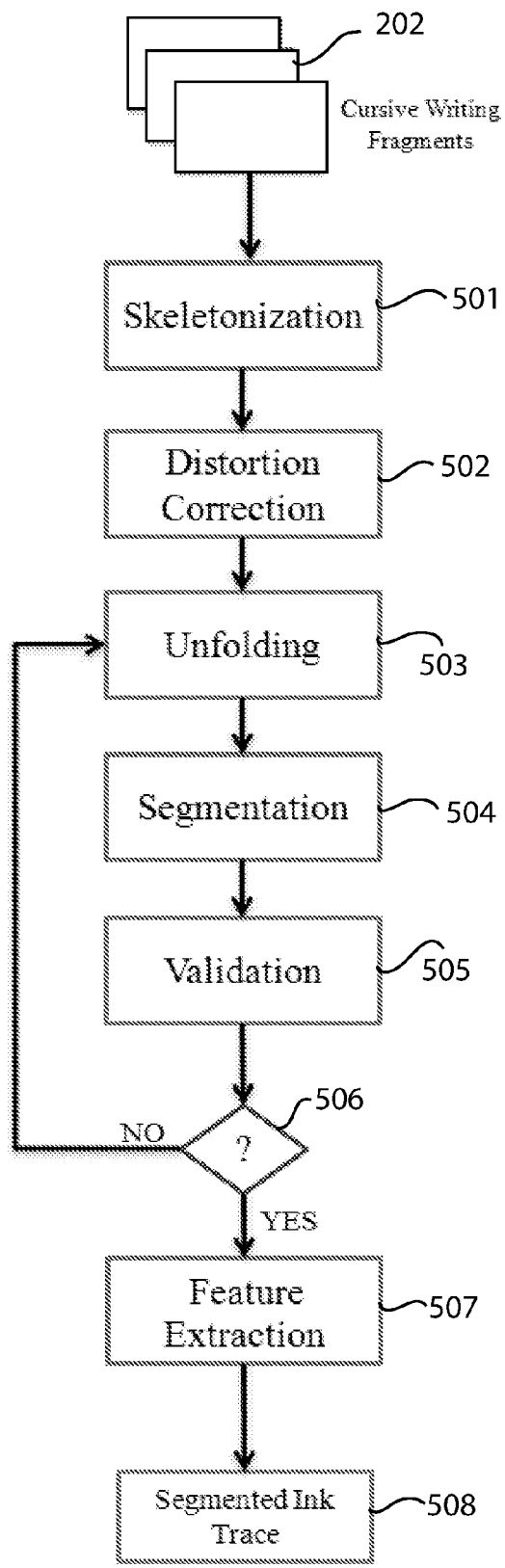
Figure 7:
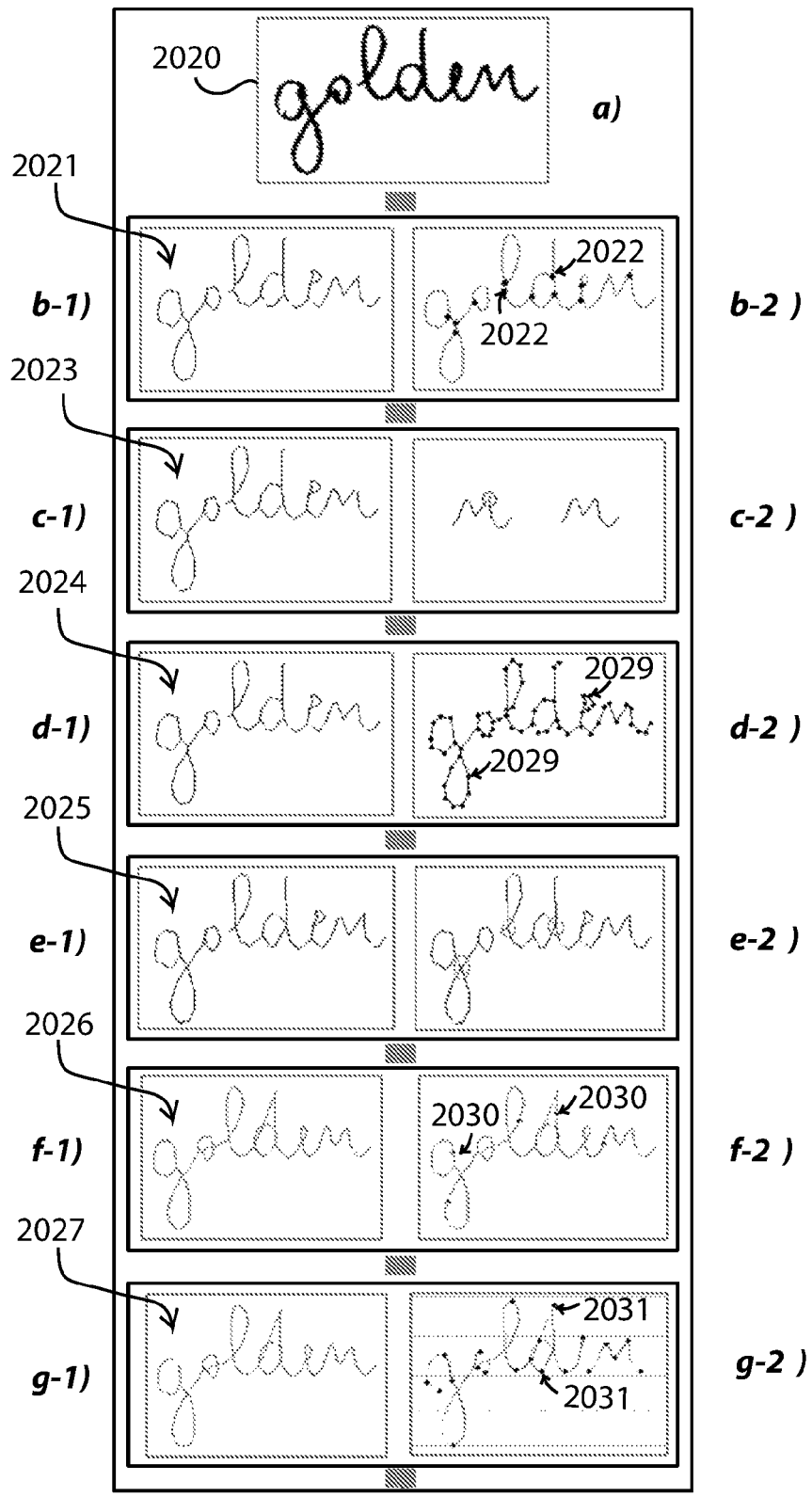
Figure 8:
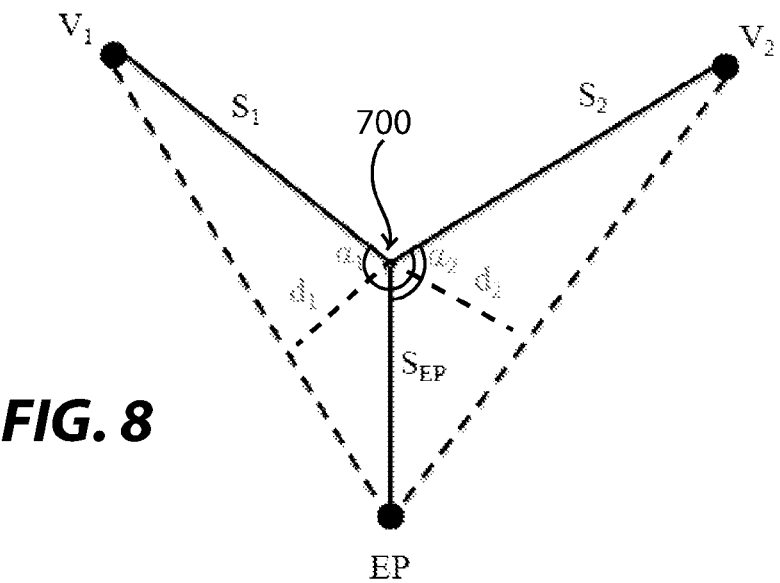
Figure 9:
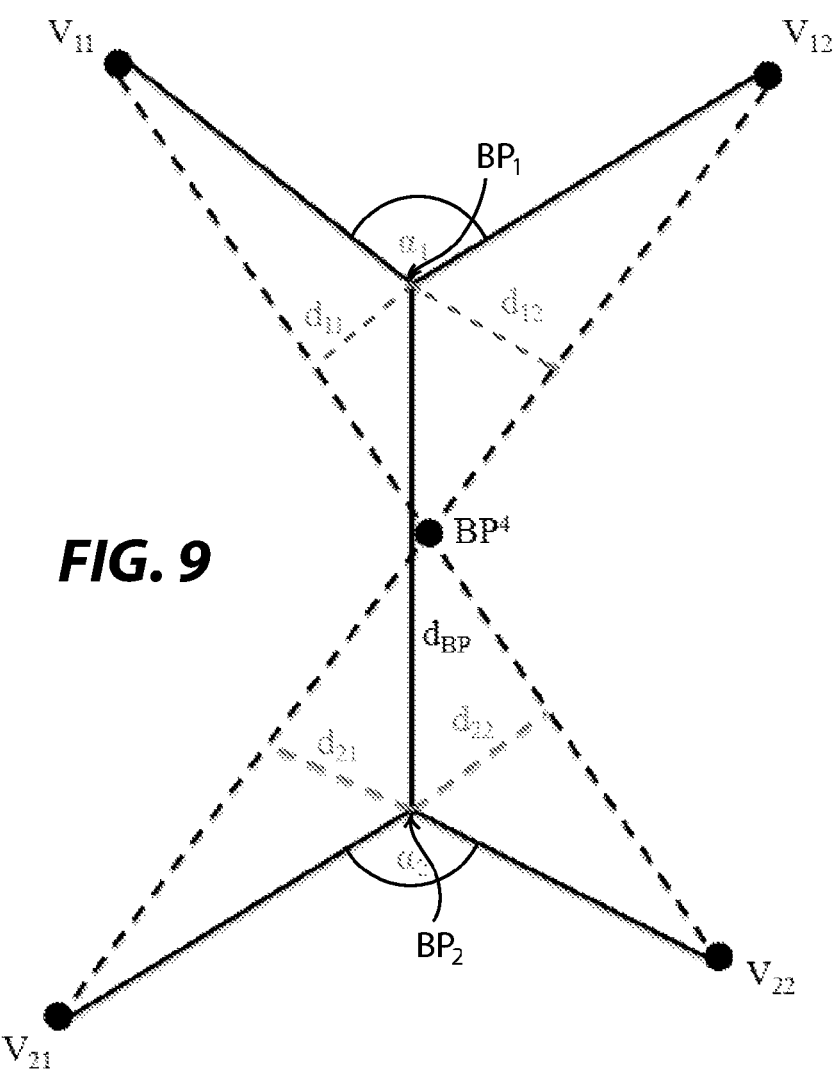
Figure 10:
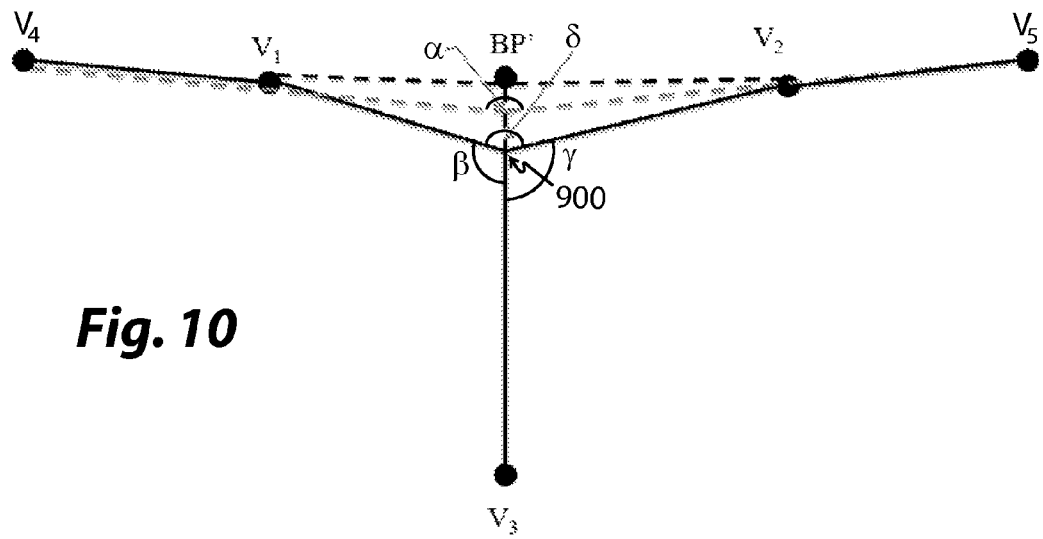
Figure 19:
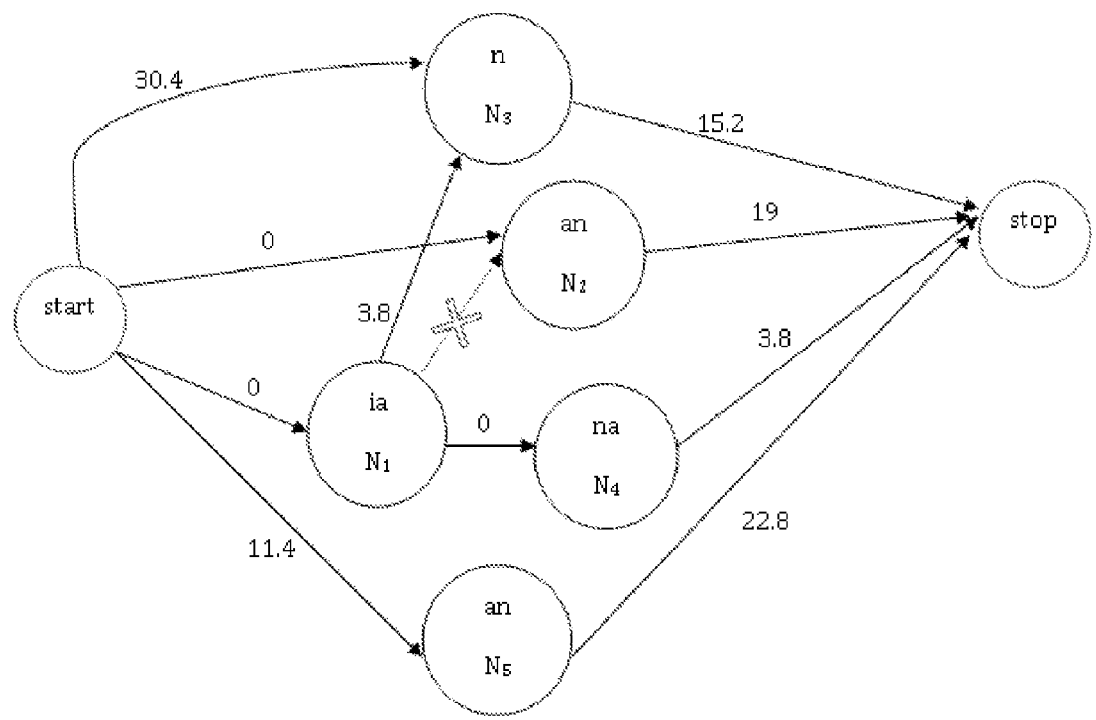
Figure 11:
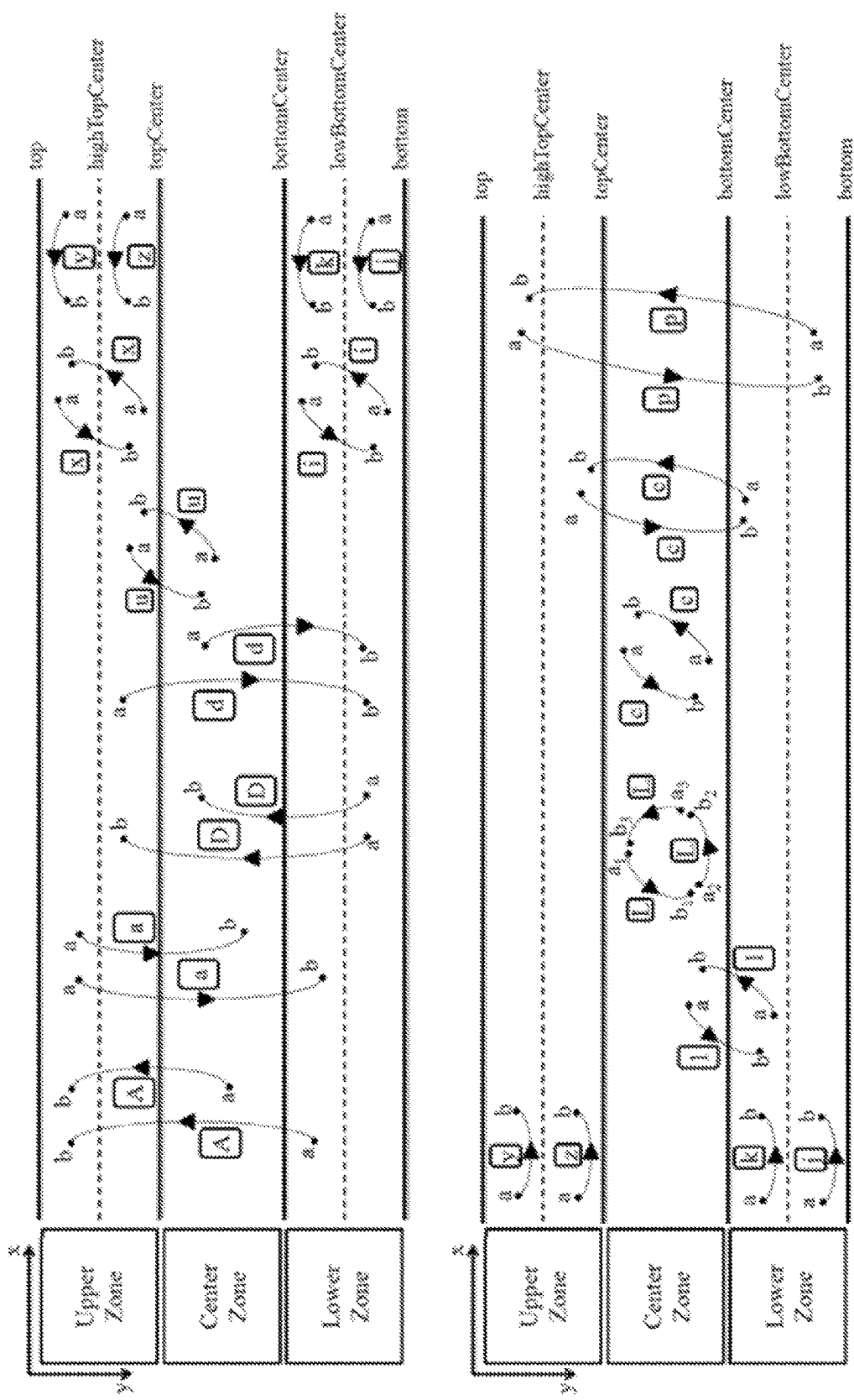
Figure 12:
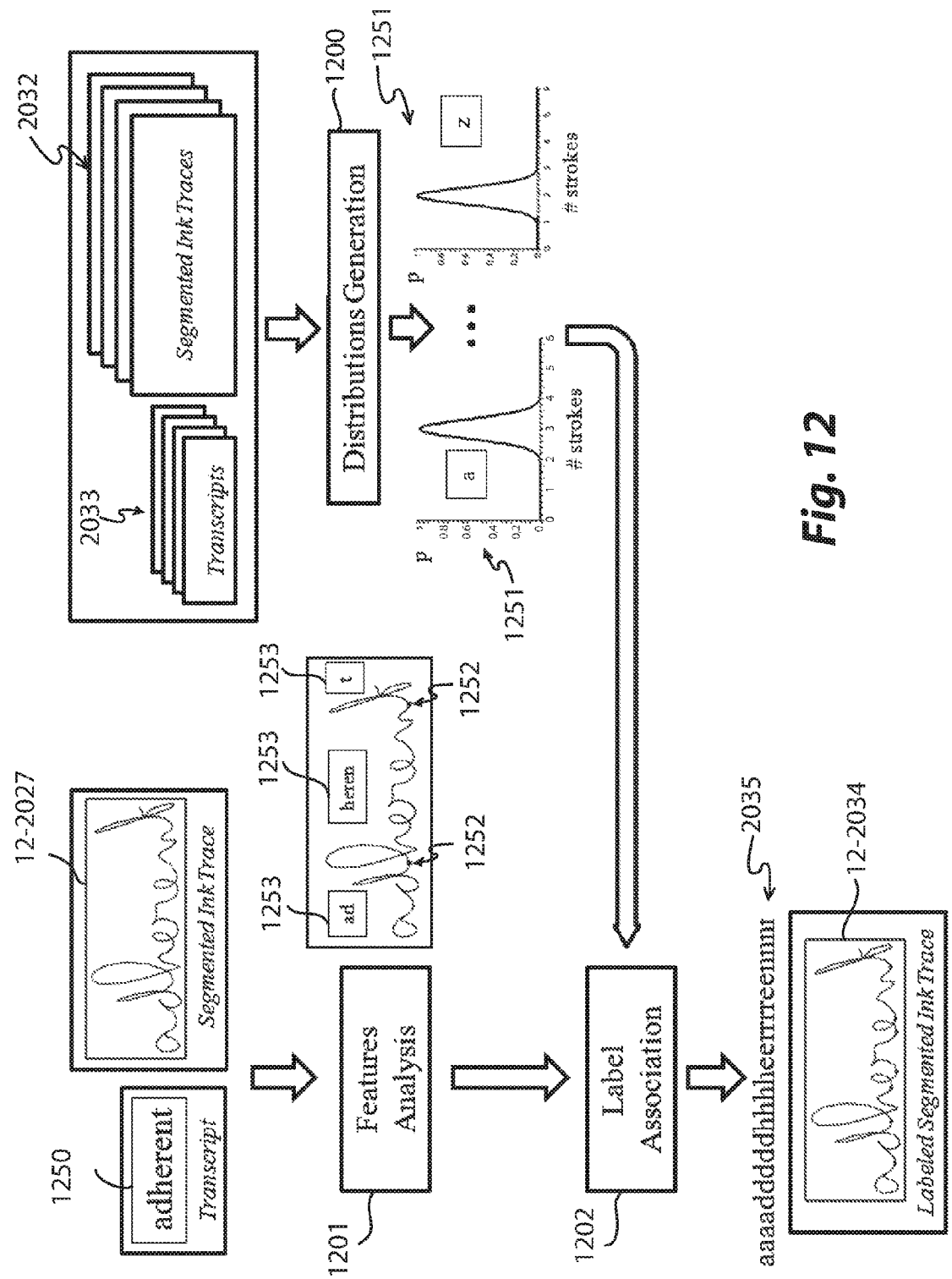
Figure 13:
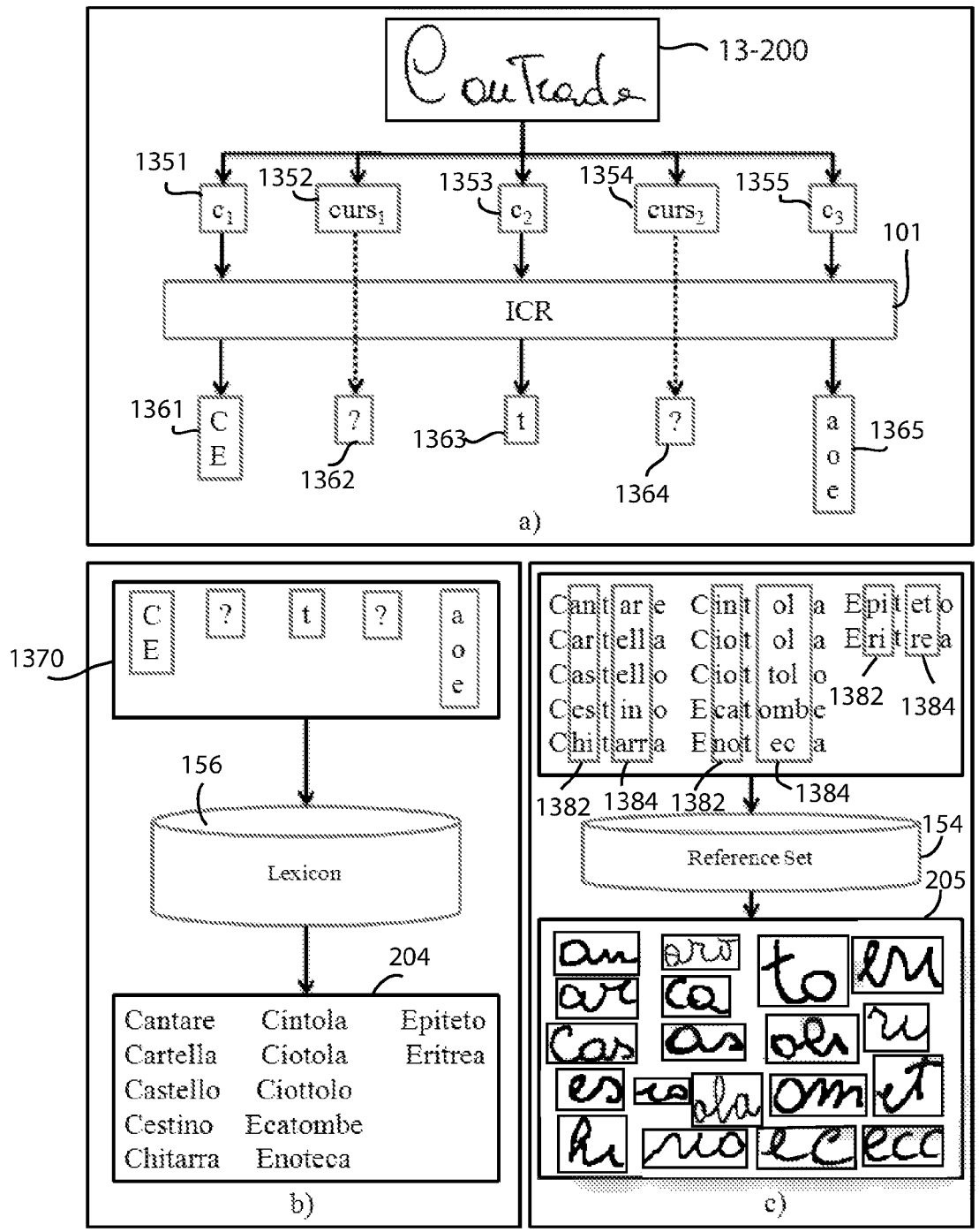
Figure 15:
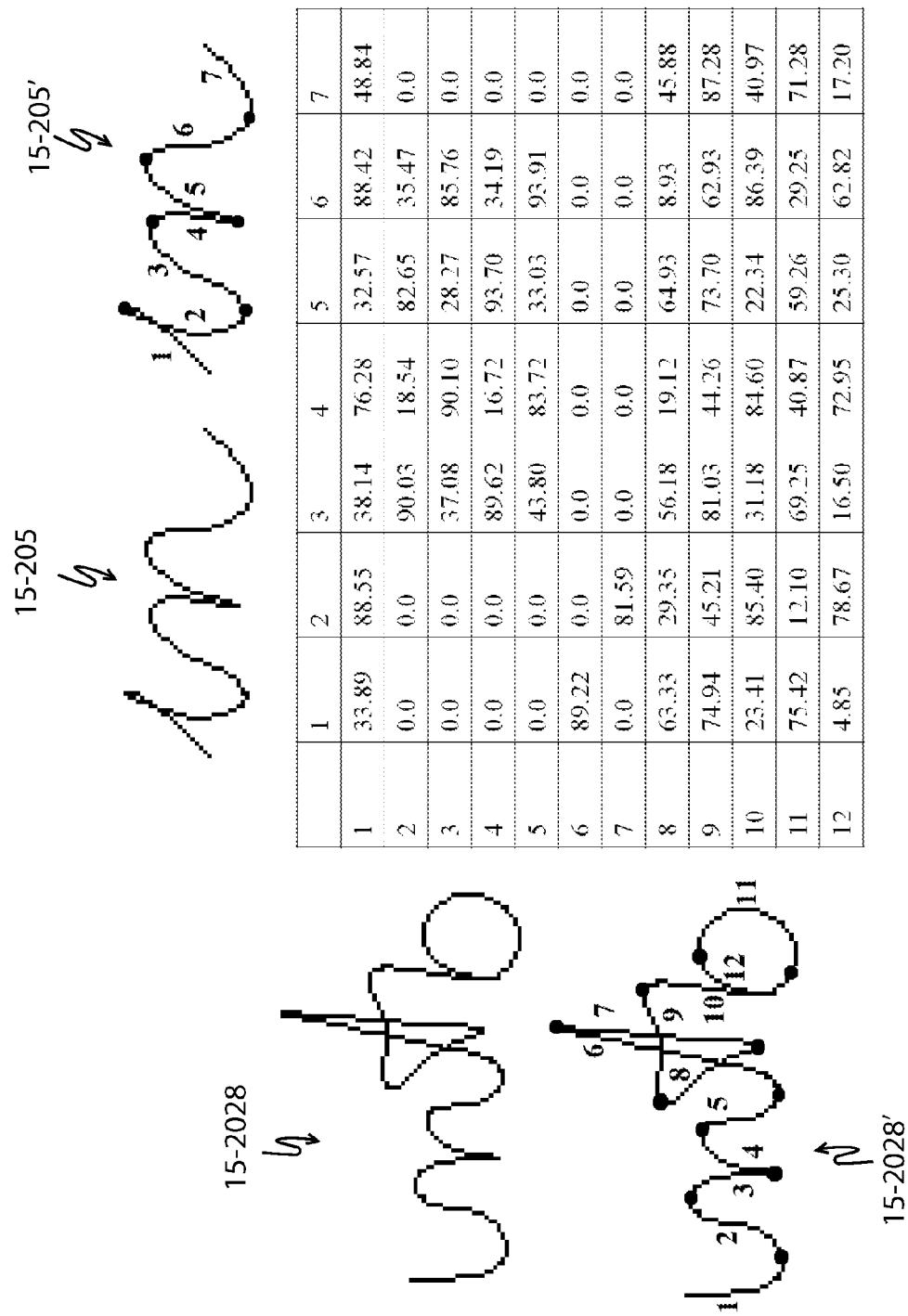
Figures 16, 17:
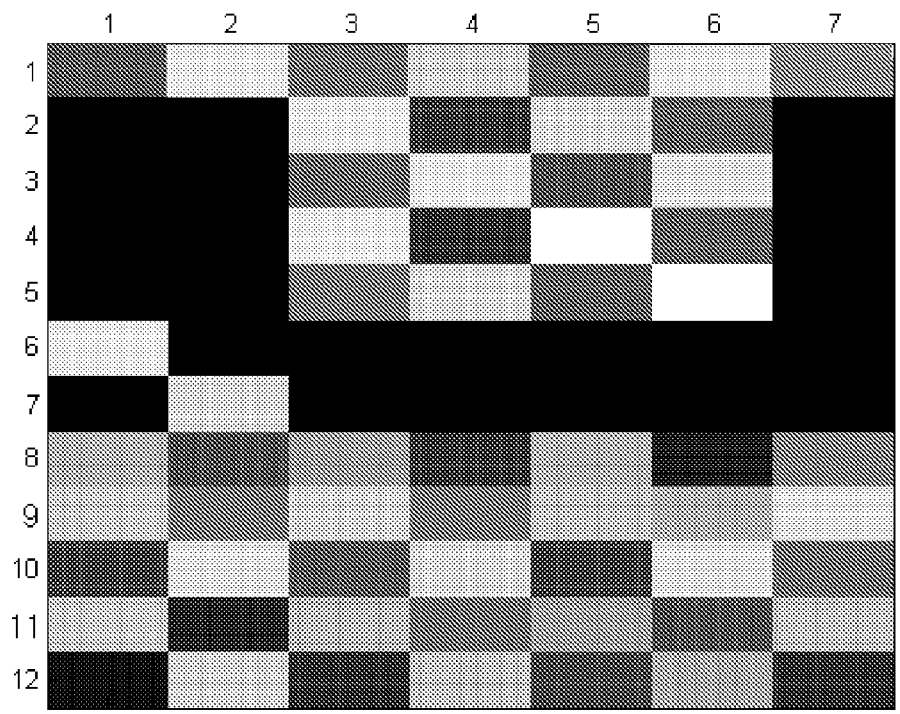
Figure 20:
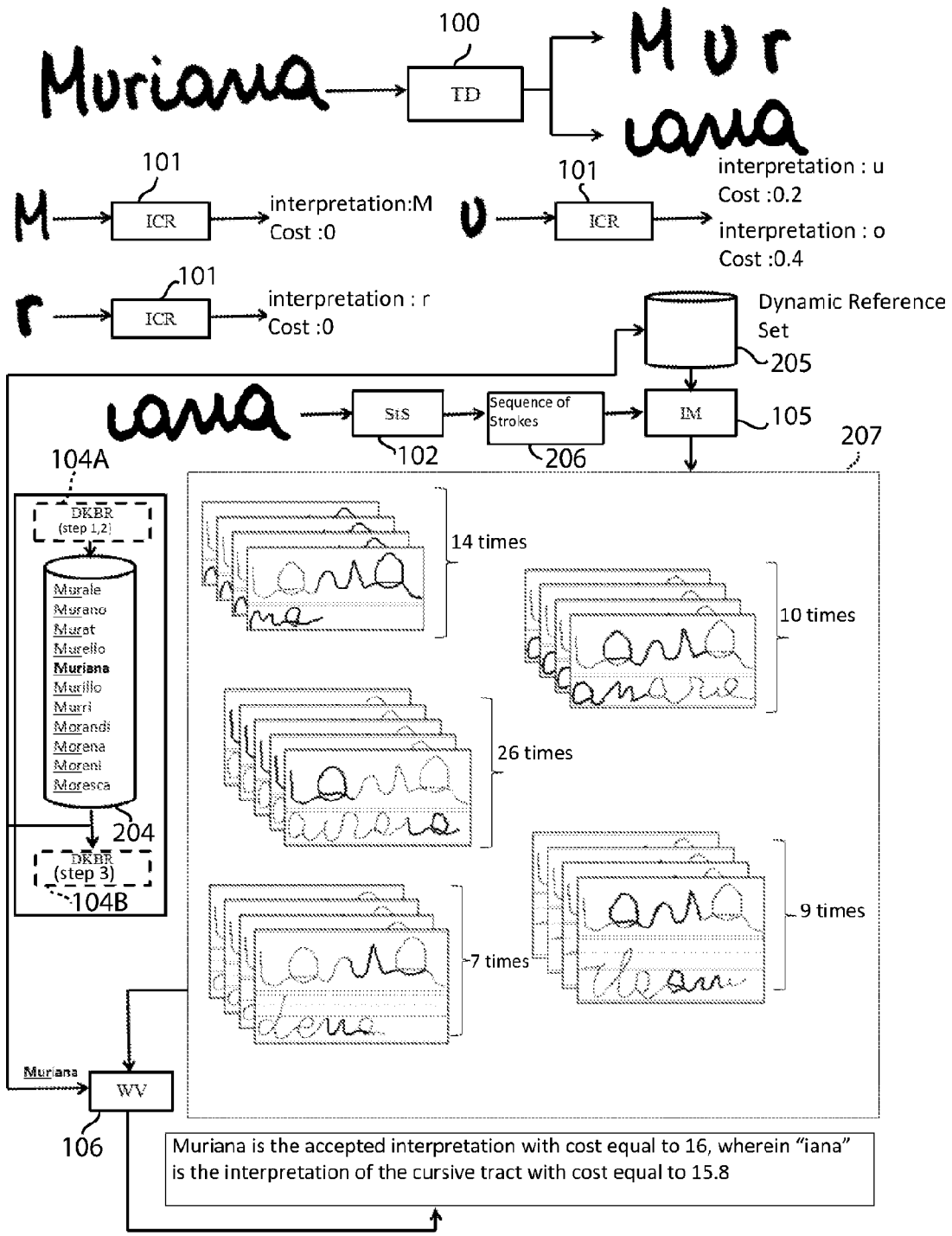

FIG. 4 schematically shows the boundaries of the handwriting zones in the image of a word which are estimated in a first operation executed by the process of FIGS. 1 and 2;

FIG. 5 schematically shows a functional subunit of a second operation executed by the process of FIGS. 1 and 2;

FIG. 6 shows a schematic block diagram of a third operation executed by the process of FIGS. 1 and 2;

FIG. 7 shows some processing steps carried out by the third operation of FIG. 6 in a second example of application;

FIG. 8 schematically shows the correction of a first type of distortion carried out by the third operation of FIG. 6;

FIG. 9 schematically shows the correction of a second type of distortion carried out by the third operation of FIG. 6;

FIG. 10 schematically shows the correction of a third type of distortion carried out by the third operation of FIG. 6;

FIG. 11 schematically shows stroke samples and the distinctive features assigned to them in the third operation of FIG. 6;

FIG. 12 shows a schematic block diagram of execution of a fourth operation executed in configuration mode by the process of FIG. 1 in a third example of application;

FIG. 13 shows processing steps carried out by the first operation and by a fourth operation executed in running mode by the process of FIG. 2 in a fourth example of application;

FIG. 14 shows first processing results obtained by a fifth operation executed by the process of FIG. 2 in a fifth example of application;

FIG. 15 shows second processing results obtained by the fifth operation executed by the process of FIG. 2 in a sixth example of application;

FIG. 16 shows third processing results obtained by the fifth operation executed by the process of FIG. 2 in the sixth example of application;

FIG. 17 shows fourth processing results obtained by the fifth operation executed by the process of FIG. 2 in the sixth example of application;

FIG. 18 shows first processing results obtained by a sixth operation executed by the process of FIG. 2 in a seventh example of application;

FIG. 19 shows second processing results obtained by the sixth operation executed by the process of FIG. 2 in the seventh example of application; and FIG. 20 shows a schematic block diagram of execution of the process of FIG. 2 in an eighth example of application.

In the Figures identical reference numerals will be used for alike elements.

In the following of the present description and in the claims, the terms "trace" and "cursive trace" mean the set of pixels which may be considered as ink signs in the image of handwriting of an entire word (i.e., in case of writing with black ink on white paper, the set of black pixels of the image), and the terms "tract" and "cursive tract" mean the set of pixels may be considered as ink signs in the portion of image of handwriting related to a part of the entire word separated from all the other ones.

In the following, reference will be made to a handwriting through black traces on white background. However, it should be understood that the process according to the invention may be applied to any combination of colours for writing and background, e.g. blue or red traces on white or gray or yellow background or white traces on black background, still remaining within the scope of protection as defined by the attached claims.

From a general point of view, the preferred embodiment of the process according to the invention assumes as input the digital image of a trace corresponding to an unknown word to recognize and it provides as output a string of characters constituting its interpretation, which string of characters is selected from those included in a lexicon, or a special character indicating that no interpretation has been found among those included in the lexicon. To properly perform its functions, the process according to the invention needs the lexicon (Lexicon), comprising a list of possible interpretations of the unknown words of the application, and of a setting set (Setup Set) comprising a collection of handwritten traces and their transcript (through a string of characters). The traces of the Setup Set do not necessarily represent handwritten samples (in the following also called instances) of entire words of the Lexicon; however, both the Setup Set and Lexicon set refer to the same alphabet and, optionally, to the same language.

The preferred embodiment of the process according to the invention comprises the following functional units (i.e. operations executed by the process):
- a unit of decomposition of traces (in the following also denoted as TD—Trace Decomposition—unit);
- a unit of recognition of isolated characters (in the following also denoted as ICR—Isolated Character Recognition—unit);
- a unit of segmentation into strokes (in the following also denoted as StS—Stroke Segmentation—unit);
- a unit of labelling the strokes (in the following also denoted as StL—Stroke Labeling—unit);
- a unit of dynamic reduction of the knowledge base (in the following also denoted as DKBR—Dynamic Knowledge Base Reduction—unit);
- a unit of comparison of inks (in the following also denoted as IM—Ink Matching—unit); and
- a unit of validation of interpretations (in the following also denoted as WV—Word Validation—unit).

The process according to the invention has two operation modes: a configuration mode, schematically shown in FIG. 1 for the preferred embodiment, and a running mode, schematically shown in FIG. 2 for the preferred embodiment.

Making reference to FIG. 1, it may be observed that, in configuration mode, the TD functional unit 100 extracts from the images of the Setup Set 150 the image fragments, i.e. the image portions corresponding to different tracts which are possibly present, and it classifies them as containing an isolated character or a portion of cursive writing. The image fragments classified as isolated characters form the training set of characters, in the following also denoted as Character Training Set or Char_TS, in FIG. 1 indicated with the reference numeral 151; the image fragments classified as portions of cursive writing form the cursive training set, in the following also denoted as Cursive Training Set or CW_TS, in FIG. 1 indicated with the reference numeral 152.

The fragments of the Character Training Set 151 are used by the ICR functional unit 101 for training a classification engine 155 based on neural networks that is then used in the running mode.

Each fragment of the Cursive Training Set 152 is passed to the StS functional unit 102 that segments the portion of cursive writing into a stroke sequence 153. The StL unit 103 associates to each stroke sequence 153 its transcript, such that each stroke is associated to the character of the transcript to which it belongs. The collection of stroke sequences 153 and their labels (i.e. the character corresponding to the transcript to which it belongs) form a set 154 of reference (Reference Set) that is used in the running mode.

Making reference to FIG. 2, it may be observed that, in the running mode, the TD functional unit 100 extracts image fragments from an image 200 of an unknown word and it classifies them as seen above (i.e. as isolated characters or alternatively as portions of cursive writing). The fragments 201 classified as isolated characters are passed to the ICR functional unit 101, while the fragments 202 classified as portions of cursive writing are passed to the StS functional unit 102 that segments the portion of cursive writing of the fragment 202 into a stroke sequence 206. The so-obtained sequences 206 are passed to both the DKBR functional unit (in FIG. 2 represented through two blocks indicated with the reference numerals 104A, for the execution of a first part of steps, and 104B, for the execution of a successive part of steps) and the IM functional unit 105.

The ICR functional unit 101 executes the classification of the fragments 201 and outputs a list 203 of interpretations for each fragment and a parameter indicative of a classification cost (that will be better described later) for each interpretation.

The DKBR functional unit 104A-104B receives as input the list 203 of interpretation-cost pairs provided by the ICR functional unit 101, the stroke sequences 206 provided by the StS functional unit 102, the relative position of each fragment 201 within the word image 200 as calculated by the TD functional unit 100 and it outputs:
- also on the basis of the Lexicon 156, a Dynamic Lexicon 204, i.e. a list of possible interpretations for the unknown word, that is a subset of the words included in the Lexicon 156 containing in the positions corresponding to the fragments classified as isolated characters one of the interpretations contained in the list 203, with the costs associated to such interpretations, and
- also on the basis of the Reference Set 154 and Dynamic Lexicon 204, a Dynamic Reference Set 205, i.e. a list of the ink tracts the transcripts of which, at least partially, correspond to the character sequences of the interpretations included in the Dynamic Lexicon 204 (which character sequences do not include the interpretations 203 of the fragments 201 classified as isolated characters).

The IM functional unit 105 compares the stroke sequence 206 provided by the StS functional unit 102 with the sequences included in the Dynamic Reference Set 205, and, in the case where a set of matching criteria is satisfied, it provides as cursive interpretation 207 for the stroke sequence 206 the transcript of the matching stroke sequences of the Dynamic Reference Set 205 and its cost. After the execution of the matching, there may be unmatched stroke sequences of the fragments 202, i.e. stroke sequences 206 of fragments which does not match any sequence included in the Dynamic Reference Set 205, and/or overlapping sequences, i.e. stroke sequences 206 of fragments 202 which matches a plurality of sequences included in the Dynamic Reference Set 205 with different transcripts.

Finally, the WV functional unit 106 computes the total cost associated to each element in the Dynamic Lexicon 204 for which one or more cursive interpretations 207 for its fragments 201-202 have been found, by combining the costs associated to its fragments 201-202 and the costs for unmatched and/or overlapping stroke sequences, and it provides as final output the top ranking interpretation 208 or it rejects the unknown word in the case where the total cost of such interpretation is larger than a threshold.

Figure 3:
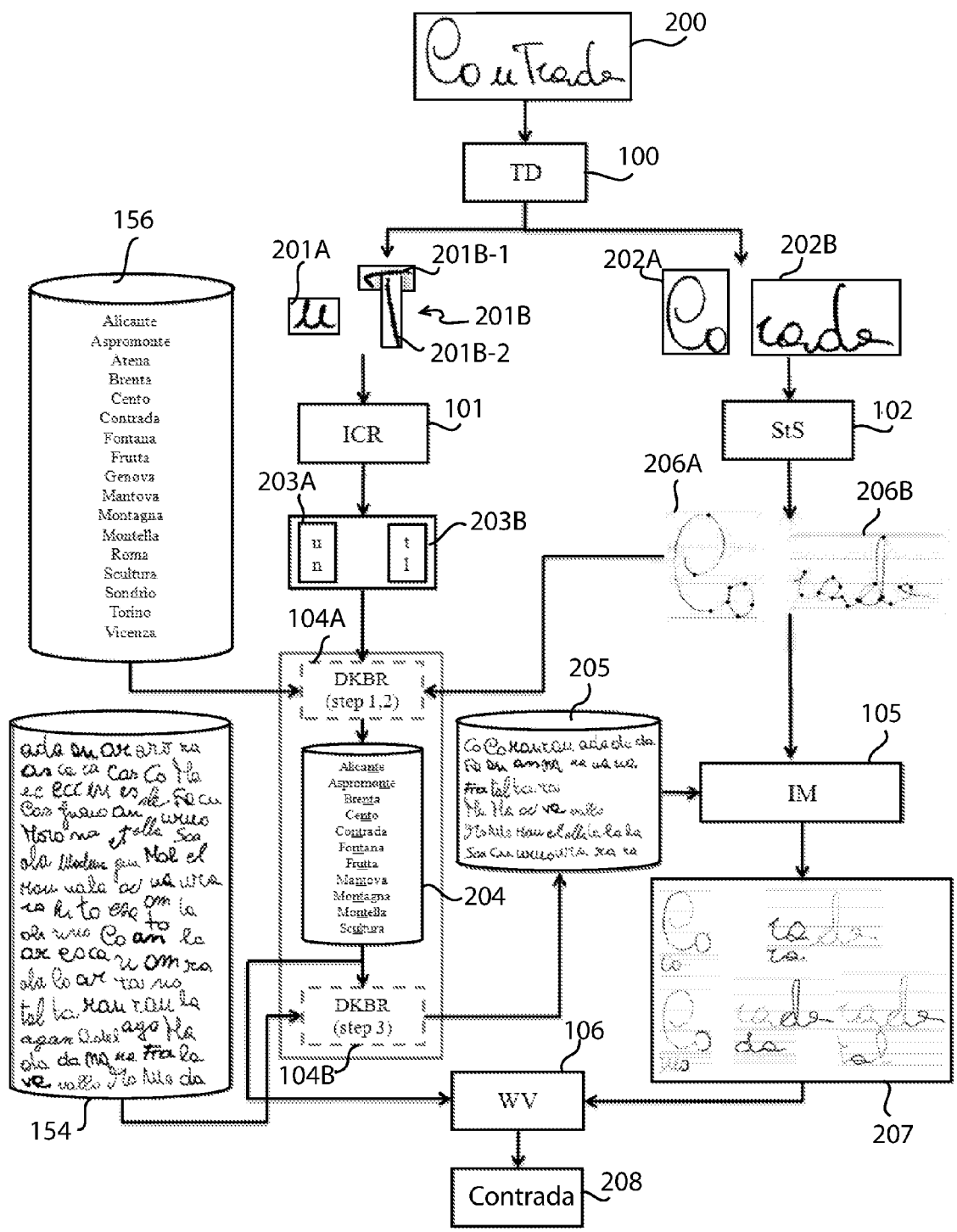
FIG. 3 shows a schematic block diagram of execution of the process of FIG. 2 in a first example of application.

FIG. 3 shows an example of execution of the whole process of FIG. 2, that is immediately comprehensible to those skilled in the art in light of what has been illustrated above. In particular, the recognition of an image 200 of an unknown handwritten word (corresponding to the Italian word "Contrada" included in the Lexicon 156) is shown. The TD functional unit 100 extracts from the image 200 a first fragment 202A classified as portion of cursive writing (corresponding to "Co"), a second fragment 201A classified as isolated character (corresponding to "n"), a third fragment 201B classified as isolated character (corresponding to "t"), and a fourth fragment 202B classified as portion of cursive writing (corresponding to "rada"). The ICR functional unit 101 outputs a list 203A of two interpretations for the fragment 201A, comprising the characters "u" and "n", and a list 203B of two interpretations for the fragment 201B, comprising the characters "t" and "l"; as stated, a parameter indicative of a classification cost is associated to each interpretation. The StS functional unit 102 executes the segmentation of the portions of cursive writing of the two fragments 202A and 202B into two stroke sequences 206A and 206B (in FIG. 3, the strokes are separated from each other by dots along the respective portion of cursive writing). The DKBR functional unit 104A-104B receives as input the lists 203A and 203B, the stroke sequences 206A and 206B, the relative position of each fragment 201A and 201B classified as isolated character within the image 200 of the unknown word, and it provides as output:

- on the basis of the Lexicon 156, a Dynamic Lexicon 204 formed by the list of possible interpretations for the unknown word on the basis of the interpretations of the lists 203A and 203B (with the costs associated to such interpretations), and
- also on the basis of the Reference Set 154 and Dynamic Lexicon 204, a Dynamic Reference Set 205 formed by the set of the tracts the transcripts of which, at least partially, correspond to character sequences of the interpretations included in the Dynamic Lexicon 204 (which character sequences do not include the interpretations 203A and 203B of the fragments 201A and 201B classified as isolated characters).

The IM functional unit 105 then compares the stroke sequences 206A and 206B with the sequences included in the Dynamic Reference Set 205, and, in the case where a set of matching criteria is satisfied, provides as cursive interpretation 207 for the stroke sequences 206A and 206B the transcript of the matching stroke sequences of the Dynamic Reference Set 205 and their cost (in the example of FIG. 3, this cursive interpretation 207 comprises the substrings "Co", "Mo", "rada", "ra", "da", "tal". Finally, the WV functional unit 106 computes the total cost associated to each element in the Dynamic Lexicon 204 for which one or more interpretations 203A-203B for its fragments 201A-201B and one or more cursive interpretations 207 for its fragments 202A-202B have been found, by combining the associated costs, and provides as final output the top ranking interpretation 208 (in the case of FIG. 3 just corresponding to the word "Contrada").

In the following, the functional units of the preferred embodiment of the process according to the invention are described in greater detail.

As stated, the TD functional unit 100 extracts from a word image 200 the sub-images corresponding to the fragments for classifying them as fragments 201 of isolated characters or fragments 202 of portions of cursive writing. Due to both acquisition noise (that may artificially subdivide the original ink trace into pieces) and writing habits (that may lead the writer to lift the pen from the paper while writing), an isolated character as well as a portion of cursive writing may be segmented into a plurality of two or more pieces, which must be merged for reconstructing the original meaning. To this end, the sub-images corresponding to each piece are first extracted and for each one of them a set of features suitable to be used in the classification step are then computed. Preliminarily, the unit locates the central zone, the upper zone and the lower zone of the entire word. After the features have been computed, each piece is classified as portion of cursive writing, or isolated character, or vertical line, or horizontal line, or dot, or noise, or rejected writing, and then a set of heuristic rules (illustrated in detail later) are applied for the merging of two or more pieces for forming either an isolated character 201 or a fragment 202 of portion of cursive writing. By way of example, in FIG. 3, the third fragment 201B classified as isolated character is formed by a first piece 201B-1 corresponding to the substantially horizontal upper line of the "t" and by a second piece 201B-2 corresponding to the substantially vertical lower line of the "t".

In order to estimate the features of the fragments of ink tracts, the TD functional unit 100 proceeds as follows. First of all, the word image is processed for extracting the bounding box of each piece, i.e. of each set of connected black pixels. In the following such sets of pixels are called components. Afterwards, each component is analysed by considering its size, the number and the distribution of its black pixels and the size of the word to which the same component belongs. In particular, in the preferred embodiment of the process according to the invention, the TD functional unit 100 considers the Cartesian coordinates of the top-left vertices $(X_{min}, Y_{max})$ Y and bottom right vertices $(X_{max}, Y_{min})$ of the bounding box, the width $W_{comp}$ and the height $H_{comp}$ of the bounding box, the total number $P_{comp}$ of pixels and the number of black pixels $BP_{comp}$ included in the bounding box, the width W word and the height H the bounding box of the word. Starting $H_{word}$ of from these basic features, a further set of features is namely the height ratio HR:

$$HR = \frac{H_{comp}}{H_{word}}$$

the ratio AR between width $W_{comp}$ and height $H_{word}$ (also known with the term of aspect ratio):

$$AR = \frac{W_{comp}}{H_{comp}}$$

the proportional aspect ratio PAR:

$$PAR = \frac{W_{comp}}{H_{word}}$$

and the fill factor FF:

$$FF = \frac{BP_{comp}}{P_{comp}}$$

The features HR, AR and PAR are meant to capture the temporal extension of the handwriting, while the feature FF is meant to capture the spatial density of ink.

Moreover, in order to evaluate the shape complexity of the ink trace, the number of transitions between white pixels (belonging to the background) and black pixels (belonging to the writing) along consecutive rows and columns of the component are additional features of which the TD functional unit 100 takes account. In particular, (as described, e.g., by R. C. Gonzalez and R. E. Woods in "Digital Image Processing", Addison-Wesley, Reading, Mass., 1992) their values are arranged in two histograms, namely a histogram of the number of transitions per column on the horizontal axis and a histogram of the number of transitions per row on the vertical axis. On such histograms, a number of $\Delta_x$ (with $\Delta_x$ optionally equal to 2) consecutive columns and a group of $\Delta_y$ (with $\Delta_y$ optionally equal to 4) consecutive rows, respectively, are considered and the highest value among those which are present is stored, thus obtaining the vectors $IM_x$ and $IM_y$, each one of which has a number of elements equal to the ratio between the horizontal/vertical size of the matrix and the intervals $\Delta_x$ and $\Delta_y$, respectively. As stated, the features of the numbers of transitions between white and black pixels along consecutive rows and columns of the component provide a measurement of the complexity of the shape of the ink trace: an empty or flat ink-mark on both horizontal and vertical axes suggests that the component presents scattered black pixels and it is likely to be noise, while higher values correspond to more complex shapes.

Finally, the TD functional unit 100 estimates the position of the handwriting zones in the word image, by locating the set of horizontal lines corresponding to the upper and lower boundaries of each zone (e.g., as described by Gonzalez and Woods in the handbook cited above). Making reference to FIG. 4, the boundaries are determined by using the horizontal projections of black ink in the image: the central zone 300 represents the zone in which the largest amount of black pixels is present and its position is used for determining the position of the other zones, on the basis of the amount of black pixels that are above and/or below the central zone 300. In the case where an upper zone 310 (and/or a lower zone 320) is determined, it is subdivided into two further zones indicated as upper-upper zone 311 (lower-upper zone 321) and upper-lower zone 312 (lower-lower zone 322).

The rules designed for classifying the components are reported in Algorithm 1 in

---

Algorithm 1

If ( (FF ≥ NOISE_DOT_FF_MAX) OR (max($IM_X$) ≤ NOISE_IMx AND max($IM_Y$) ≤ NOISE_IMy)
   OR (BP < NOISE_DOT_BP AND HR < NOISE_DOT_HR AND PAR < NOISE_DOT_PAR
   AND AR < NOISE_DOT_AR AND NOISE_DOT_FF_MIN ≤ FF ≤ NOISE_DOT_FF_MAX AND
   $Y_{MAX}$ > $CZ_{Ymin}$ + OFFSET_CZ) ) then
      Component is "NOISE"
Else If (PAR < VL_PAR AND VL_FF_MIN < FF <VL_FF_MAX AND VL_AR_MIN ≤ AR <
   VL_AR_MAX) then
      Component is "VERTICAL LINE"
Else If (HR < HL_HR_MAX AND AR > HL_AR_MIN AND FF < HL_FF_MAX) then
      Component is "HORIZONTAL LINE"
Else If (BP < NOISE_DOT_BP AND HR < NOISE_DOT_HR AND PAR < NOISE_DOT_PAR
   AND AR < NOISE_DOT_AR AND NOISE_DOT_FF_MIN ≤ FF NOISE_DOT_FF_MAX AND
   $Y_{MAX}$ ≤ $CZ_{Ymin}$+ OFFSET_CZ) then
      Component is "DOT"
Else If ( ( (max($IM_y$) < IC_IMy OR (max($IM_y$) = IC_IMy AND $X_{MIN}$ < IC_Xmin) ) OR
   (max($IM_y$) = IC_IMy AND max($IM_X$) ≤ IC_IMx ) ) AND $Y_{MAX}$ > $CZ_{Ymin}$ + OFFSET_CZ) then
      If ( IC_W_MIN ≤ $W_{comp}$ ≤ IC_W_MAX AND IC_H_MIN ≤ $H_{comp}$ ≤ IC_H_MAX ) then
         Component is "CONFUSION"
      else
         Component is "ISOLATED CHARACTER"
Else If ( ( (max($IM_y$) > IC_IMy) OR (max($IM_y$) = IC_IMy AND max($IM_X$) ≥ C_IMx) ) AND
   $Y_{MAX}$ > $CZ_{Ymin}$ + OFFSET_CZ ) then
      If ( C_W_MIN ≤ $W_{comp}$ ≤ C_W_MAX AND C_H_MIN ≤ $H_{comp}$ ≤ C_H_MAX ) then
         Component is "CONFUSION"
      else
         Component is "CURSIVE"
Else
      Component is "REJECT"

--- pseudo-natural (English) language shown in the present description, wherein the classifications are defined as follows: NOISE is noise; VERTICAL LINE is a vertical line; HORIZONTAL LINE is a horizontal line; DOT is a dot; CONFUSION is confusion; ISOLATED CHARACTER is an isolated character; CURSIVE is a portion of cursive writing; and REJECT is a rejection of the fragment. In particular, the names assigned to each threshold indicate the class (or the classes) the classification rules of which use the threshold and the feature to which the threshold is applied. For instance, the threshold NOISE_DOT_FF_MIN is used in the classification rules for the noise (NOISE) and dot (DOT) classes, it is applied to the feature FF and it is used as minimum value (MIN). The only exception to these guidelines for reading Algorithm 1 is the threshold OFFSET_CZ, that represents the maximum allowable offset between the position of the lower limit of the box delimiting the fragment and the line of upper delimitation of the central zone 301 of FIG. 4, the coordinate of which on the vertical axis is called $CZ_{Ymin}$; such threshold OFFSET_CZ is used for establishing whether the fragment is completely over the central zone.

After the classification, the merging rules reported in Algorithm 2 in pseudo-natural language shown later are applied to components classified as dots, horizontal and vertical lines, in order to group them together or with an isolated character and with a portion of cursive writing. Possibly, components classified as confusion are sent to both the ICR functional unit 101 and the StS functional unit 102, while components classified as rejections are ignored in successive processing.

of fragments included in the set Char_TS 151 of FIG. 1 are described by using the two feature sets just illustrated, thus obtaining two training sets, denoted as training set Char_TS_CGM and training set Char_TS_MBI.

---

Algorithm 2

---

If a dot is the closest fragment to a vertical line then
  The two components are merged in a new isolated character having "i" as interpretation and 0 as cost.
If the bounding boxes of a dot (Dot) and of an isolated character (I.C.) satisfy the relation
$(X_{min_{Dot}} \geq X_{min_{I.C.}})$ AND $(X_{max_{Dot}} \leq X_{max_{I.C.}})$ then
  the isolated character is sent to the ICR functional unit 101 and it has "i" as interpretation and 0 as cost.
If a horizontal line is located between or immediately to the left of two vertical lines then
  The three components are merged to form both a new isolated character and a new portion of cursive writing, that receives "ti" and "tt" as possible interpretations.
If a horizontal line is the closest component to a vertical line then
  The two components are merged in a new isolated character.
If the bounding box of an isolated character and the bounding box of a horizontal line satisfy the relation
$(X_{min_{I.C.}} \geq X_{min_{H.L.}})$ AND $(X_{max_{I.C.}} \leq X_{max_{H.L.}})$ AND $(Y_{min_{I.C.}} \geq Y_{min_{H.L.}})$ then
  The two components are merged in a new isolated character.
If a vertical line is located immediately to the left of a rejection placed over the central zone
then
  The two components are merged in a new isolated character.
If a vertical line is not merged with other components then
  The vertical line is converted into an isolated character with possible interpretations: "i", "I", "l" and 0 as cost.
If the bounding boxes of two isolated characters overlap at least for 50% of their areas then
  The two components are merged in a new isolated character.

---

As stated with reference to FIG. 2, the ICR functional unit 101 receives as input the binary digital image of fragments 201 containing an isolated character, that may be also formed by a plurality of components, and it provides as output the list 203 of interpretations and the classification cost for each interpretation. The ICR unit 101 is composed of three functional subunits: a first subunit of description of the fragments 201, a second subunit of multi-expert classification, and a third subunit of combination of the results.

The first functional subunit of description of the fragments 201 associates to the binary digital image of each fragment 201 a feature vector containing the representation of that fragment, that will be used by the second subunit of classification. In this regard, the preferred embodiment of the process according to the invention takes account of two different feature sets, namely the Central Geometrical Moments (CGM) of the binary images up to the 7th order (e.g., described by Gonzalez and Woods in the handbook cited above), and the mean of the pixels belonging to the disjoint sub-images of 8×8 pixels size that may be extracted from the binary image (MBI: Mean of Binary Image, i.e. the mean of the values of the image pixels, wherein the value of black pixels is equal to 1 and the value of white pixels is equal to 0). Hence, each fragment 201 to classify is described by means of two feature vectors: the first vector contains 33 real values, while the second vector is composed of at most 64 real values (it is assumed that an image containing an entire character, known as bitmap, has maximum size equal to 64×64 pixels). The images of the samples In the second subunit of multi-expert classification, that makes use of neural networks, unknown fragments 201 are classified through an ensemble of experts. In particular, the preferred embodiment of the process according to the invention takes account of 20 experts, obtained by using as classification scheme a feed-forward-type neural network, trained with the back-propagation algorithm (back-propagation). The first 10 experts are trained by using the training set Char_TS_CGM with different random initialisation of the network parameters. Similarly, the other 10 experts are obtained by using the training set Char_TS_MBI.

The third subunit of combination of the results receives as input the responses provided by the ensemble of experts for a given fragment 201 and it provides as output the list of interpretations for such fragment, together with the cost for each interpretation. The inventors have developed such third subunit by reformulating the problem of the combination of the classifiers (i.e. of the experts) as a problem of recognition of shapes (also known as "pattern recognition"), wherein the shape (i.e. the pattern) represents collective behavior of the experts when classifying a fragment 201. In this way, the collective behavior of the experts is represented by the set of labels provided by the experts when classifying that fragment 201, and the dependencies among the experts are modelled by estimating the joint probability distributions among the outputs of the classifiers and the true class. The inventors have developed the third subunit of combination of the results by using a Bayesian Network for automatically inferring the probability distribution for each class, and by defining a new weighted majority vote rule, that uses the joint probabilities as weights, for combining the classifier outputs. The final decision is made by taking into account both the votes received by each class and the statistical behavior of the classifiers.

The architecture of the third subunit of combination of the results is shown in FIG. 5: the responses $\{e_1, \ldots, e_L\}$ provided by the set of L experts $E=\{E_1, \ldots, E_L\}$ for an unknown input fragment x in a N class problem constitute the input to the third subunit of combination of the results, that provides the final classification result c*.

The third subunit of combination of the results may be defined as a higher level classifier that works on a L-dimensional discrete-values feature space. The combiner uses a supervised learning strategy, which consists in observing both the responses $\{e_1, \ldots, e_L\}$ and the "true" class c for each fragment of the training set, in order to compute the joint probability $p(c, e_1, \ldots, e_L)$.

Once this joint probability has been learned from a set of training data, the combiner classifies unknown fragments 201 by using a weighted voting strategy. In particular, the combiner computes the class c* of the unknown fragment x by using the formula:

$$c^* = \max_{k \in C} \sum_k w_k r_{i,k} \qquad (1)$$

where $r_{i,k}$ is a function the value of which is 1 when the classifier $E_i$ classifies the unknown fragment x as belonging to the class k, and 0 otherwise, while $w_k$ represents the weight related to the k-th class and it has been set equal to the joint probability:

$$w_k = p(c=k, e_1, \ldots, e_L) \qquad (2)$$

A high value for the weight $w_k$ means that the set of responses $\{e_1, \ldots, e_L\}$ provided by the experts is very frequent in the training set in correspondence with the class k.

A Bayesian Network (in the following also indicated as BN) is used for learning the joint probabilities. This choice is motivated by the fact that the BN provides a natural and compact way to encode exponentially sized joint probability distributions (through the Direct Acyclic Graph structure—in the following also indicated as DAG) and it allows to learn causal relationships, and hence to gain understanding about complex problem domains. In order to implement this mathematical tool into an application the definition of both the network structure (DAG) and the related conditional probabilities is necessary. This can be achieved by using learning algorithms which are capable to derive them from training fragments. The learning algorithm alternates between two phases: a first phase, called structural learning, is aimed at capturing the relation between the variables e and hence the structure of the dependencies in the DAG. A second phase, called parameter learning, evaluates the conditional probability parameters between variables.

For both the structural learning and the parameter learning the inventors have followed the guidelines described by D. Heckerman, D. Geiger and D. Chickering in "Learning Bayesian networks: The combination of knowledge and statistical data", Machine Learning, 20, 1995, pp. 197-243, in order to reduce the computational cost: according to such guidelines, the inventors have implemented a sub-optimal algorithm, that solves the two problems separately: such sub-optimal algorithm learns the DAG structure first and it then computes the parameter for such a structure.

When there are more classes exhibiting similar values for the product $w_k r_{i,k}$, the combiner does not provide a single class as result, but rather the list of the most likely interpretations. In practice, when the difference between the best interpretation according to formula (1) and the second best interpretation is lower than a threshold θ (the value of which has been experimentally set), the combiner also introduces this interpretation in the list provided as output. The same consideration is repeated for the second best and the third best and so on. Finally, a cost, represented by the product $w_k r_{i,k}$, is associated to each interpretation in the output list.

As previously illustrated, the StS functional unit 102 of segmentation of the strokes decomposes the tract (or the trace) contained in a fragment 202 of portion of cursive writing into a sequence of elementary movements (called strokes). To this end, as shown in FIG. 6, the StS functional unit 102 comprises five initial functional subunits: a first subunit 501 of skeletonisation, a second subunit 502 of correction of the distortion introduced by the skeletonisation, a third subunit 503 of trace unfolding, a fourth subunit 504 of trace segmentation, and a fifth subunit 505 of validation. FIG. 7 shows the various processing steps carried out by the subunits of the StS functional unit 102 applied to a fragment 2020 of portion of cursive writing (shown in FIG. 7a and corresponding to the transcript "golden"), which steps will be better illustrated in the following.

The ink present in the fragment 2020 is represented in the binary digital image as a "ribbon" the width of which (i.e. the thickness of which) depends on the writing instrument, paper, writing pressure (i.e. the pressure that the writer exerts through the writing instrument on the paper) and scanner resolution. The first skeletonisation subunit 501 transforms this ribbon into a line having width equal to a single pixel, so as to eliminate the variability introduced by the just mentioned factors. This is achieved by computing the Medial Axis Transform (MAT) of the ribbon. The MAT determines the connected sets of points including the centers of all the circles with maximum radius that may be inscribed in the ribbon. In other words, the MAT transform is the local axis of symmetry of the ribbon. At the end of this processing, thus, the ribbon is represented by a unitary width digital line, computed through any one of the algorithms proposed in the literature; by way of example, the skeletonisation algorithm based on the MAT may be the one described by C. Arcelli and G. Sanniti di Baja in "A thinning algorithm based on prominence detection", Pattern Recognition, vol. 13, no. 3, 1981, pp. 225-235 wherein a label representing the distance of the pixel from the border of the ink trace is associated to each pixel of the trace, and the skeleton is obtained by considering all the points the label of which is a local maximum and all and only those necessary to their connection so as to guarantee that the skeleton has the same order of connection of the trace. FIG. 7b-1 shows the skeleton 2021 obtained at the end of the processing carried out by the first subunit 501 on the fragment 2020 of FIG. 7a.

Independently from the specific algorithm that is used, the skeleton computed by means of the MAT transform may have some geometrical distortions in correspondence of the regions wherein the trace intersects itself, so that the shape of the skeleton does not faithfully reflect the one of the trace, as in case of the skeleton 2021 of FIG. 7b-1. In particular, the points belonging to the skeleton (e.g. to the skeleton 2021 of FIG. 7b-1) may be classified as: end points or EP, each consisting of a pixel of the skeleton having only one adjacent pixel of the skeleton (i.e. only one pixel adjacent to the point considered as EP point); normal points or NP, each consisting of a pixel of the skeleton having two other adjacent pixels of the skeleton (i.e. two other pixels adjacent to the point considered as NP point); branch points or BP, each consisting of a pixel of the skeleton having more than two other adjacent pixels of the skeleton (i.e. three or more other pixels adjacent to the point considered as BP point). In FIG. 7b-2, the BP points 2022 are represented by bold points. In order to eliminate the distortions introduced by the skeletonisation, the second functional subunit 502 of distortion correction executes the following steps:

1) pruning spurious branches, that comprises
   for each segment the extremes of which are a BP point and a EP point, computing the ratio $$R = \frac{L_{BP} - L_{EP}}{D}$$

where $L_{BP}$ and $L_{EP}$ are the labels of the BP point and EP point, respectively, and D is the Euclidean distance between the BP and EP points, and
   in the case where R>0.5, deleting the segment and updating the BP point by classifying the same as a NP point;
   FIG. 7c-1 shows the skeleton 2023 obtained at the end of this spurious branch pruning step carried out on the skeleton 2021 of FIG. 7b-1, in which it is observed the pruning of a spurious branch in the character "n" (as shown in FIG. 7c-2, wherein the character "n" of the skeleton 2021 is shown on the left and the spurious branch is shown within a circle, while the character "n" of the skeleton 2023 is shown on the right with the spurious branch that is pruned);

2) carrying out a polygonal approximation of each skeletal branch, that optionally comprises
   finding the set of segments which minimise the mean square error between the skeletal branch and the broken line, also called polyline, approximating the branch by using the split-and-merge algorithm described by T. Pavlidis and S. I. Horowitz in "Segmentation of planar curves", IEEE Trans. on Computers, vol c-23, no. 8, 1974, pp. 860-870, wherein the vertices of the polyline are constrained to be the extremes of the sequences of collinear pixels (i.e. pixels aligned along the same rectilinear line) of the skeletal branch and they must include the BP points (which, hence, are considered as vertices of the polyline);
   FIG. 7d-1 shows the skeleton 2024 obtained at the end of this polygonal approximation step carried out on the skeleton 2023 of FIG. 7c-1, while FIG. 7d-2 shows the vertices of the polygonal approximation represented by bold points 2029;

3) correcting V-type distortions; one of such distortions is shown in FIG. 8, wherein three rectilinear segments $S_1$, $S_2$ and $S_{EP}$ (represented in FIG. 8 by continuous lines) of the skeleton connects in a point 700 (points from which three rectilinear segments branch are denoted in the following as $BP^3$ points), and one of such three segments is delimited by a EP point (segment denoted with $S_{EP}$; the two points delimiting the other two segments $S_1$ and $S_2$ are denoted in FIG. 8 with $V_1$ and $V_2$, respectively); the angles $\alpha_1$ and $\alpha_2$ formed respectively by the segments $S_1$ and $S_2$ with the segment $S_{EP}$ (namely, they are the angles which do not comprise the third segment, respectively $S_2$ and $S_1$) are shown in FIG. 8; the two rectilinear segments $V_1$-EP (i.e. delimited by the pair of points $V_1$ and EP) and $V_2$-EP (i.e. delimited by the pair of points $V_2$ and EP) and the distances $d_1$ and $d_2$ of the $BP^3$ point 700 from the segments $V_1$-EP and $V_2$-EP, respectively, are also represented by dashed lines in FIG. 8; making reference to FIG. 8, the V-type distortion correction step comprises
   for each $BP^3$ point for which one of the three segments branching from the same is delimited by a EP point, computing the angles $\alpha_1$ and $\alpha_2$ and the distances $d_1$ and $d_2$,
   in the case where at least one of the distances $d_1$ and $d_2$ is not larger than $L_{BP}$ and the difference between the angles $\alpha_1$ and $\alpha_2$ is not larger than 20° (i.e. it is verified that ($d_1$ or $d_2$)$\leq L_{BP}$ and also that $|\alpha_1-\alpha_2|\leq 20°$), then eliminating the three segments $S_1$, $S_2$ and $S_{EP}$ and replacing them with the two segments $V_1$-EP and $V_2$-EP, removing the $BP^3$ point and updating the EP point by classifying the same as a NP point;

4) correcting X-type distortions; one of such distortions is shown in FIG. 9, wherein a pair of $BP^3$ points (points denoted in the following also with $BP_1$ and $BP_2$) is connected by a sole rectilinear segment (represented by a continuous line) of polyline (delimited by the points $BP_1$ and $BP_2$), and the other two rectilinear segments branching from $BP_1$ and $BP_2$ (represented by continuous lines) are delimited by the points indicated in FIG. 9 with $V_{11}$ and $V_{12}$ for the point $BP_1$ and with $V_{21}$ and $V_{22}$ for the point $BP_2$; the segment delimited by the points $BP_1$ and $BP_2$ has length $d_{BP}$; the angles $\alpha_1$ and $\alpha_2$ formed respectively by the two segments $V_{11}$-$BP_1$ and $V_{12}$-$BP_1$ and by the two segments $V_{21}$-$BP_2$ and $V_{22}$-$BP_2$ (namely, they are the angles which do not comprise the segment connecting the points $BP_1$ and $BP_2$) are shown in FIG. 9; the two rectilinear segments $V_{11}$-$V_{22}$ and $V_{12}$-$V_{21}$ (i.e. the two segments which connect the points delimiting the other two segments which branch from the points $BP_1$ and $BP_2$ and which cross the segment connecting the points $BP_1$ and $BP_2$) and the distances $d_{11}$ and $d_{12}$ of the point $BP_1$ from such two segments $V_{11}$-$V_{22}$ and $V_{12}$-$V_{21}$, respectively, and the distances $d_{21}$ and $d_{22}$ of the point $BP_2$ from such two segments $V_{11}$-$V_{22}$ and $V_{12}$-$V_{21}$, respectively, are also represented by dashed lines in FIG. 9; in FIG. 9, the point of intersection between the two rectilinear segments $V_{11}$-$V_{22}$ and $V_{12}$-$V_{21}$ is denoted with $BP^4$; making reference to FIG. 9, the X-type distortion correction step comprises
   for each pair di $BP^3$ points (denoted with $BP_1$ and $BP_2$) connected by a sole rectilinear segment, computing the distances $d_{11}$, $d_{12}$, $d_{21}$ and $d_{22}$, the angles $\alpha_1$ and $\alpha_2$, and the distance $d_{BP}$,
   in the case where the distance $d_{BP}$ is not larger than the minimum between $L_{BP1}$ and $L_{BP2}$ or in the case where both the distances $d_{11}$ and $d_{12}$ are not larger than ($L_{BP2}+1$) and also both the distances $d_{21}$ and $d_{22}$ are not larger than ($L_{BP2}/2+1$), and it is also verified that both the angles $\alpha_1$ and $\alpha_2$ are not larger than 120° (i.e. it is verified that ($d_{BP}\leq\min(L_{BP1}, L_{BP2})$ or ($d_{1j}\leq(L_{BP1}/2+1)$ and $d_{2j}\leq(L_{BP2}/2+1)$, for j=1, 2)) and that ($\alpha_j\leq 120°$ for j=1, 2)), then deleting all the segments branching from each one of the two $BP^3$ points (i.e. from both points $BP_1$ and $BP_2$), adding the two segments $V_{11}$-$V_{22}$ and $V_{12}$-$V_{21}$, adding the $BP^4$ point (from which four segments branch), and setting the label $L_{BP4}$ of the new $BP^4$ point equal to (($L_{BP1}+L_{BP2})/2+1$) (i.e. $L_{BP4}=(L_{BP1}+L_{BP2})/2+1$);

5) correcting T-type distortions; one of such distortions is shown in FIG. 10, having a $BP^3$ point 900 such that none of the three segments (represented by continuous lines) branching from the same is delimited by a EP point or by another $BP^3$ point; the three points $V_1$, $V_2$ and $V_3$ which delimit the three segments branching from the $BP^3$ point 900 are shown in FIG. 10, wherein the third point $V_3$ is the one that delimits the segment forming with the other two segments (delimited by the points $V_1$ and $V_2$) the two angles β and γ which are lower than the maximum angle δ formed by the other two segments $V_1$-$BP^3$ 900 and $V_2$-$BP^3$ 900; the two points $V_4$ and $V_5$ which delimit the segments (represented by continuous lines) continuing the polyline starting, respectively, from the points $V_1$ and $V_2$ are also shown in FIG. 10; the segment $V_1$-$V_2$ and the prolongation of the segment $V_3$-$BP^3$ 900 up to the segment $V_1$-$V_2$ are also shown by dashed lines in FIG. 10, wherein the relative intersection point is denoted with BP'; the segment delimited by the $BP^3$ points 900 and BP' has length d; the straight lines to which the segments $V_1$-$V_4$ and $V_2$-$V_5$ belong and which form an angle α are also shown by dashed lines in FIG. 10; making reference to FIG. 10, the T-type distortion correction step comprises for each $BP^3$ point such that none of the three segments branching from the same is delimited by a EP point or by another $BP^3$ point, computing the distance d and the angle α, in the case where the distance d is not larger than ($L_{BP}/2+1$) and the angle α is not lower than 150° (i.e. d≤($L_{BP}/2+1$) and α≥150°), deleting the segments $V_1$-$BP^3$ and $V_2$-$BP^3$, adding the segment $V_1$-$V_2$, extending the segment $V_3$-$BP^3$ by moving the branch point in the point BP' (i.e. in the point of intersection of the prolongation of $V_3$-$BP^3$ with the segment $V_1$-$V_2$), and setting the label $L_{BP'}$ of the new branch point BP' equal to ($L_{BP}$–d) (i.e. $L_{BP'}=(L_{BP}$–d)).

In the just illustrated steps 3, 4 and 5, the tests on the distances are introduced in order to guarantee that the segments which are added still lay within the trace. FIG. 7e-1 shows the skeleton 2025 obtained at the end of the distortion correction steps carried out on the skeleton 2024 of FIG. 7d-1. In FIG. 7e-2 the regions of the skeleton 2025 which have been modified as a result of the distortion correction steps are marked within circles.

Returning to make reference to FIG. 6, the third functional subunit 503 of trace unfolding analyses the polygonal approximation of the skeleton 2025 and provides the temporal sequence of the strokes composing the ink trace. In particular, the unfolding algorithm reconstructs the temporal sequence of points followed by the writer for producing the ink trace, i.e. the unfolded skeleton; FIG. 7f-1 shows the unfolded skeleton 2026 obtained at the end of the unfolding algorithm carried out by the third functional subunit 503 on the skeleton 2025 of FIG. 7e-1, while FIG. 7f-2 shows some points (indicated with the reference numeral 2030) identifying the temporal sequence followed by the writer for producing the ink trace. On the basis of the sequence of points of the unfolded skeleton, the fourth functional subunit 504 implements an algorithm of tract segmentation that identify the sequence of strokes composing the same; FIG. 7g-1 shows the segmentation 2027 into strokes of the tract obtained at the end of the segmentation algorithm carried out by the fourth functional subunit 503 on the unfolded skeleton 2026 of FIG. 7f-1; FIG. 7g-2 shows the segmentation points 2031 represented by bold dots. The obtained segmentation is analysed by the fifth functional subunit 505 implementing the validation algorithm and, in the case where a set of criteria are not satisfied (such test is represented in FIG. 6 by the control block 506), the error information is sent to the third functional subunit 503 of tract unfolding, that produces a different unfolding of the skeleton (obtained at the end of the distortion correction steps) causing, consequently, the fourth functional subunit 504 to produce a segmentation into a different stroke sequence that is analysed by the validation algorithm carried out by the fifth functional subunit 505. This loop procedure (from block 503 to block 506 of FIG. 6) is repeated until the segmented ink meets the set of criteria or the errors cannot be further reduced.

The unfolding algorithm carried out by the third functional subunit 503 recovers the sequence of points followed by the writer by reformulating the problem of writing order recovery in terms of graph search, where the graph describes the topological properties of the polyline associated to the skeleton obtained at the end of the correction distortion steps. Each node of the graph is characterised by two features, the type (selected between EP or BP) and the degree (i.e. the number of segments or connections branching from the same node), that depends on the number of digital lines which cross the node. The unfolding is obtained by selecting a path within the graph that crosses all the nodes and, at the same time, that minimises the number of nodes crossed more than once. For the existence of such a path, the original graph is transformed into a semi-Eulerian graph, i.e. a graph in which all the nodes have an even degree, with the exception of the source and destination nodes. In order to transform the graph structure into that of a semi-Eulerian graph, two steps are followed by using heuristic criteria. In the first step, the source and destination nodes are selected among the odd nodes and all the remaining odd nodes are transformed into even nodes, adding further connections among them. Finally, the Fleury's algorithm, modified on the basis of handwriting generation criteria, allows the path that crosses all the nodes and minimises the number of nodes crossed more than once to be found. The selected path represents the reconstructed dynamics of the ink trace. More in detail, the unfolding algorithm comprises the following steps:

1) detecting the source and destination nodes by using criteria based on the degree of the nodes and their relative positions; the source node is the top left EP point, while the destination node is the bottom right EP point (in the assumption that the handwriting is in a language for which words are written and read from left to right, as for instance the English language; in the different case where the handwriting is in a language for which the writing and reading direction is different, as for instance the Arab language where words are written and read from right to left, it is sufficient to modify the criteria of selection of the source and destination nodes); if such EP points are not present in the skeleton to unfold, the algorithm selects with the same criteria a BP node for the source and/or destination;
2) adding connections among odd nodes for obtaining a semi-Eulerian graph by selecting the pairs of odd nodes which are closest to each other;
3) ordering the arcs starting from the source node;
4) at each BP node, going through the arcs according to the following order:
   4a) simple arc, that starts from a BP node and ends in another BP node;
   4b) loop, that is an arc that starts and ends in the same BP node,
   4c) two-way circuit, that is an arc that starts in a BP node and ends in a EP node, as for instance a retracing arc, i.e. an arc that is obtained when two parts of the tract are designed as overlapped so that a sole ink tract results;
   4d) three-way circuit, that is formed by two arcs which start and end in the same BP node;
   4e) bridges, which are simple arcs the removal of which disconnects the graph.

The segmentation algorithm carried out by the fourth functional subunit 504 subdivides the skeleton of the unfolded tract (or unfolded trace—as that of FIG. 7*f*-1) into strokes, i.e. it subdivides the unfolded skeleton into parts of the tract (or trace) corresponding to the elementary movements performed by the writer.

The segmentation into strokes is obtained with a decomposition method that exploits the concept of perceptual saliency used to model attentive vision of human beings (and more in general of primates). The method is based on a multi-scale representation (as described, e.g., by Lindeberg T. in "Scale-Space Theory in Computer Vision", Kluwer Academic Publishers, 1994) of the unfolded skeleton that is used to build a saliency map for highlighting the so-called "focus of attention", i.e. the regions of the image representing salient information for the considered application. In this case, the focus of attention are the points of the unfolded skeleton in which significant curvature variations are recorded at different scales, and therefore they represent the desired decomposition points. The segmentation algorithm comprises the following steps:

1) building the representations of the unfolded skeleton using as scale σ different levels of resolution; the highest resolution is obtained by considering as many points as the pixels of the unfolded skeleton, the following resolution taking one point every two pixels of the unfolded skeleton, the next resolution taking one point every three pixels of the unfolded skeleton, and so on; the lowest resolution includes only three points for representing the whole unfolded skeleton;

2) computing the curvature c(a) at each resolution a:

$$c(\sigma) \lim_{\Delta\lambda \to 0} \Delta\alpha / \Delta\lambda$$

where λ is the curvilinear abscissa on the curve of the unfolded skeleton; since the curve of the unfolded skeleton is discrete, Δλ is constant at any given scale and therefore $$c(\sigma) \approx \Delta\alpha;$$

the actual values of the curvature are then quantised into 16 intervals, each of which spans over an angle of 2π/16 radians, and each interval is encoded by a label in such a way that at each scale the shape of the stroke is described by a string of as many labels as the number of points used for describing the unfolded skeleton minus one;

3) building a "map" of saliency by counting how many times a point is a local maximum of curvature across the different scales;

4) selecting as segmentation points the local maximum points of the saliency map the value of which is larger than the average of the values of the map;

5) selecting the best scale for describing the shape of the strokes by computing the distance between the vector c(σ) and the vector <c(σ)>, i.e. the (vector) difference between the curvature observed at the scale σ and the curvature obtained by averaging the values of curvature on all the scales. Such difference is very high in correspondence of the lowest resolutions (because too many important curvature changes are lost), it gets smaller as far as the resolution approaches the "right" one, and then it increases again as the resolution becomes too high (because too many irrelevant curvature changes are considered). Therefore, the segmentation algorithm computes parabola representing the best fit of the pairs of differences (distance, resolution) and it selects the scale cy corresponding to the vertex of the parabola.

The validation algorithm carried out by the fifth functional subunit 505 analyses the sequence of strokes provided by the fourth functional subunit 504 of segmentation and it validates (or not) the unfolding by mean of the following criteria:

a stroke cannot start or end in the neighborhood of an ending point or a starting point of the ink tract (or trace); therefore, a segmentation point falling in proximity of the selected source or destination nodes within the graph implies that they are not the starting or ending points of the ink tract (or trace), and hence their selection must be changed; in particular, the neighbourhood is evaluated by comparing the distance between the segmentation point and the starting or ending one with a threshold (in the preferred embodiment the threshold is equal to 3 pixel);

two or more strokes cannot start in the neighborhood of a BP point; therefore, in the case where additional arcs among BP points give rise to more than two segmentation points in their neighbourhood, another possibility of additional arcs must be explored; for the same reason, if in the path found by the Fleury's algorithm there is a segmentation point in proximity of a BP point, then this mode of going through the arcs must be discarded.

The possibly found errors are encoded into an error vector, having as many elements as the EP and BP points of the unfolded skeleton in which each element is a Boolean variable set to "true" when a segmentation error is found in the point corresponding to the element of the error vector. This information is then exploited for deciding, on the basis of the number of detected errors, whether it is possible to reconstruct the writing order or not. Such a decision is based on the concept that path reconstruction is more difficult when most part of information related to the trajectory is not available. In particular, the trajectory described by the pen tip when the latter is lifted from the paper is not represented in the ink tract (or trace) and, therefore, in order to reconstruct the path when the pen is lifted, it is necessary to infer such missing information from the existing ink tract. Of course, as more information is not available, more complex is building a reliable reconstruction of the original path and much more errors can be made. Consequently, if the number of the error exceeds a threshold (optionally equal to 2), the ink tract (or trace) is rejected. The implementation of the validation algorithm carried out by the fifth functional subunit 505 is reported in the following in Algorithm 3 in pseudo-natural (English) language, wherein:

$P=\{P_0, P_1, P_2 \ldots P_n\}=\{P_i, \text{ for } i=0, 1, \ldots n\}$ is the ordered set of (n+1) EP and BP points (provided by the third functional subunit 503 of unfolding) that represents the path found in the graph;

$G(P_i)$ is the degree of point $P_i$;

$S(P_i)$ is the number of segmentation points (in the following also indicated with SP) (provided by the fourth functional subunit 504 of segmentation) in the neighbourhood of a point $P_i$;

$E=\{e_0, e_1, e_2, \ldots e_n\}$ is the error vector, comprising a set of (n+1) Boolean variables (each one of which corresponds to a point $P_i$) that indicates whether an error is identified in the segmentation currently analysed for the validation, and $E^{PREV}=\{e_0^{PREV}, e_1^{PREV}, e_2^{PREV}, \ldots e_n^{PREV}\}$ is the error vector of the previously analysed segmentation;

an intermediate node is a node located between a source node and a destination node;

$a_{mod\ b}$, where a and b are integer variables, is a function returning the integer rest of division (a/b);

the symbol "#" means "number of";

the symbol "§" introduces a comment to the corresponding instruction in pseudo-natural language.

---

Algorithm 3

For each Pi from $P_0$ to $P_n$
  If ((i=0) OR (i=n)) then          § $P_i$ is a source or destination node
    If (G($P_i$)=1) then                 § $P_i$ is a EP point
      If (S($P_i$) > 0) then ei=true § in the neighbourhood of $P_i$ there is a SP point
    Else                                § $P_i$ is a BP point
      If (S($P_i$) > 1) then ei=true § in the neighbourhood of $P_i$ there are two or more SP points
  Else                                 § $P_i$ is an intermediate node
    If (G($P_i$)$_{mod\ 2}$ =1) then       § $P_i$ is an odd degree BP point
      If (S($P_i$) > 1) then $e_i$=true § in the neighbourhood di $P_i$ there are two or more SP points
    Else                               § $P_i$ is an even degree BP point
      If (S($P_i$) > 0) then $e_i$=true § in the neighbourhood di $P_i$ there is a SP point
If (the one under validation analysis is the first segmentation) then
  If (#ei=true > 0) then
    Send the error vector to the unfolding algorithm
    $E^{PREV}$=E
Else
  If (#ei=true > 0) E (#ei=true<#$e_i^{PREV}$=true) then
    Send the error vector to the unfolding algorithm
    $E^{PREV}$=E
  Else
    If (#ei=true > 2) then
      Reject the fragment

---

Whenever the segmented ink tract does not meet either or both the aforementioned criteria, but the total number of errors is below the threshold, the error vector is sent back to the unfolding algorithm carried out by the third functional subunit 503 and it is exploited to modify the following three features of the path in the graph that gives rise to the unfolded skeleton:

selection of the source node and destination node;

introduction of additional connecting arcs;

identification of the sequence of the arcs in the path provided by the Fleury's algorithm.

According to the information provided by the validation algorithm, the unfolding algorithm executes two steps:

1) a step of graph correction, that modifies the graph by changing the starting/ending points and the additional connecting arcs, selecting one among possible alternatives, as illustrated in Algorithm 4 reported in the following, wherein Pop represents the subset of nodes crossed by an odd number of arcs and the other symbols have the same meaning illustrated for Algorithm 3; and 2) a step of sequence reordering, that finds another path within the graph by changing the way in which the arcs are crossed, as illustrated in Algorithm 5 reported in the following, wherein $A_i$ is the set of the arcs associated to each node $P_i$, $A^*_i=\{\alpha_0 \ldots \alpha_m\}$ is the subset of the arcs leaving from $P_i$ and the other symbols have the same meaning illustrated for Algorithm 3.

---

Algorithm 4

If ($e_0$ = true) then
  $P_0$= SelectStartNode($P_{OP}$,$P_0$)      § select a starting node from the set $P_{OP}$ except $P_0$
  If (en == true) then
    $P_n$= SelectEndNode($P_{OP}$,$P_n$)      § select an ending node from the set $P_{OP}$ except $P_0$
  Else
For (for all odd degree nodes)
  If (ei = true E $e_{i+1}$ = true) then
    $P_i$ = SelectCouplingNode($P_{OP}$,$P_{i+1}$)      § select a coupling node for $P_i$ from the set $P_{OP}$ except $P_{i+1}$
    $P_i$ = SelectCouplingNode($P_{OP}$,$P_i$)      § select a coupling node for $P_{i+1}$ from the set $P_{OP}$ except $P_i$

---

Algorithm 5

For each $e_i$ da $e_1$ a $e_{n-1}$
  If ($e_i$ = true) then
    $a_i$ =SelectNewArc($A^*_i$,$a_i$)      § select an arc departing from $P_i$ from the set $A^*_i$ except $a_i$

---

As shown in FIG. 6, in the case where the test carried out by the control block 506 verifies that the set of criteria is satisfied, a sixth subunit 507 of feature extraction executes an algorithm that assigns to each stroke belonging to the ink tract (or trace) a distinctive feature, that takes account of information related to the global shape of the stroke and its relative position within the word zones.

For the preferred embodiment of the process according to the invention, Tables 1A and 1B report (with terms in English language immediately comprehensible to those skilled in the art—consistently with what reported in Table 2), the set of features and the criterion according to which each feature is associated to a stroke, having a and b as starting and ending points, respectively. FIG. 11 shows the adopted corresponding features.

TABLE 1A

| Feature | Code | Criterion |
|---|---|---|
| Ascender Up | A | (topCenter < a < lowBottomCenter) and (top ≤ b < highTopCenter) |
| Ascender Down | a | (top ≤ a < highTopCenter) and (topCenter < b < lowBottomCenter) |
| Descender Up | D | (lowBottomCenter < a < bottom) and (highTopCenter < b < bottomCenter) |
| Descender Down | d | (highTopCenter < a < bottomCenter) and (lowBottomCenter < b < bottom) |
| Loop | L | Insieme di stroke consecutivi $s_1 \ldots s_n$ contenuti nel rettangolo di delimitazione FB, che verifica le seguenti condizioni:<br>1. distance($s_1 \cdot a, s_n \cdot b$) > 0.3 × (bottomCenter − topCenter);<br>2. $0.5 \leq \frac{\text{width(FB)}}{\text{height(FB)}} \leq 3$;<br>3. width(FB) < 2 × (bottomCenter − topCenter) or height(FB) > 0.5 × (bottomCenter − topCenter);<br>4. (highTopCenter < Top(FB) < lowBottomCenter) and (highTopCenter < Bottom(FB) < lowBottomCenter);<br>5. $\forall i \frac{\text{Area}(s_i)}{\text{Area(FB)}} > 0.5$ |
| Upper | u | ((topCenter < a ≤ bottomCenter) and (highTopCenter ≤ b < topCenter)) or ((topCenter < b ≤ bottomCenter) and (highTopCenter ≤ a < topCenter)) |

TABLE 1B

| Feature | Code | Criterion |
|---|---|---|
| Upper Center | X | ((highTopCenter < a ≤ topCenter) and (top ≤ b < highTopCenter)) or ((highTopCenter < b ≤ topCenter) and (top ≤ a < highTopCenter)) |
| Upper Top | y | (top ≤ a ≤ highTopCenter) and (top ≤ b ≤ highTopCenter) |
| Upper Bottom | z | ((highTopCenter ≤ a ≤ topCenter) and (highTopCenter ≤ b ≤ topCenter)) |
| Lower | l | ((topCenter ≤ a < bottomCenter) and (bottomCenter < b ≤ lowBottomCenter)) or ((topCenter ≤ b < bottomCenter) and (bottomCenter < a ≤ lowBottomCenter)) |
| Lower Center | i | ((bottomCenter ≤ a < lowBottomCenter) and (lowBottomCenter < b ≤ bottom)) or ((bottomCenter ≤ b < lowBottomCenter) and (lowBottomCenter < a ≤ bottom)) |
| Lower Top | k | ((bottomCenter ≤ a ≤ lowBottomCenter) and (bottomCenter ≤ b ≤ lowBottomCenter)) |
| Lower Bottom | j | (lowBottomCenter ≤ a ≤ bottom) and (lowBottomCenter ≤ b ≤ bottom) |
| Center | c | ((topCenter ≤ a ≤ bottomCenter) and (topCenter ≤ b ≤ bottomCenter)) or ((highTopCenter ≤ a < topCenter) and (bottomCenter < b ≤ lowBottomCenter)) or ((highTopCenter ≤ b < topCenter) and (bottomCenter < a ≤ lowBottomCenter)) |
| Pipe | p | (a ≥ lowBottomCenter and b ≤ highTopCenter) or (b ≥ lowBottomCenter and a ≤ highTopCenter) |

The final output provided by the StS functional unit 102 is therefore the sequence of strokes and the corresponding sequence of features, represented in FIG. 6 through the block 508.

In the configuration mode, the functional unit StL 103 of FIG. 1 associates each stroke of the sequence, in which the tract (or trace) has been segmented by the StS unit 102, to the character of the transcript to which it belongs. In order to obtain such associations, the StL unit 103 executes the following three steps, schematically shown in FIG. 12 with reference to the specific ink trace 12-2027 corresponding to the transcript 1250 of the English word "adherent":

1) a first step 1200 of distribution generation, wherein the tracts (or traces) 2032 of segmented ink (e.g. the trace 12-2027 of FIG. 12) and their transcripts 2033 are used for generating (for each character of the destination alphabet (i.e. of the alphabet of the Lexicon 156) a series of probability mass functions or distributions 1251 the number of which is equal to the number C of characters of the destination alphabet (i.e. of the alphabet of the Lexicon 156), by discriminating the way of writing the letters of the alphabet (e.g. an uppercase letter is a character different from the character corresponding to the same letter when written lowercase);

2) a second step 1201 of feature analysis, a set of anchor points 1252 is located through the analysis of the features associated to the strokes, each one of which anchor points 1252 represents the beginning or the end of a character in a subsequence into which the stroke sequence in the ink trace 12-2027 may be subdivided; and 3) a third step 1202 of label association, wherein, according to the anchor points 1252 located in the second step 1201, the transcripts 1253 of the portions of the trace 12-2027, separated by the anchor points 1252, are identified through the probability distributions 1251 generated in the first step 1200, finally associating each stroke to the transcript of the character to which it belongs, thus obtaining a segmented labelled ink trace (or tract) 12-2034 (in FIG. 12 each one of the 29 strokes composing the trace 12-2027 of the word "adherent" is associated to the transcript of the respective character, obtaining the string "aaaadddddhhhheerrrreennnntttt" (indicated with the reference numeral 2035);

More in particular, the first step 1200 of distribution generation generates a probability distribution 1251 for each class of characters, representing the probability that a character is composed of a certain number of strokes. The probability mass functions 1251 are obtained by solving a set of systems of linear equations. Each equation is obtained from a segmented ink tract (or trace) 2032, by considering the number $n_{char}$ of strokes of each character as an unknown variable, the occurrences $x_{char}$ of each character as coefficients, and the number $n_{stroke}$ of strokes of the segmented ink tract (or trace) as the constant term:

$$n_a x_a + \ldots + n_z x_z + n_A x_A + \ldots + + n_Z x_Z + = n_{strokes}$$

Each system of linear equations is constituted by k equations (with k≥C, where C is the number of characters of the alphabet as stated above) and by C unknown variables. By solving a set of m systems, m vectors of solutions are obtained each comprising C elements (namely an element for each character of the alphabet). Each i-th vector of solution (with i ranging from 1 a m) is assigned to a corresponding vector of reliability parameters R, also having C elements (one for each character) each one of which is equal to the ratio between the occurrence of the corresponding character within the equation system and the deviation of the considered solution (for that character) from the average of the solutions (for that character):

$$R_{c,i} = \frac{n_{c,i}}{r_{c,i} \times n_{c,i} - \sum_{j=1}^{m} \frac{r_{c,j} \times n_{c,j}}{m}}$$

where:
- $n_{c,i}$ is the occurrence of the c-th character within the i-th system; and
- $r_{c,i}$ is the number of strokes composing the c-th character, number obtained by solving the i-th system.

The distributions are then created on the basis of the m vectors of solutions and of the corresponding vectors of reliability parameters R.

A stated, the second step 1201 of feature analysis analyses the features associated to the strokes and locates a set of anchor points 1252. Certain characters are characterised by a particular sequence of features at the beginning or end of their ink tract. A list of these characters and their properties, in case of English alphabet, is reported in Table 2. Whenever the transcript contains these characters, the actual features provided by the StS unit 102 are compared to the expected ones. In the case where the actual features correspond to the expected ones, the sequence of strokes is divided into subsequences according to the located anchor points 1252 (as shown in FIG. 12), and each subsequence is associated to the corresponding portion 1253 of the transcript (in FIG. 12, the two located anchor points 1252 subdivide the trace 12-2027 into three subsequences associated to the corresponding portions 1253 "ad", "heren" and "t").

TABLE 2

| Characters | Properties |
| --- | --- |
| p | The character starts with a tract descending downwards (descender down) followed by a tract descending upwards (descender up) |
| g, j, q, y | The character ends with a tract descending downwards (descender down) followed by a tract descending upwards (descender up) |
| b, h, k, l, t | The character starts with a tract ascending upwards (ascender up) followed by a tract ascending downwards (ascender down) |
| d | The character ends with a tract ascending upwards (ascender up) followed by a tract ascending downwards (ascender down) |

The third step 1202 of label association carried out by the functional unit StL 103 analyzes each subsequence found in the second step 1201 of features analysis and it generates a sequence of labels, each representing the transcript of the character to which the corresponding stroke belongs. In particular, according to the transcript associated to the subsequence, the labelling algorithm executed by the third step 1202 exploits the probability distributions 1251 for finding the combination of strokes associated to each character that gives rise to the maximum value of probability and that, at the same time, meet the constraint of the total number of strokes composing the subsequence.

The labelling algorithm starts from the absolute maxima of the distributions 1251 associated to the characters belonging to the transcript, which are inserted in a vector Pmax (having a number of elements equal to the number of characters of the transcript), it generates a vector S, also containing a number of elements equal to the number of characters of the transcript, wherein each element is equal to the number of strokes associated to the respective character, and it calculates the expected number $S_{exp}$ of strokes of the subsequence. Subsequently, if the expected number $S_{exp}$ of strokes is different from the actual number $S_{act}$, the labelling algorithm selects another local maximum for each distribution 1251, forming a new vector Pmax; in particular, the local maximum within a distribution 1251 to insert as element of the vector Pmax is searched to the left of the absolute maximum if $S_{exp} > S_{act}$, while it is searched to the right of the absolute maximum if $S_{exp} < S_{act}$. On the basis of the vector Pmax, the labelling algorithm changes the number di strokes associated to the character having the largest value of local maximum. According to the new values of the elements of the vector S, the new expected number $S_{exp}$ is calculated that is then compared with the actual number $S_{act}$. This first part of the labelling algorithm ends when $S_{exp}$ corresponds to $S_{act}$ or when all the local maxima have been explored.

Whenever there is no combination of local maxima that meets the constraint of the total number of strokes (i.e. $S_{exp} = S_{act}$), the labelling algorithm restarts from the absolute maxima, it searches for the local maxima (to the left of the absolute maxima if $S_{exp} > S_{act}$ or to the right if $S_{exp} < S_{act}$) and it adds (if $S_{exp} < S_{act}$) or subtracts (if $S_{exp} > S_{act}$) one stroke to the number of strokes associated to the character having the largest value of local maximum and it calculates the new value of $S_{exp}$. The labelling algorithm ends when $S_{exp}$ corresponds to $S_{act}$. The labelling algorithm is reported in Algorithm 6 in pseudo-natural (English) language, wherein:

- $C=[c_1, \ldots, c_k]=[c_i, \text{ for } i=1, \ldots, k]$ is the set of characters belonging to the transcript of the segmented tract (or trace) (indicated with the reference numeral 12-2027 in FIG. 12);
- $S=[S_1, \ldots, S_k]=[S_i, \text{ for } i=1, \ldots, k]$ is the set of the numbers of strokes, each one associated to a respective character belonging to the transcript; and
- $Pmax=[Pmax_1, \ldots, Pmax_k]=[Pmax \text{ for } i=1, \ldots, k]$ is the current set of the maxima of the probability distributions (indicated with the reference numeral 1251 in FIG. 12), each one associated to a respective character belonging to the transcript.

Algorithm 6

```
For each c_i from c_1 to c_k
    Pmax_i ← globalMax (distribution(c_i));
    S_i = distribution(c_i, Pmax_i)
S_exp = Σ_i S_i;
while ((S_exp ≠ S_act) E (!AllLocalMaximaExplored)) do
    if (S_exp > S_act) then
        for each c_i from c_1 to c_k
            Pmax_i ← localMax (distribution(c_i), S_i, left);
    Else if
        for each c_i from c_1 to c_k
            Pmax_i ← localMax (distribution(c_i), S_i, right);
    j = argmax (Pmax)
    S_j = distribution(c_j, Pmax_j)
    S_exp = Σ_i S_i;
if (AllLocalMaximaExplored) then
    For each c_i from c_1 to c_k
        Pmax_i ← globalMax (distribution(c_i));
        Si = distribution(c_i, Pmax_i)
    S_exp Σ_i S_i;
        if (S_exp > S_act) then
            for each c_i from c_1 to c_k
                Pmax_i ← localMax (distribution(c_i), S_i, left);
            j = argmax (Pmax)
            S_j = S_j -1;
```

-continued

Algorithm 6

Else if
    for each $c_i$ from $c_1$ to $c_k$
        Pmax$_i$← localMax (distribution($c_i$), $S_i$ , right)
    j=argmax (Pmax)
    $S_j = S_j + 1$;
    $S_{exp} = \Sigma_i S_i$;

With reference to the example application to the recognition of an image 13-200 of an unknown handwritten word (corresponding to the Italian word "Contrada" included in the Lexicon—with writing different from the image 200 of FIG. 3) as schematically shown in FIG. 13, it may be observed that the DKBR (Dynamic Knowledge Base Reduction) functional unit (indicated in FIGS. 2 and 3 with the reference numerals 104A-104B) carries out three operations downstream of the ICR functional unit 101.

First of all, as schematically shown in FIG. 13a, the ICR functional unit 101 associates to the fragments classified as isolated characters extracted from the image 13-200 (indicated in FIG. 13 with the reference numerals 1351, 1353 and 1355) a list of interpretations (in case of FIG. 13a, the list 1361 of interpretations for the first fragment 1351 comprises the transcripts "C" and "E", the list 1363 of interpretations for the third fragment 1353 comprises the only transcript "t", and the list 1365 of interpretations for the fifth fragment 1355 comprises the transcripts "a", "or" and "and"). Instead, a metacharacter (also called "wild card", represented in FIG. 13a by the symbol "?" of the interpretations 1362 and 1364) having undefined interpretation indefinite is associated to each fragment classified as portion of cursive writing (namely the fragments 1352 and 1354). The ICR unit 101 also calculates the classification costs for each interpretation of each fragment classified as isolated character (i.e. for each interpretation of the lists 1361, 1363 and 1365 related to the fragments 1351, 1353 and 1355). Moreover, the ICR functional unit 101 provides the DKBR functional unit with the relative position of each fragment classified as isolated character (in FIG. 13a the fragments 1351, 1353 and 1355) within the image 13-200 of the unknown word.

The DKBR functional unit carries out as first operation the one of ordering the lists of the interpretations of the image fragments classified as isolated characters on the basis of their position within the image 13-200 of the unknown word (such order is indicated in FIG. 13b with the reference numeral 1370), and it obtains a number of partial interpretations (i.e. only related to the interpretations of the fragments classified as isolated characters—in FIG. 13a the fragments 1351, 1353 and 1355) of the image 13-200 of the unknown word equal to the product of the numbers of alternative interpretations included in the lists of interpretations associated to the fragments classified as isolated characters provided by the ICR unit 101 (in FIG. 13a, the list 1361 comprises 2 interpretations "C" and "E", the list 1363 comprises 1 interpretation, and the list 1365 comprises 3 interpretations, whereby the number of partial interpretations is equal to 2·1·3=6, namely: "C?t?a", "C?t?or", "C?t?and", "E?t?a", "E?t?or", "E?t?and"). Moreover, the DKBR functional unit also calculates the cost for building each partial interpretation, by adding the classification costs of the specific interpretations of the fragments classified as isolated characters as considered in the specific partial interpretation. In this way, at the end of the first operation, the DKBR functional unit provides a list of partial interpretations and their classification cost.

As schematically shown in FIG. 13b, the DKBR functional unit then carries out as second operation the one of building a Dynamic Lexicon 204, by extracting from the Lexicon 156 only the words the transcripts of which match the partial of the order 1370. During this process, the undefined interpretations of the wild cards "?" 1362 and 1364 associated to the fragments 1352 and 1354 classified as portions of cursive writing are changed into the corresponding subsequences of the portions of the transcripts of the corresponding words of the Lexicon 156 (it is immediate for the person skilled in the art to recognise such subsequences in FIG. 13b; by way of example, and not by way of limitation, for the word "Cantare" of the Lexicon 156, then included in the Dynamic Lexicon 204, the two subsequences corresponding to the wild cards 1362 and 1364 are, respectively, "an" and "ar", while for the word "Ecatombe" of the Lexicon 156, then included in the Dynamic Lexicon 204, the two subsequences corresponding to the wild cards 1362 and 1364 are, respectively, "ca" and "omb"). Optionally, the subsequences of characters the expected number $S_{exp}$ of strokes of which, as computed by the StL functional unit 103 in the configuration mode, is too large or too small in comparison with the actual number $S_{act}$ of strokes in the fragment classified as portion of cursive writing are discarded. Consequently, the Dynamic Lexicon 156 represents the only possible interpretations for the unknown word to recognise in the image (in FIG. 13 indicated with the reference numeral 13-200), to which the corresponding classification costs are still associated on the basis of the respective partial interpretations provided by the DKBR functional unit at the end of the first operation (illustrated above). Finally, as schematically shown in FIG. 13c, the DKBR functional unit carries out as third operation the one of building, on the basis of the Reference Set 154 and Dynamic Lexicon 204, a Dynamic Reference Set 205, i.e. a list of the ink tracts the transcripts of which correspond, at least partially, to the subsequences of characters of the interpretations included in the Dynamic Lexicon 204 corresponding to the fragments 1352 and 1354 classified as portions of cursive writing (which subsequences of characters do not include the interpretations 1361, 1363 and 1365 of the fragments 1351, 1353 and 1355 classified as isolated characters; in FIG. 13c such subsequences of characters are indicated with the reference numerals 1382 and 1384 for the fragments 1352 and 1354, respectively). In other words, the Dynamic Reference Set 205 is built by extracting from the Reference Set 154 portions of cursive writing the transcript if which (at least partially) match the subsequences of characters included in the entries of the Dynamic Lexicon 204 (which subsequences do not include the interpretations 1361, 1363 and 1365).

As already stated with reference to FIG. 2, the IM functional unit 105 of ink comparison compares the sequence 206 of strokes provided by the StS functional unit 102 with those contained in the Dynamic Reference Set 205 and, in the case where a set of matching criteria is satisfied, the IM functional unit 105 provides as cursive interpretation 207 for the sequence 206 of strokes the transcript of the matching sequences of strokes of the Dynamic Reference Set 205 and its cost. After the execution of the matching, there may be unmatched stroke sequences of the fragments 202 classified as portions of cursive writing, i.e. sequences 206 of strokes of fragments which do not match any sequence included in the Dynamic Reference Set 205. Moreover, after the execution of the matching, there may be also overlapping sequences, i.e. sequences 206 of stroke of fragments 202 which match a plurality of sequences included in the Dynamic Reference Set 205 which are associated to different transcripts. Hence, the IM unit 105 provides as output the subsequence(s) of strokes of the fragment 202 classified as portion of cursive writing which match(es) one (or more) sequence(s) of the Dynamic Reference Set 205, each subsequence being labelled with the characters corresponding to the strokes matching the entries of the Dynamic Reference Set 205.

The execution of the matching of the stroke sequences is carried out by measuring the shape similarity of the stroke sequence at different scales, by combining the multi-scale representation into a saliency map and by selecting the most salient points, which correspond to the most similar stroke sequence. The rationale behind such matching technique is that by evaluating the similarity at different scales and then combining this information across the scales, the sequences of strokes which are "globally" more similar than others stand out in the saliency map. The "global" nature of the saliency guarantees that its map provides a more reliable estimation of ink tract similarity than that provided by "local" criteria (which are usually proposed in the prior art).

In order to implement such an approach, it is necessary to define a scale space, to find a similarity measure to be adopted at each scale, to compute the saliency map, and to select the matching sequences of strokes.

With regard to the scale space, the preferred embodiment of the process according to the invention adopts as scale the number of strokes in the sequences the similarity of which is being measured. Such a number is indicated in the following of the present description also as "length" of the sequence. Accordingly, the number of scales corresponds to the length K of the longest common sequence of compatible strokes between the sequence of strokes of the fragments 202 and the sequence of strokes of the Dynamic Reference Set 205 with which the matching is verified. With reference to Table 3, in order to

TABLE 3

| Character | A | a | D | d | L | c | p | u | I | x | y | z | i | j | k |
|---|---|---|---|---|---|---|---|---|---|---|---|---|---|---|---|
| A | x |   |   |   |   |   |   |   | x | X |   | x |   |   |   |
| a |   | x |   |   |   |   |   |   | x | X |   | x |   |   |   |
| D |   |   | x |   |   |   |   |   | x |   | x |   |   | x | x |
| d |   |   |   | x |   |   |   |   | x |   | x |   |   | x | x |
| L |   |   |   |   | x | x |   |   | X | x |   |   |   |   |   |
| c |   |   |   |   | x | x |   |   | x | x |   |   |   | x |   |
| P | x | x | x | x |   | x |   |   |   |   |   |   |   |   |   |
| u | x | x |   |   | x | x |   | x | x |   | x |   |   |   |   |
| I |   |   | x | x | x | x |   |   | x |   |   |   | x |   | x |
| x | x | x |   |   |   |   |   |   | x |   | x | X | x |   |   |
| Y |   |   |   |   |   |   |   |   |   | x | X | x |   |   |   |
| z | x | x |   |   |   | x |   |   | x |   | x | X | x |   |   |
| i |   |   | x | x |   |   |   |   | x |   |   |   | x | x | x |
| j |   |   |   |   |   |   |   |   |   |   |   |   | x | x | x |
| k |   |   | x | x |   | x |   |   | x |   |   |   | x | x | x | decide whether two strokes are compatible, i.e. whether they bring the same contextual information even if they have different shapes, the features associated to the strokes are compared by adopting the compatibility criteria reported in Table 3, that shows an array each element of which indicates the compatibility (if the element has the symbol "x") or non compatibility (if the element is void) between the features of the characters reported on the respective row and the respective column of the same element. The successive scales are obtained by considering the subsequences of compatible strokes of length K−1, K−2, . . . , 2 strokes. Hence, at the end of this procedure, K−1 similarity maps are obtained, each one of which measures the similarity among all the subsequences which may be extracted from the sequence of length K The similarity between two strokes is their shape similarity. To this end, the shape of a stroke is described by a chain code encoding the orientations (i.e. the changes of curvature) of the segments of the polyline that describes the stroke at the resolution σ selected by the StS functional unit 102. The orientation is uniformly quantised into 16 intervals, and each interval is denoted by one of the letters of the subset [A-P] in such a way that the letter A corresponds to the first interval (wherein the orientation goes from 0 to ($2\pi/16$) with respect to the horizontal axis), the letter B corresponds to the second interval (wherein the orientation goes from ($2\pi/16$) to ($2\cdot 2\pi/16$) with respect to the horizontal axis), and so on; obviously, in other embodiments of the process according to the invention the subset [A-P] may have a different number of elements and/or a representation for each element different from the uppercase Latin letter (e.g., a number, a hexadecimal symbol, a Greek letter). Through this encoding, the shape of the stroke is described by a string of labels that encodes the local orientation of the selected representation of the original ink tract, as shown by way of example, and not by way of limitation, in FIG. 14, wherein: FIG. 14a shows a trace 14-2028 segmented into the elementary strokes, wherein the black dots along the skeleton are the segmentation points between the strokes (the trace 14-2028 corresponds to the handwritten English word "unable"); and FIG. 14b shows the sequence of strings of the chain code encoding the changes of curvature (i.e. the orientations) along the segmented trace 14-2028, where the dashes "-" represent the segmentation points.

As similarity measure between two strokes, the preferred embodiment of the process according to the invention adopts the weighted edit distance, known as WED, between the respective chain codes. The WED distance is based on the concept of string stretching: it does not introduce nor delete any label in the strings to compare, but it simply extends, i.e. stretches, the shortest strings up to the longest one. Hence, by denoting with $L_{min}$ and $L_{max}$ the lengths of the two strings, respectively, there are ($L_{max}-L_{min}$) labels which must be included in the stretched string. In order to decide which symbols must be inserted and where, the integer part l of the ratio ($L_{max}/L_{min}$) is computed and each symbol of the shortest string is replicated by (l−1) times. The remaining (($L_{max}-L_{min}$)−1) symbols are uniformly located in the stretched string and their values are the same values of those of the labels to their left.

After the stretching, the WED distance between two strings of labels, namely between a first string $X=(x_1, x_2, \ldots, x_L)$ of labels and a second string $Y=(y_1, y_2, \ldots, y_L)$ of labels, is computed according to the following formula:

$$WED(X, Y) = 100 \cdot \left[ \frac{8 - \sum_{i=1}^{L}\left(\frac{ED(x_i, y_i)}{L}\right)}{8} \right] \quad [W1]$$

where:

$E(x_i, y_i)$ is the edit distance between the symbol $x_i$ of the first string and the symbol $y_i$ of the second string, and L is the length of the strings X and Y.

In other words, $E(x_i, y_i)$ is the lexical distance between the symbols [A . . . P] adopted for encoding the curvature changes, which lexical distance is constrained to be symmetric, so that the lexical distance between A and B is 1, but also the distance between A and P is 1. Consequently, the maximum distance $SD_{max}$ between two symbols is equal to 8 and the distance WED(X, Y) ranges from 0 (for an identical shape but with opposite drawing order) and 100 (for an identical shape and the same drawing order). In the comparison between two sequences X and Y having respectively N and M strokes, the WED distance assumes the form of a matrix of N×M elements, the element $WED_{ij}$ of which denotes the WED distance between the i-th stroke of the first fragment and the j-th stroke of the second fragment; in the case where the two strokes are incompatible, it is $WED_{ij}=0$. By way of example and not by way of limitation, FIG. 15 shows such a matrix of WED distance between pairs of strokes belonging to two stroke sequences related respectively to a segmented fragment 15-2028 of an image of unknown word (corresponding to the handwritten English word "into"—wherein the reference numeral 15-2028' indicates the fragment with the 12 strokes numbered and separated from each other by black dots representing the segmentation points along the skeleton), reported on the left of the first column and the 12 strokes of which are listed in the same first column, and of a reference segmented fragment 15-205 (corresponding to the handwritten English word "in"—wherein the reference numeral 15-205' indicates the fragment with the 7 strokes numbered and separated from each other by black dots representing the segmentation points along the skeleton) belonging to the Dynamic Reference Set 205, reported above the first row and the 7 strokes of which are listed in the same first row.

Other embodiments of the process according to the invention may use a formula different from formula [W1] for the computation of the WED distance between two strings $X=(x_1, x_2, \ldots, x_L)$ and $Y=(y_1, y_2, \ldots, y_L)$ of labels, such as for instance the following formula:

$$WED(X, Y) = WED_{max} \cdot \left[ \frac{SD_{max} - \sum_{i=1}^{L} \left( \frac{ED(x_i, y_i)}{L} \right)}{SD_{max}} \right] \quad [W2]$$

that differs from the formula [W1] in that the maximum distance $SD_{max}$ between two symbols may be different from 8 and the distance WED(X, Y) may range from 0 to $WED_{max}$, with $WED_{max}$ that may be different from 100.

Subsequently, the IM unit 105 computes the average value μ(WED) on the values $WED_{ij}$ which are different from zero (i.e. on the values $WED_{ij}\neq 0$). In order to build the saliency map S, that is also a matrix of N×M elements $S_{ij}$, initially set equal to zero, the IM unit 105 determines the length K of the longest common sequence of compatible strokes and, for each pair of strokes p and q of such sequence such that $WED_{pq}>\mu(WED)$, the IM unit 105 increments by one the saliency of the pair of strokes p and q (i.e. $S_{pq}=S_{pq}+1$).

Finally, the IM unit 105 decrements by one the length (i.e. K=K−1), it searches for all the possible sequences of length K and it updates the saliency of their strokes as above, until it reaches K=2; in particular, FIG. 16 shows the matrix S of saliency for K=2 for the stroke sequences of FIG. 15. At the end of such processing, the IM unit 105 computes the average value μ(S) on the values $S_{ij}$ which are different from zero (i.e. on the values $S_{ij}\neq 0$). Therefore, the matching sequences of strokes correspond to the diagonal sequences of values $S_{ij}$ such that $S_{ij}\geq\mu(S)$, wherein the cost of such a matching is the average value of the WED distance of the sequence. In this regard, FIG. 17 shows the saliency map of the stroke sequences of FIG. 15 through a graphical representation, wherein the paler elements correspond to a larger value of saliency and the diagonal sequences of pale elements correspond to matching sequences of strokes; in particular, in FIG. 17 there are two matching stroke sequences: the first one comprises the sequence 1-5 of the unknown handwritten word "into" and the sequence 2-6 of the reference handwritten word "in", and the second one comprises the sequence 9-11 of the unknown handwritten word "into" and the sequence 3-5 of the reference handwritten word "in".

In the case where there are two (or more) matching sequences which correspond to multiple interpretations for the same stroke sequence of the unknown word, all these matching sequences are retained and ranked on the basis of their reliability. In this way, after having carried out the matching of the unknown word with all the references, a set of interpretations for each stroke sequence of the unknown word is available. Algorithm 7 formally summarises the procedure that executes the matching of the ink trace in pseudo-natural (English) language, wherein SAVE is the value previously indicated with μ(S).

---
Algorithm 7
---
Calculating the matrix of the WED distance verifying the compatibility of the strokes
For each k from K to 2
   Finding all the stroke sequences of length k;
   Calculating the saliency map S
   If ($S_{ij} < S_{AVE}$) then
   Sij=0
   Extracting the longest sequences of Sij different from zero in S

---

Still with reference to FIG. 2, on the basis of the information provided by the IM unit 105 and ICR unit 101, the WV functional unit 106 validates the possible interpretations 207 suggested by the Dynamic Lexicon 204 for an unknown handwritten word, it computes a score (i.e. a cost) for each one of such interpretations 207, and finally it selects the interpretation 208 with the best score that represents the final output of the process according to the invention.

The ICR unit 101 provides a list of pairs of values (interpretation, cost) for each fragment 201 classified as isolated character, while the IM unit 105 provides a set of matches for each fragment 202 classified as portion of cursive writing. Therefore, in order to assign a score to each interpretation, the WV unit 106 computes the cost for each fragment 202 classified as portion of cursive writing on the basis of the received matches.

The problem of computing the cost of a fragment 202 classified as portion of cursive writing is reformulated as searching the cheapest and the most exhaustive sequence of matches for the same fragment. Each match is a sequence of strokes, described by a starting and an ending strokes and a label corresponding to the sequence of characters (or n-gram) coded by the sequence. In the example shown in FIG. 15, the sequence 1-5 and the sequence 9-11 of the unknown handwritten word "into" are labelled, respectively, as "innnn" and as "nnn".

The desired sequence of matches is defined as the sequence that:
   comprises most of the labelled strokes;
   provides an interpretation, obtained by linking together the labels of each match, that is as close as possible to the one provided by the Dynamic Lexicon 204; and
   has the cheapest cost, obtained by combining the cost of each match.

FIG. 18 shows an example of application of the WV unit 106, wherein five matches of a (portion of) unknown word (shown at the top in each of the five matches and corresponding to the portion of handwritten word "iana") are listed with five reference transcripts belonging to the Dynamic Lexicon 204, for each match being reported the starting stroke, the ending stroke and the label (in each one of the five matches of FIG. 18, the matching strokes are designed with continuous tract, while the unmatched ones are designed with dotted tract). Table 4 shows the 17 strokes of the (portion of) unknown word, numbered from 0 to 16, and the number of matches provided by the IM functional unit 105 for each one of the five

TABLE 4

| | STROKE | | | | | | | | | | | | | | | | |
|---|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 | 16 |
| MATCH | 26 times | i | i | a | a | a | a | a | | | | | | | | | | |
| | 10 times | | | | | a | a | a | a | n | n | n | n | | | | | |
| | 7 times | | | | | | | | n | n | n | n | n | | | | | |
| | 14 times | | | | | | | | n | n | n | n | a | a | a | a | a | |
| | 9 times | | | a | a | a | a | a | n | n | n | | | | | | | | reference transcripts, further showing for each stroke the transcript of the character to which such stroke belongs.

The sequence to validate is computed by the WV unit 106 by verifying the existence of a path in a directed weighted graph wherein the nodes are the matches and the arcs are the possible connections between pairs of consecutive matches; by way of example, FIG. 19 shows the directed weighted graph associated to the matches of FIG. 18. In such directed weighted graph, each path is associated to the string obtained by merging the labels of each node crossed along the path (the nodes "Start" and "Stop" indicate respectively the source node and the target node of the paths). If a path the associated string of which matches the interpretation provided by the Dynamic Lexicon 204 exists, the WV unit 106 accepts the interpretation and its cost is set as the cost of the associated path.

The construction of the graph is guided by the interpretation provided by the Dynamic Lexicon 204. The nodes of the graph are determined on the basis of the following three rules, which take account of the fact that there can be a plurality of matches associated to the same stroke sequence of the (portion of) unknown word:

1) a match becomes a node if its label is a substring contained within the interpretation associated to the fragment 202 classified as portion of cursive writing;
2) two or more matches are merged in a single match if they are fully overlapped and have in common the same label;
3) two matches are associated to different nodes if they are not overlapped or if they are partially overlapped and the labels of the overlapped strokes are different.

The cost assigned to each node introduced by rules 1)-3) above is equal to the difference between the maximum number of matches assigned to one of the nodes identified as above by the IM functional unit 105 for that particular fragment 202 classified as portion of cursive writing and the number of matches associated to each node, as reported in Table 5 for the matches of Table 4.

TABLE 5

| | NODES | | | | |
|---|---|---|---|---|---|
| | ia ($N_1$) | an ($N_2$) | n ($N_3$) | na ($N_4$) | an ($N_5$) |
| COST | 0 | 16 | 19 | 12 | 17 |

As far as the arcs of the graph are concerned, they are determined on the basis of the following three rules:

4) an arc between two nodes is created if and only if the sequences associated to the two nodes are not overlapping and the merging of the sequences gives rise to a substring contained within the interpretation associated to the fragment 202 classified as portion of cursive writing;
5) an arc between two nodes is created if and only if the sequences associated to the two nodes are overlapping by at most b strokes, the overlapping strokes have the same label and the merging of the sequences gives rise to a substring contained within the interpretation associated to the fragment 202 classified as portion of cursive writing;
6) a virtual source node (Start) and a virtual target node (Stop) are inserted for obtaining a connected graph; the virtual source node is connected to each node that, after the application of previous rules 4 and 5, remains without ingoing arc; similarly, each node that, after the application of previous rules 4 and 5, remains without an outgoing arc is connected to the virtual target node.

In order to determine the costs to associate to the arcs introduced in the graph by the rules, it is considered that most frequently matches either partially overlap each other or have gaps between them, since some strokes may receive different labels while other do not receive any label from the IM unit 105. In order to take account of the overlaps and/or the gaps between connected nodes, the cost of each arc depends on the length of the overlaps/gaps between matches. In particular, if L denotes the length of the overlap/gap and $L_{low}$ denotes the length of the cheapest node of the pair, $N_{high}$ the node of the graph with the highest cost and $L_{high}$ its length, the cost for the arc $A_{ij}$ going from node $N_i$ to node $N_j$ is defined as follows:

$$A_{ij} = \begin{cases} 0, & \text{for adjacent nodes} \\ \text{cost}(N_{high}) \times \frac{L}{L_{high}}, & \text{for gap} \\ \min(\text{cost}(N_i), \text{cost}(N_j)) \times \frac{L}{L_{low}}, & \text{for overlap} \end{cases}$$

where cost(node) is the cost of the node. Table 6 shows the arcs of the graph and the costs associated thereto according to the described process. The elements of Table 6 to which no costs correspond are related to pairs of nodes not connected by arcs.

TABLE 6

| NODES | NODES | | | | | |
| --- | --- | --- | --- | --- | --- | --- |
| | $N_1$ | $N_2$ | $N_3$ | $N_4$ | $N_5$ | Stop |
| start | 0 | 0 | 30.4 | | 11.4 | |
| $N_1$ | | | 3.8 | 0 | | |
| $N_2$ | | | | | | 19 |
| $N_3$ | | | | | | 15.2 |
| $N_4$ | | | | | | 3.8 |
| $N_5$ | | | | | | 22.8 |

FIG. 19 shows the graph that is obtained on the basis of the information reported in Tables 5 and 6. In FIG. 19 it is highlighted, by way of example, as the arc between nodes N1 and N2 is not created due to rule 4.

Consequently, the cost of the path going from node i to node j is equal to:

$$C_{ij} = \text{cost}(N_i) + A_{ij} + \text{cost}(N_j)$$

The WV unit 106 carries out the validation and calculates the score of the interpretation associated to the fragment 202 classified as portion of cursive writing through the algorithm described by J. Y. Yen in "Finding the k shortest loopless paths in a network", Management Science, 17(11), 1971, pp. 712-716. In the example of FIGS. 18 and 19, the WV unit 106 provides as interpretation 208 of largest score the interpretation "iana" suggested by the Dynamic Lexicon 204.

After a cost has been assigned to all the fragments 202 classified as portions of cursive writing belonging to the (image 200 of the) trace, the WV unit 106 calculates the score of the interpretation of the unknown word by adding the costs of each fragment 201 classified as isolated character and of each fragment 202 classified as cursive tract, as shown in the example of FIG. 20, to which the example of FIGS. 18 and 19 refers, that is immediately comprehensible in view of what set forth above.

The preferred embodiments of this invention have been described and a number of variations have been suggested hereinbefore, but it should be understood that those skilled in the art can make other variations and changes, without so departing from the scope of protection thereof, as defined by the attached claims.

The invention claimed is:

1. Process of handwriting recognition comprising a running mode wherein the process executes the steps of:
   A. having at least one digital image of at least one cursive trace corresponding to at least one unknown word to be recognised, said at least one image comprising a set of pixels representing an ink in at least one first colour on a background of pixels in at least one second colour different from said at least one first colour,
   B. processing said at least one digital image on the basis of a Lexicon comprising a plurality of known words in at least one alphabet,
   C. outputting at least one string of one or more characters as interpretation of said at least one cursive trace, said at least one string of characters being selected from the known words included in the Lexicon, or rejecting said at least one unknown word,
   wherein step B comprises the following operations:
   B1. decomposing said at least one cursive trace so as to extract from said at least one digital image one or more image fragments and to classify each one of said one or more image fragments as isolated character or portion of cursive writing;
   B2. if one or more image fragments have been classified as isolated characters, recognising the isolated characters in said one or more image fragments classified as isolated characters so as to provide a list of one or more interpretations for each image fragment classified as isolated character and a classification cost for each interpretation and to provide a relative position for each image fragment classified as isolated character in said at least one cursive trace;
   B3. if one or more image fragments have been classified as portions of cursive writing, segmenting each one of said one or more image fragments classified as portions of cursive writing into a sequence of one or more strokes;
   B4. if one or more image fragments have been classified as isolated characters, on the basis of the Lexicon, of said one or more image fragments classified as isolated characters and of their relative position in said at least one cursive trace, determining a dynamic Lexicon comprising one or more known words included in the Lexicon which contain, in the positions corresponding to said one or more image fragments classified as isolated characters, a character corresponding to the interpretations included in the lists of one or more interpretations provided for each image fragment classified as isolated character and, for each known word of the dynamic Lexicon, an associated cost equal to the sum of the classification costs of the interpretations of each image fragment classified as isolated character corresponding to the character of the known word of the dynamic Lexicon in the corresponding position;
   B5. if one or more image fragments have been classified as portions of cursive writing, on the basis of the dynamic Lexicon and of a Reference Set, which Reference Set comprises a plurality of stroke sequences corresponding to known portions of cursive writing and for each stroke sequence corresponding to a known portion of cursive writing a respective transcript comprising a string of as many characters as the strokes of the sequence so that each stroke of the sequence is associated to a character of the respective transcript, determining a Dynamic Reference Set comprising one or more strokes sequences extracted from the Reference Set the transcript of which at least partially corresponds with one or more subsequences of two or more characters included in said one or more known words included in the dynamic Lexicon in the positions corresponding to said one or more image fragments classified as portions of cursive writing;
   B6. if one or more image fragments have been classified as portions of cursive writing, comparing the sequences of one or more strokes into which said one or more image fragments classified as portions of cursive writing have been segmented with said one or more strokes sequences included in the Dynamic Reference Set and, in the case where a set of matching criteria is satisfied, providing one or more cursive interpretations for each image fragment classified as portion of cursive writing; and
   B7. validating said one or more cursive interpretations of said one or more image fragments classified as portions of cursive writing, if any, and calculating a total cost of each known word of the dynamic Lexicon for which one or more cursive interpretations of said one or more image fragments classified as portions of cursive writing, if any, have been found by combining the associated cost determined in operation B3 and the costs of said one or more cursive interpretations;

step C outputting as interpretation of said at least one cursive trace the known word of the dynamic Lexicon having lowest total cost of classification or rejecting said at least one unknown word in the case where the lowest total cost of classification is larger than a cost threshold, wherein operation B3 comprises, for each image fragment classified as portion of cursive writing, the following ordered substeps:

B3.1 making a skeletonisation of the image fragment classified as portion of cursive writing, by transforming the ink in a skeleton comprising a line having width equal to a single pixel, B3.2 correcting distortions, if any, introduced by the skeletonisation, B3.3 unfolding the corrected skeleton obtained from substep B3.2, providing a temporal sequence of points forming the ink, B3.4 segmenting, on the basis of the sequence of unfolding points, the unfolded corrected skeleton obtained from substep B3.3 into a sequence of strokes separated by segmentation points, B3.5 making a validation of the segmented unfolded corrected skeleton obtained from substep B3.4 on the basis of a set of validation criteria and, in the case where said set of validation criteria are not satisfied repeating from substep B3.3 for producing a different unfolding of the skeleton, B3.6 in the case where step B3.5 ascertains that said set of validation criteria is satisfied, assigning to each stroke a distinctive feature, providing the sequence of strokes and the corresponding sequence of features, wherein substep B3.4 segments the unfolded corrected skeleton through a decomposition method based on a multi-scale representation of the unfolded corrected skeleton obtained from substep B3.3 that is used to build a saliency map to highlight the points of the unfolded corrected skeleton in which curvature variations are recorded at different scales larger than a curvature variation threshold and to assume such points of the unfolded corrected skeleton as segmentation points, wherein operation B6 performs, for each image fragment classified as portion of cursive writing, the comparison by measuring the shape similarity of the sequence of one or more strokes into which the image fragment has been segmented with the shape of said one or more stroke sequences included in the Dynamic Reference Set at different scales on the basis of a multi-scale representation of the sequence of one or more strokes into which the image fragment has been segmented that is used for building a saliency map to highlight the stroke sequences included in the Dynamic Reference Set which are most similar to the sequence of one or more strokes into which the image fragment has been segmented, wherein in operation B6 the shape of a stroke is described by a chain code that encodes the orientations of the segments of the polyline describing the stroke at the resolution $\sigma$, and in that operation B6 comprises the following ordered substeps:

B6.1 measuring the similarity between two strokes through a weighted edit distance WED between the respective chain codes, wherein the chain code of shortest length $L_{min}$ between the two ones to be compared is stretched up to the chain code of longest length $L_{max}$, the WED distance between a first chain code $X=(x_1, x_2, \ldots x_L)$ and a second chain code $Y=(y_1, y_2, \ldots, y_L)$ being equal to: $WED(X,Y) = WED_{max} [SD_{max} - \sum_{i=1}^{L} (ED(x_i,y_i)L) SD_{max}]$ ##EQU00017## where: $E(x_i, x_i)$ is the symmetric edit distance between the symbol $x_i$ of the first chain code and the symbol $y_i$ of the second chain code, L is the length of the chain codes X and Y, $SD_{max}$ is the maximum distance between two symbols, and $WED_{max}$ is the maximum WED distance, B6.2 calculating the average value $\mu(WED)$ on the values $WED_{ij}$ which are different from zero, B6.3 initialising the $N \times M$ elements $S_{ij}$ of the saliency map S to zero, B6.4 determining the length K of the longest common sequence of compatible strokes and, for each pair of strokes p and q of this sequence such that $WED_{pq} > \sqrt{}(WED)$, incrementing the saliency of the pair of strokes p and q by one, i.e.: $S_{pq} = S_{pq} + 1$, B6.5 decrementing the length K by one (i.e. $K=K-1$) and, until the length K is larger than or equal to 2 (i.e. $K \geq 2$), searching the sequences of length K and repeating substep B6.1, B6.6 calculating the average value $\mu(S)$ on the values $S_{ij}$ which are different from zero, B6.7 selecting according to a matching criterion one or more stroke sequences included in the Dynamic Reference Set most similar to the sequence of one or more strokes into which the image fragment has been segmented as cursive interpretation, the cost for each cursive interpretation being equal to the average value of the WED distance of the stroke sequence included in the Dynamic Reference Set from the sequence of one or more strokes into which the image fragment has been segmented.

2. Process according to claim 1, wherein operation B4 determines the dynamic Lexicon also on the basis of the sequences of one or more strokes into which said one or more image fragments classified as portions of cursive writing, if any, have been segmented by excluding from the dynamic Lexicon the known words included in the Lexicon which comprise at least one stroke sequence corresponding to a known portion of cursive writing of the Reference Set, having an expected number $S_{exp}$ of strokes, in a position corresponding to an image fragment classified as portion of cursive writing, the sequence of one or more strokes of which has an actual number $S_{act}$ of strokes, such that the difference between the expected number $S_{exp}$ of strokes and the actual number $S_{act}$ of strokes is larger than an exclusion threshold.

3. Process according to claim 1, wherein operation B2 comprises, for each one of said one or more image fragments classified as isolated characters, the following substeps:

B2.1 associating to the image of the image fragment classified as isolated character a feature vector, B2.2 performing a multi-expert classification with L experts $E=\{E_1, \ldots, E_L\}$ of the image fragment classified as isolated character for providing L results $\{e_1, \ldots, e_L\}$, B2.3 combining the results $\{e_1, \ldots, e_L\}$ of the multi-expert classification outputting the list of one or more interpretations for the image fragment classified as isolated character and a classification cost for each interpretation $$c^* = \max_{k \in C} \sum_k w_k r_{i,k}.$$

4. Process according to claim 3, wherein:
in substep B2.1 the feature vector comprises Central Geometrical Moments CGM of the image of the image fragment classified as isolated character up to the 7$^{th}$ order and a set of means of pixels belonging to disjoint sub-images extracted from the image of the image fragment classified as isolated character,
in substep B2.2 performing a multi-expert classification with L experts E={$E_1, \ldots, E_L$} is based on at least one neural network, having L=20 experts obtained by using as classification scheme a feed-forward-type neural network trained with the back-propagation algorithm wherein 10 first experts are trained by using a training set of Central Geometrical Moments CGM up to the 7$^{th}$ order and 10 second experts are trained by using a training set of means of pixels belonging to disjoint sub-images,
in substep B2.3 combining the results {$e_1, \ldots, e_L$} of the multi-expert classification is made by using a Bayesian Network for automatically inferring a probability distribution for each known isolated character and defining a new weighted majority vote rule, the Bayesian Network using a supervised learning strategy that observes both the results {$e_1, \ldots, e_L$} of the multi-expert classification and the known isolated character c for each image fragment of a training set in order to calculate a joint probability p(c, $e_1, \ldots, e_L$), wherein the Bayesian Network uses joint probabilities as weights for combining the results {$e_1, \ldots, e_L$} of the multi-expert classification, so that the Bayesian Network recognises the isolated character of the image fragment (201) classified as isolated character interpreting the same as isolated character c* through the formula:

$$c^* = \max_{k \in C} \sum_k w_k r_{i,k} \quad (1)$$

where $r_{i,k}$ is a function the value of which is 1 when the classifier $E_i$ classifies the image fragment classified as known isolated character k, and 0 otherwise, while $w_k$ represents the weight related to the k-th known isolated character and is set equal to the joint probability:

$$w_k = p(c=k, e_1, \ldots, e_L) \quad (2)$$

the interpretations being progressively ordered and operation B2 including in the list of one or more interpretations for the image fragment classified as isolated character the best interpretation and the successively ordered interpretations for which the difference with respect to the preceding one is lower than an interpretation threshold θ, the classification cost of each interpretation included in the list of one or more interpretations being equal to the respective product $w_k r_{i,k}$.

5. Process according to claim 1, herein:
in substep B3.1, the ink is transformed in a skeleton comprising a line having width equal to a single pixel through medial axis transform MAT,
in substep B3.2, distortions, if any, introduced by the skeletonisation are corrected by removing spurious branches, if any, and making a polygonal approximation of each skeletal branch and by correcting V-type and/or X-type and/or T-type distortions, if any,
in substep B3.6, assigning to each stroke a distinctive feature takes account of a global shape of the stroke and of its relative position in said at least one cursive trace.

6. Process according to claim 1, wherein substep B3.3 provides the temporal sequence of points of the corrected skeleton on the basis of a search in a graph, comprising a plurality of nodes and a plurality of arcs which connects nodes, that describes topological properties of a polyline associated to the corrected skeleton obtained from substep B3.2, wherein each node of the graph has a type, selected between end point EP and branch point BP, and a degree, equal to the number of connecting arcs branching from the same node and that depends on the number of lines of the polyline which cross the node, substep B3.3 comprising:
transforming the graph into a semi-Eulerian graph, by selecting the source and destination nodes among the nodes having an odd degree and transforming all the remaining nodes having an odd degree into nodes having an even degree by adding connecting arcs among them,
obtaining the unfolding by selecting a path within the semi-Eulerian graph that crosses all the nodes and that minimises the number of nodes crossed more than once, through a Fleury's algorithm modified on the basis of handwriting generation criteria, by ordering the connecting arcs starting from the source node and, in each branch point BP type node, going through the connecting arcs according to the following order:
a) simple connecting arc, starting from a branch point BP type node and ending in another branch point BP type node;
b) loop, that is a connecting arc starting and ending in the same branch point BP type node;
c) two-way circuit, that is a connecting arc starting in a branch point BP type node and ending in an end point EP,
d) three-way circuit, that is formed by two connecting arcs starting and ending in the same branch point BP type node;
e) bridges, which are simple connecting arcs the removal of which disconnects the graph.

7. Process according to claim 6, wherein substep B3.5 analyses the sequence of strokes obtained from substep B3.4 by means of the following validation criteria:
determining a segmentation error when a stroke starts or ends in the neighbourhood of an ending point or a starting point of an ink tract, the neighbourhood being evaluated by comparing the distance between the segmentation point and the starting or ending one with a distance threshold;
determining a segmentation error when two or more strokes start in the neighbourhood of a branch BP type point, the neighbourhood being evaluated by comparing the distance between the segmentation point and the branch BP type point with the distance threshold,
and, if the number of determined errors exceeds an error threshold, substep B3.5 rejects the segmented unfolded corrected skeleton obtained from substep B3.4 and the process repeats substep B3.3, while if the number of determined errors is larger than zero and lower than the error threshold, the process repeats substep B3.3 by exploiting the determined errors for modifying:

the selection of the source node and the destination node, and/or the introduction of additional connecting arcs, and/or the selection of the path within the semi-Eulerian graph.

8. Process according to claim 1, wherein the decomposition method of substep B3.4 comprises:

building representations of the unfolded corrected skeleton by using as scale σ different levels of resolution of the image fragment classified as portion of cursive writing, calculating a curvature c(σ) at each resolution σ:

$$c(\sigma) = \lim_{\Delta\lambda \to 0} \Delta\alpha / \Delta\lambda$$

where λ is a curvilinear abscissa on the unfolded corrected skeleton, quantising the curvature in Q intervals and encoding each interval by a label such that at each scale the shape of the stroke is described by a string of as many labels as the number of points used to describe the unfolded corrected skeleton minus one;

building a saliency map by counting the number of times a point of the unfolded corrected skeleton is a local maximum of curvature at the different scales;

selecting as segmentation points the local maximum points of the saliency map the value of which is larger than the curvature variation threshold equal to the average of values of the map;

selecting the best scale for describing the shape of the strokes by calculating the distance between a vector c(σ) and a vector <c(σ)>.

9. Process according to claim 1, wherein the multi-scale representation uses as starting scale the length K, equal to the number of strokes, of the longest common sequence of compatible strokes between the sequence of one or more strokes into which the image fragment has been segmented and the stroke sequence included in the Dynamic Reference Set with which the comparison is performed, the successive scales being obtained by considering the subsequences of compatible strokes of length progressively decreased by 1, whereby K−1 similarity maps are obtained.

10. Process according to claim 1, wherein in substep B6.1. the chain code of shortest length $L_{min}$ between the two ones to be compared is stretched up to the chain code of longest length $L_{max}$ so as to calculate the integer part I of the ratio $(L_{max}/L_{min})$ and each symbol of the shortest chain code is replicated (I−1) times and the remaining $((L_{max}/L_{min}) \cdot I)$ symbols are added by uniformly locating them in the stretched chain code.

11. Process according to claim 1, wherein operation B7 comprises the following substeps:

B7.1 constructing a directed weighted graph the nodes of which are the matches between strokes of the sequence of one or more strokes into which the image fragment classified as portion of cursive writing has been segmented and the stroke sequence included in the Dynamic Reference Set, a label corresponding to the sequence of characters encoded by the sequence of corresponding strokes being associated to each node, and the arcs of which are the possible connections between pairs of consecutive matches, each graph path being associated to a string obtained by merging the labels of each crossed node along the path;

B7.2 verifying the existence of a path the associated string of which matches the cursive interpretation, and in case of positive outcome of the verification accepting the cursive interpretation.

12. Process according to claim 11, wherein in substep B7.1 the graph nodes are determined on the basis of the following three rules:

1) a match becomes a node if its label is a substring contained within the cursive interpretation of the image fragment classified as portion of cursive writing;

2) two or more matches are merged in a single match if they are fully overlapped and have in common the same label;

3) two matches are associated to different nodes if they are not overlapped or if they are partially overlapped and the overlapped labels of the strokes are different, and the cost assigned to nodes determined by such three rules are equal, for each node, to the difference between the maximum number of matches assigned to one of the nodes for the image fragment classified as portion of cursive writing and the number of matches associated to the graph node, the graph arcs being determined on the basis of the following three rules:

4) an arc between two nodes is created if and only if the sequences associated to the two nodes connected by the arc are not overlapped and the merging of the sequences gives rise to a substring contained within the cursive interpretation of the image fragment classified as portion of cursive writing;

5) an arc between two nodes is created if and only if the sequences associated to the two nodes connected by the arc are overlapped by at most a maximum number b of strokes, the overlapped strokes have the same label and the merging of the sequences gives rise to a substring contained within the cursive interpretation of the image fragment classified as portion of cursive writing;

6) after having inserted a virtual source node and a virtual target node for obtaining a connected graph, the virtual source node is connected to each node that, after application of rules 4 and 5, remains without ingoing arc and each node that, after application of rules 4 and 5, remains without an outgoing arc is connected to the virtual target node, and the cost assigned to the arcs determined by such three rules are depending on the length of the overlaps and of the gaps between the matches, whereby the cost for the arc $A_{ij}$ going from node $N_i$ to node $N_j$ is equal to $$A_{ij} = \begin{cases} 0, & \text{for adjacent nodes} \\ \text{cost}(N_{high}) \times \frac{L}{L_{high}}, & \text{for gap} \\ \min(\text{cost}(N_i), \text{cost}(N_j)) \times \frac{L}{L_{low}}, & \text{for overlap} \end{cases}$$

where L denotes the length of the overlap or of the gap, $L_{low}$ denotes the length of the cheapest node of the pair, $N_{high}$ the graph node with the highest cost and $L_{high}$ its length, and cost(N) is the cost of the node, the cost $C_{ij}$ of the path going from node $N_i$ to node $N_j$ being equal to:

$$C_{ij} = \text{cost}(N_i) + A_{ij} + \text{cost}(N_j).$$

13. Process according to claim 1, further comprising a configuration mode wherein the process executes the steps of:

D. having a plurality of digital images of a Setup Set of training of cursive traces corresponding to known words, said at least one image comprising a set of pixels representing an ink in at least one first colour on a background of pixels in at least one second colour different from said at least one first colour, E. decomposing said cursive traces of the digital images of the Setup Set so as to extract one or more image fragments and to classify each one of said one or more image fragments as isolated character or portion of cursive writing, the image fragments classified as isolated characters forming a character training set and the image fragments classified as portions of cursive writing forming a cursive training set, F. training an engine of classification of isolated characters with character training set, G. segmenting each one of said image fragments classified as portions of cursive writing into a sequence of one or more strokes, H. associating to each sequence of one or more strokes obtained from step G its transcript, so that each stroke is associated to the character of the transcript to which it belongs, the sequences of one or more strokes obtained from step G and the respective transcripts forming the Reference Set.

14. Process according to claim 13, wherein step H comprises the following substeps:

H1. generating distributions, wherein the sequences of one or more strokes obtained from step G and the respective transcripts are used for generating, for each character of the alphabet of the Lexicon, a series of probability mass functions the number of which is equal to the number C of characters of the alphabet of the Lexicon, H2. analysing features of the sequences of one or more strokes obtained from step G, wherein a set of anchor points is determined through the analysis of features associated to the strokes, each one of the anchor points representing the beginning or the end of a character in a subsequence into which a sequence of one or more strokes obtained from step G can be subdivided, H3. associating labels, wherein, in accordance with the anchor points, the transcripts of the portions of said cursive traces separated by the anchor points are determined, through the probability mass functions, associating each stroke to the transcript of the character to which it belongs.

15. Process according to claim 14, wherein substep H1 generates a probability mass function for each character, that represents the probability that a character is composed of a certain number of strokes, the probability mass functions being obtained by solving a set of systems of linear equations wherein each equation is obtained from a segmented ink tract by considering the number $n_{char}$ of strokes of each character as an unknown variable, the occurrences $x_{char}$ of each character as coefficients, and the number $n_{strokes}$ of strokes of the segmented ink tract as constant term:

$$n_a x_a + \ldots + n_z x_z + n_A x_A + \ldots + + n_Z x_Z + = n_{strokes}$$

each system of linear equations being constituted by k equations, with k≥C, where C is the number of characters of the alphabet of the Lexicon, and with C unknown variables, whereby solving a set of m systems, m vectors of solutions are obtained each one comprising C elements, each i-th vector of solutions, with i ranging from 1 to m, being associated with a corresponding vector of reliability parameters R, having C elements each one of which is equal to the ratio of the occurrence of the corresponding character within the system of equations to the deviation of the considered solution for that character from the average of the solutions for that character:

$$R_{c,i} = \frac{n_{c,i}}{r_{c,i} \times n_{c,i} - \sum_{j=1}^{m} \frac{r_{c,j} \times n_{c,j}}{m}}$$

where:
$n_{c,i}$ is the occurrence of the c-th character within the i-th system; and
$r_{c,i}$ is the number of strokes, obtained by solving the i-th system, composing the c-th character,
the distributions being created on the basis of the m vectors of solutions and of the corresponding vectors of reliability parameters R.

16. Process according to claim 1, wherein in substep B3.1 the skeletonisation of the image fragment classified as portion of cursive writing is made by transforming the ink in a skeleton comprising a line having width equal to a single pixel through medial axis transform MAT.

17. Computerised apparatus for handwriting recognition, comprising processing means capable to execute a process of handwriting recognition comprising a running mode wherein the process executes the steps of:

A. having at least one digital image of at least one cursive trace corresponding to at least one unknown word to be recognised, said at least one image comprising a set of pixels representing an ink in at least one first colour on a background of pixels in at least one second colour different from said at least one first colour, B. processing said at least one digital image on the basis of a Lexicon comprising a plurality of known words in at least one alphabet, C. outputting at least one string of one or more characters as interpretation of said at least one cursive trace, said at least one string of characters being selected from the known words included in the Lexicon, or rejecting said at least one unknown word, wherein step B comprises the following operations:

B1. decomposing said at least one cursive trace so as to extract from said at least one digital image one or more image fragments and to classify each one of said one or more image fragments as isolated character or portion of cursive writing;

B2. if one or more image fragments have been classified as isolated characters, recognising the isolated characters in said one or more image fragments classified as isolated characters so as to provide a list of one or more interpretations for each image fragment classified as isolated character and a classification cost for each interpretation and to provide a relative position for each image fragment classified as isolated character in said at least one cursive trace;

B3. if one or more image fragments have been classified as portions of cursive writing, segmenting each one of said one or more image fragments classified as portions of cursive writing into a sequence of one or more strokes;

B4. if one or more image fragments have been classified as isolated characters, on the basis of the Lexicon, of said one or more image fragments classified as isolated characters and of their relative position in said at least one cursive trace, determining a dynamic Lexicon comprising one or more known words included in the Lexicon which contain, in the positions corresponding to said one or more image fragments classified as isolated characters, a character corresponding to the interpretations included in the lists of one or more interpretations provided for each image fragment classified as isolated character and, for each known word of the dynamic Lexicon, an associated cost equal to the sum of the classification costs of the interpretations of each image fragment classified as isolated character corresponding to the character of the known word of the dynamic Lexicon in the corresponding position;

B5. if one or more image fragments have been classified as portions of cursive writing, on the basis of the dynamic Lexicon and of a Reference Set, which Reference Set comprises a plurality of stroke sequences corresponding to known portions of cursive writing and for each stroke sequence corresponding to a known portion of cursive writing a respective transcript comprising a string of as many characters as the strokes of the sequence so that each stroke of the sequence is associated to a character of the respective transcript, determining a Dynamic Reference Set comprising one or more strokes sequences extracted from the Reference Set the transcript of which at least partially corresponds with one or more subsequences of two or more characters included in said one or more known words included in the dynamic Lexicon in the positions corresponding to said one or more image fragments classified as portions of cursive writing;

B6. if one or more image fragments have been classified as portions of cursive writing, comparing the sequences of one or more strokes into which said one or more image fragments classified as portions of cursive writing have been segmented with said one or more strokes sequences included in the Dynamic Reference Set and, in the case where a set of matching criteria is satisfied, providing one or more cursive interpretations for each image fragment classified as portion of cursive writing; and B7. validating said one or more cursive interpretations of said one or more image fragments classified as portions of cursive writing, if any, and calculating a total cost of each known word of the dynamic Lexicon for which one or more cursive interpretations of said one or more image fragments classified as portions of cursive writing, if any, have been found by combining the associated cost determined in operation B3 and the costs of said one or more cursive interpretations;

step C outputting as interpretation of said at least one cursive trace the known word of the dynamic Lexicon having lowest total cost of classification or rejecting said at least one unknown word in the case where the lowest total cost of classification is larger than a cost threshold, wherein operation B3 comprises, for each image fragment classified as portion of cursive writing, the following ordered substeps:

B3.1 making a skeletonisation of the image fragment classified as portion of cursive writing, by transforming the ink in a skeleton comprising a line having width equal to a single pixel, B3.2 correcting distortions, if any, introduced by the skeletonisation, B3.3 unfolding the corrected skeleton obtained from substep B3.2, providing a temporal sequence of points forming the ink, B3.4 segmenting, on the basis of the sequence of unfolding points, the unfolded corrected skeleton obtained from substep B3.3 into a sequence of strokes separated by segmentation points, B3.5 making a validation of the segmented unfolded corrected skeleton obtained from substep B3.4 on the basis of a set of validation criteria and, in the case where said set of validation criteria are not satisfied repeating from substep B3.3 for producing a different unfolding of the skeleton, B3.6 in the case where step B3.5 ascertains that said set of validation criteria is satisfied, assigning to each stroke a distinctive feature, providing the sequence of strokes and the corresponding sequence of features, wherein substep B3.4 segments the unfolded corrected skeleton through a decomposition method based on a multi-scale representation of the unfolded corrected skeleton obtained from substep B3.3 that is used to build a saliency map to highlight the points of the unfolded corrected skeleton in which curvature variations are recorded at different scales larger than a curvature variation threshold and to assume such points of the unfolded corrected skeleton as segmentation points, wherein operation B6 performs, for each image fragment classified as portion of cursive writing, the comparison by measuring the shape similarity of the sequence of one or more strokes into which the image fragment has been segmented with the shape of said one or more stroke sequences included in the Dynamic Reference Set at different scales on the basis of a multi-scale representation of the sequence of one or more strokes into which the image fragment has been segmented that is used for building a saliency map to highlight the stroke sequences included in the Dynamic Reference Set which are most similar to the sequence of one or more strokes into which the image fragment has been segmented, wherein in operation B6 the shape of a stroke is described by a chain code that encodes the orientations of the segments of the polyline describing the stroke at the resolution $\sigma$, and in that operation B6 comprises the following ordered substeps:

B6.1 measuring the similarity between two strokes through a weighted edit distance WED between the respective chain codes, wherein the chain code of shortest length $L_{min}$ between the two ones to be compared is stretched up to the chain code of longest length $L_{max}$ the WED distance between a first chain code $X=(x_1, x_2, \ldots, x_L)$ and a second chain code $Y=(y_1, y_2, \ldots, y_L)$ being equal to: $WED(X,Y) = WED_{max}[SD_{max} - \sum_{i=1}^{L}(ED(x_i,y_i)L) SD_{max}]$ ##EQU00020## where: $E(x_i, y_i)$ is the symmetric edit distance between the symbol $x_i$ of the first chain code and the symbol $y_i$ of the second chain code, L is the length of the chain codes X and Y, $SD_{max}$ is the maximum distance between two symbols, and $WED_{max}$ is the maximum WED distance, B6.2 calculating the average value $\mu(WED)$ on the values $WED_{ij}$ which are different from zero, B6.3 initialising the $N \times M$ elements $S_{ij}$ of the saliency map S to zero, B6.4 determining the length K of the longest common sequence of compatible strokes and, for each pair of strokes p and q of this sequence such that WED.sub.pq>.quadrature.(WED), incrementing the saliency of the pair of strokes p and q by one, i.e.: S.sub.pq=S.sub.pq+1, B6.5 decrementing the length K by one (i.e. K=K-1) and, until the length K is larger than or equal to 2 (i.e. K.gtoreq.2), searching the sequences of length K and repeating substep B6.1, B6.6 calculating the average value .mu.(S) on the values S.sub.ij which are different from zero, B6.7 selecting according to a matching criterion one or more stroke sequences included in the Dynamic Reference Set most similar to the sequence of one or more strokes into which the image fragment has been segmented as cursive interpretation, the cost for each cursive interpretation being equal to the average value of the WED distance of the stroke sequence included in the Dynamic Reference Set from the sequence of one or more strokes into which the image fragment has been segmented.

18. Computerised apparatus according to claim 17, wherein the process of handwriting recognition which the processing means are capable to execute further comprises a configuration mode wherein the process executes the steps of:

D. having a plurality of digital images of a Setup Set of training of cursive traces corresponding to known words, said at least one image comprising a set of pixels representing an ink in at least one first colour on a background of pixels in at least one second colour different from said at least one first colour, E. decomposing said cursive traces of the digital images of the Setup Set so as to extract one or more image fragments and to classify each one of said one or more image fragments as isolated character or portion of cursive writing, the image fragments classified as isolated characters forming a character training set and the image fragments classified as portions of cursive writing forming a cursive training set, F. training an engine of classification of isolated characters with character training set, G. segmenting each one of said image fragments classified as portions of cursive writing into a sequence of one or more strokes, H. associating to each sequence of one or more strokes obtained from step G its transcript, so that each stroke is associated to the character of the transcript to which it belongs, the sequences of one or more strokes obtained from step G and the respective transcripts forming the Reference Set.

19. Set of one or more non-transitory computer-readable memory media, having a set of one or more computer programs stored therein, wherein the set of one or more computer programs is adapted to perform, when operating on processing means of a computerised apparatus, a process of handwriting recognition comprising a running mode wherein the process executes the steps of:

A. having at least one digital image of at least one cursive trace corresponding to at least one unknown word to be recognised, said at least one image comprising a set of pixels representing an ink in at least one first colour on a background of pixels in at least one second colour different from said at least one first colour, B. processing said at least one digital image on the basis of a Lexicon comprising a plurality of known words in at least one alphabet, C. outputting at least one string of one or more characters as interpretation of said at least one cursive trace, said at least one string of characters being selected from the known words included in the Lexicon, or rejecting said at least one unknown word, wherein step B comprises the following operations:

B1. decomposing said at least one cursive trace so as to extract from said at least one digital image one or more image fragments and to classify each one of said one or more image fragments as isolated character or portion of cursive writing;

B2. if one or more image fragments have been classified as isolated characters, recognising the isolated characters in said one or more image fragments classified as isolated characters so as to provide a list of one or more interpretations for each image fragment classified as isolated character and a classification cost for each interpretation and to provide a relative position for each image fragment classified as isolated character in said at least one cursive trace;

B3. if one or more image fragments have been classified as portions of cursive writing, segmenting each one of said one or more image fragments classified as portions of cursive writing into a sequence of one or more strokes;

B4. if one or more image fragments have been classified as isolated characters, on the basis of the Lexicon, of said one or more image fragments classified as isolated characters and of their relative position in said at least one cursive trace, determining a dynamic Lexicon comprising one or more known words included in the Lexicon which contain, in the positions corresponding to said one or more image fragments classified as isolated characters, a character corresponding to the interpretations included in the lists of one or more interpretations provided for each image fragment classified as isolated character and, for each known word of the dynamic Lexicon, an associated cost equal to the sum of the classification costs of the interpretations of each image fragment classified as isolated character corresponding to the character of the known word of the dynamic Lexicon in the corresponding position;

B5. if one or more image fragments have been classified as portions of cursive writing, on the basis of the dynamic Lexicon and of a Reference Set, which Reference Set comprises a plurality of stroke sequences corresponding to known portions of cursive writing and for each stroke sequence corresponding to a known portion of cursive writing a respective transcript comprising a string of as many characters as the strokes of the sequence so that each stroke of the sequence is associated to a character of the respective transcript, determining a Dynamic Reference Set comprising one or more strokes sequences extracted from the Reference Set the transcript of which at least partially corresponds with one or more subsequences of two or more characters included in said one or more known words included in the dynamic Lexicon in the positions corresponding to said one or more image fragments classified as portions of cursive writing;

B6. if one or more image fragments have been classified as portions of cursive writing, comparing the sequences of one or more strokes into which said one or more image fragments classified as portions of cursive writing have been segmented with said one or more strokes sequences included in the Dynamic Reference Set and, in the case where a set of matching criteria is satisfied, providing one or more cursive interpretations for each image fragment classified as portion of cursive writing; and B7. validating said one or more cursive interpretations of said one or more image fragments classified as portions of cursive writing, if any, and calculating a total cost of each known word of the dynamic Lexicon for which one or more cursive interpretations of said one or more image fragments classified as portions of cursive writing, if any, have been found by combining the associated cost determined in operation B3 and the costs of said one or more cursive interpretations;

step C outputting as interpretation of said at least one cursive trace the known word of the dynamic Lexicon having lowest total cost of classification or rejecting said at least one unknown word in the case where the lowest total cost of classification is larger than a cost threshold, wherein operation B3 comprises, for each image fragment classified as portion of cursive writing, the following ordered substeps:

B3.1 making a skeletonisation of the image fragment classified as portion of cursive writing, by transforming the ink in a skeleton comprising a line having width equal to a single pixel, B3.2 correcting distortions, if any, introduced by the skeletonisation, B3.3 unfolding the corrected skeleton obtained from substep B3.2, providing a temporal sequence of points forming the ink, B3.4 segmenting, on the basis of the sequence of unfolding points, the unfolded corrected skeleton obtained from substep B3.3 into a sequence of strokes separated by segmentation points, B3.5 making a validation of the segmented unfolded corrected skeleton obtained from substep B3.4 on the basis of a set of validation criteria and, in the case where said set of validation criteria are not satisfied repeating from substep B3.3 for producing a different unfolding of the skeleton, B3.6 in the case where step B3.5 ascertains that said set of validation criteria is satisfied, assigning to each stroke a distinctive feature, providing the sequence of strokes and the corresponding sequence of features, wherein substep B3.4 segments the unfolded corrected skeleton through a decomposition method based on a multi-scale representation of the unfolded corrected skeleton obtained from substep B3.3 that is used to build a saliency map to highlight the points of the unfolded corrected skeleton in which curvature variations are recorded at different scales larger than a curvature variation threshold and to assume such points of the unfolded corrected skeleton as segmentation points, wherein operation B6 performs, for each image fragment classified as portion of cursive writing, the comparison by measuring the shape similarity of the sequence of one or more strokes into which the image fragment has been segmented with the shape of said one or more stroke sequences included in the Dynamic Reference Set at different scales on the basis of a multi-scale representation of the sequence of one or more strokes into which the image fragment has been segmented that is used for building a saliency map to highlight the stroke sequences included in the Dynamic Reference Set which are most similar to the sequence of one or more strokes into which the image fragment has been segmented, wherein in operation B6 the shape of a stroke is described by a chain code that encodes the orientations of the segments of the polyline describing the stroke at the resolution $\sigma$, and in that operation B6 comprises the following ordered substeps:

B6.1 measuring the similarity between two strokes through a weighted edit distance WED between the respective chain codes, wherein the chain code of shortest length $L_{min}$, between the two ones to be compared is stretched up to the chain code of longest length $L_{max}$, the WED distance between a first chain code $X=(x_1, x_2, \ldots, x_L)$ and a second chain code $Y=(y_1, y_2, \ldots, y_L)$ being equal to: $WED(X,Y) = WED_{max} [SD_{max} - \sum_{i=1}^{L}(ED(x_i,y_i)L) \; SD_{max}]$ where: $E(x_i, y_i)$ is the symmetric edit distance between the symbol $x_i$ of the first chain code and the symbol $y_i$ of the second chain code, L is the length of the chain codes X and Y, $SD_{max}$ is the maximum distance between two symbols, and $WED_{max}$ is the maximum WED distance, B6.2 calculating the average value $\mu(WED)$ on the values $WED_{ij}$ which are different from zero, B6.3 initialising the $N \times M$ elements $S_{ij}$ of the saliency map S to zero, B6.4 determining the length K of the longest common sequence of compatible strokes and, for each pair of strokes p and q of this sequence such that $WED_{pq} > \sqrt{(WED)}$, incrementing the saliency of the pair of strokes p and q by one, i.e.: $S_{pq} = S_{pq} + 1$, B6.5 decrementing the length K by one (i.e. $K=K-1$) and, until the length K is larger than or equal to 2 (i.e. $K \geq 2$), searching the sequences of length K and repeating substep B6.1, B6.6 calculating the average value $\mu(S)$ on the values $S_{ij}$ which are different from zero, B6.7 selecting according to a matching criterion one or more stroke sequences included in the Dynamic Reference Set most similar to the sequence of one or more strokes into which the image fragment has been segmented as cursive interpretation, the cost for each cursive interpretation being equal to the average value of the WED distance of the stroke sequence included in the Dynamic Reference Set from the sequence of one or more strokes into which the image fragment has been segmented.

20. Set of one or more non-transitory computer-readable memory media according to claim 19, wherein the process of handwriting recognition which the set of one or more computer programs is adapted to perform further comprises a configuration mode wherein the process executes the steps of:

D. having a plurality of digital images of a Setup Set of training of cursive traces corresponding to known words, said at least one image comprising a set of pixels representing an ink in at least one first colour on a background of pixels in at least one second colour different from said at least one first colour, E. decomposing said cursive traces of the digital images of the Setup Set so as to extract one or more image fragments and to classify each one of said one or more image fragments as isolated character or portion of cursive writing, the image fragments classified as isolated characters forming a character training set and the image fragments classified as portions of cursive writing forming a cursive training set, F. training an engine of classification of isolated characters with character training set,
G. segmenting each one of said image fragments classified as portions of cursive writing into a sequence of one or more strokes,
H. associating to each sequence of one or more strokes obtained from step G its transcript, so that each stroke is associated to the character of the transcript to which it belongs, the sequences of one or more strokes obtained from step G and the respective transcripts forming the Reference Set.

* * * * *